United States Patent
Santhanam

(10) Patent No.: US 6,286,135 B1
(45) Date of Patent: *Sep. 4, 2001

(54) COST-SENSITIVE SSA-BASED STRENGTH REDUCTION ALGORITHM FOR A MACHINE WITH PREDICATION SUPPORT AND SEGMENTED ADDRESSES

(75) Inventor: Vatsa Santhanam, Campbell, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,484

(22) Filed: Mar. 26, 1997

(51) Int. Cl.$^7$ .................................................... G06F 9/45
(52) U.S. Cl. .................................................... 717/9; 717/8
(58) Field of Search ............................... 395/709; 717/9, 717/8

(56) References Cited

U.S. PATENT DOCUMENTS

| | | | |
|---|---|---|---|
| 5,109,331 | * | 4/1992 | Ishida et al. ........................ 717/8 |
| 5,202,995 | * | 4/1993 | O'Brien ........................... 717/9 |
| 5,230,050 | * | 7/1993 | Iitsuka et al. ..................... 717/9 |
| 5,367,651 | * | 11/1994 | Smith et al. ...................... 717/7 |
| 5,448,737 | * | 9/1995 | Burke et al. ...................... 717/7 |
| 5,455,945 | * | 10/1995 | VanderDrift ...................... 707/2 |
| 5,530,866 | * | 6/1996 | Koblenz et al. ................... 717/8 |
| 5,577,253 | * | 11/1996 | Blickstein ........................ 717/5 |
| 5,584,027 | * | 12/1996 | Smith ............................. 717/7 |
| 5,659,754 | * | 8/1997 | Grove et al. ...................... 717/9 |
| 5,768,596 | * | 6/1998 | Chow et al. ...................... 717/9 |
| 5,854,933 | * | 12/1998 | Chang ............................. 717/9 |
| 6,151,705 | * | 11/2000 | Santhanam ........................ 717/9 |

OTHER PUBLICATIONS

Aho, A.; Sethi, R.; Ullman, J. "Compilers, Principles, Techniques and Tools"; Addison–Wesley Publishing Co.; pp. 594–595, Mar. 1986.*

Michael E. Wolf, Dror E. Maydan and Ding–Kai Chen, "Combining Loop Transformations Considering Caches and Scheduling", 1072–4451/96 IEEE p. 274–286, 1996.*

R. Nigel Horspool and H. C. Ho, "Partial Redundancy Elimination Driven By a Cost–Benefit Analysis", 0–8186–8136–7/97 IEEE P. 111–118, 1997.*

(List continued on next page.)

*Primary Examiner*—Mark R. Powell
*Assistant Examiner*—Kelvin Booker

(57) ABSTRACT

A compiler optimization algorithm that deals with aggressive strength reduction of integer machine instructions found in loops. The algorithm permits the strength reduction of such machine instructions whose execution may be guarded by predicate values. In addition, the algorithm allows the strength reduction of address calculations consumed by memory reference instructions accessing data in a segmented virtual address space. The algorithm also permits aggressive SSA-based strength reduction of non-address integer computations found in loops that are linear functions of loop induction variables. The algorithm incorporates profitability considerations by reducing the cost of updating strength-reduction temporaries and ensures that the strength-reduction transformation results in an overall reduction of the path-lengths within loop bodies, without creating excessive register pressure.

55 Claims, 27 Drawing Sheets

OTHER PUBLICATIONS

David M. Gillies, Dz–ching Roy Ju, Richard Johnson and Michael Schlansker, "Global Predicate Analysis and its Application to Register Allocation", 1072–4451/96 IEEE, p. 114–125, 1996.*

Richard Johnson and Michael Schlansker, "Analysis Techniques for Predicated Code", 1072–4451/96 IEEE, p. 100–113, 1996.*

"Measurement of Program Improvement Algorithms," J. Cocke and P. Markstein, Proceedings of the IFIP Congress, 1980, pp. 221–228.

"Improved Optimization of FORTRAN Object Programs," R.G. Scarborough and H.G. Kolsky, IBM Journal of Research and Development, vol. 24, No. 6, Nov. 1980, pp. 660–676.

"Reduction of Operator Strength," F.E. Allen, J. Cocke, K. Kennedy, Program Flow Analysis, editors S.S. Muchnick and N.D. Jones, Prentice Hall, 1981, pp. 79–101.

"An Overview of the PL.8 Compiler," M. Auslander and M. Hopkins, Proceedings of the SIGPLAN Symposium on Compiler Construction, 1982, pp. 22–31.

"Induction Variables and Reduction in Strength," Compilers: Principles, Techniques, and Tools, A.V. Aho, R Sethi, J.D. Ullman, Addison–Wesley Publishing Co., Section 10.2, Mar. 1986, pp. 596–598.

"Advanced Compiler Technology for the RISC System/6000 Architecture," Kevin O'Brien et al., IBM RISC System/6000 Technology, 1990, pp. 154–161.

"Performance Characteristics of Architectural Features of the IBM RISC System/6000," C. Brian Hall and Kevin O'Brien, Proceedings of the Fourth International Conference on Architectural Support for Programming Languages and Operating Systems, Apr. 1991, pp. 303–309.

"Register Reassociation on PA–RISC," CLL Internal Design Document, Vatsa Santhanam, Feb. 6, 1991, pp. 33–38.

"Strength Reduction," Chapter of an Unpublished Text Book on Program Optimization, P. Markstein and K. Zadeck, Dec. 1992. pp. 1–40.

Wolf, M.;"Beyond Induction Variables"; Proceedings of the ACM SIGPLAN '92 Conference on Programming Language Design and Implementation; pp. 162–174, Jun. 1992.*

* cited by examiner

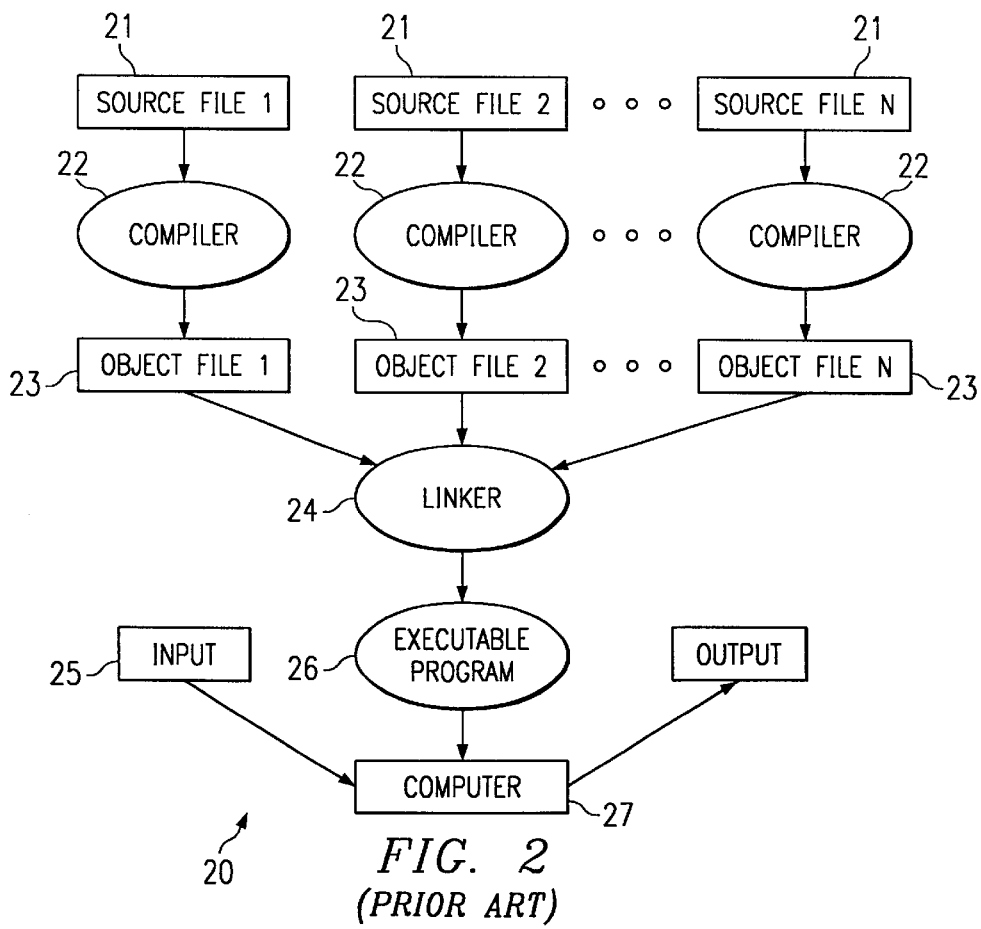

130

$B_3$
= EXECUTION * (MPY$_{COST}$ + ADD$_{COST}$)
  FREQUENCY

= 5 * (4 CYCLES + 1 CYCLE)

= 25 CYCLES ~133

$B_0$
= EXECUTION * (MPY$_{COST}$ + COPY$_{COST}$) +
  FREQUENCY $B_5$
= EXECUTION * (ADD$_{COST}$) +
  FREQUENCY $B_6$
= EXECUTION * (ADD$_{COST}$)
  FREQUENCY

= 10 * (4 + 1) +
  600 * (1) +
  1000 * (1)
= 1641 CYCLES ~133

FIG. 13B

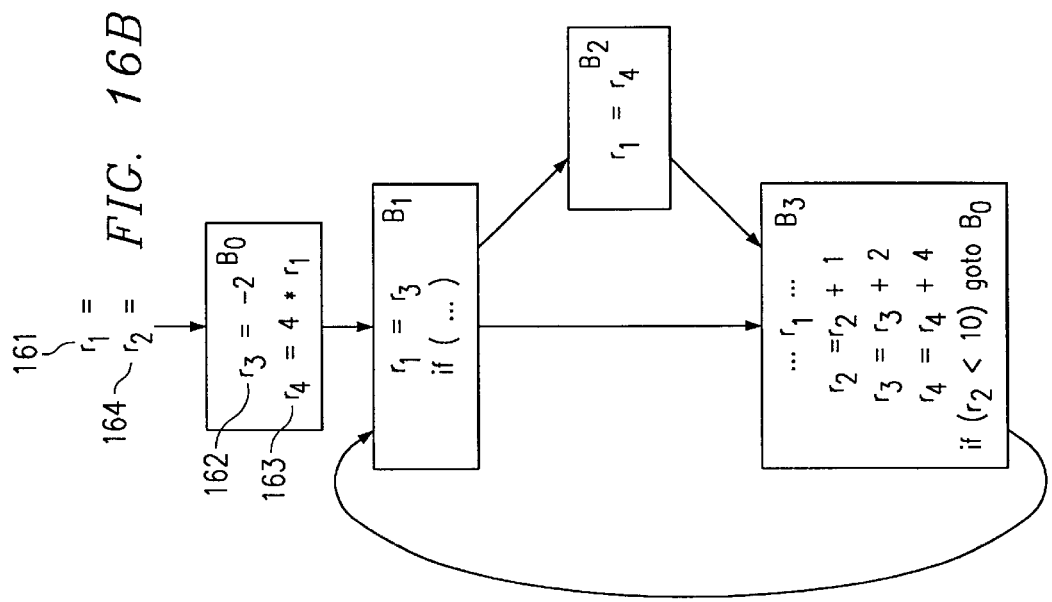
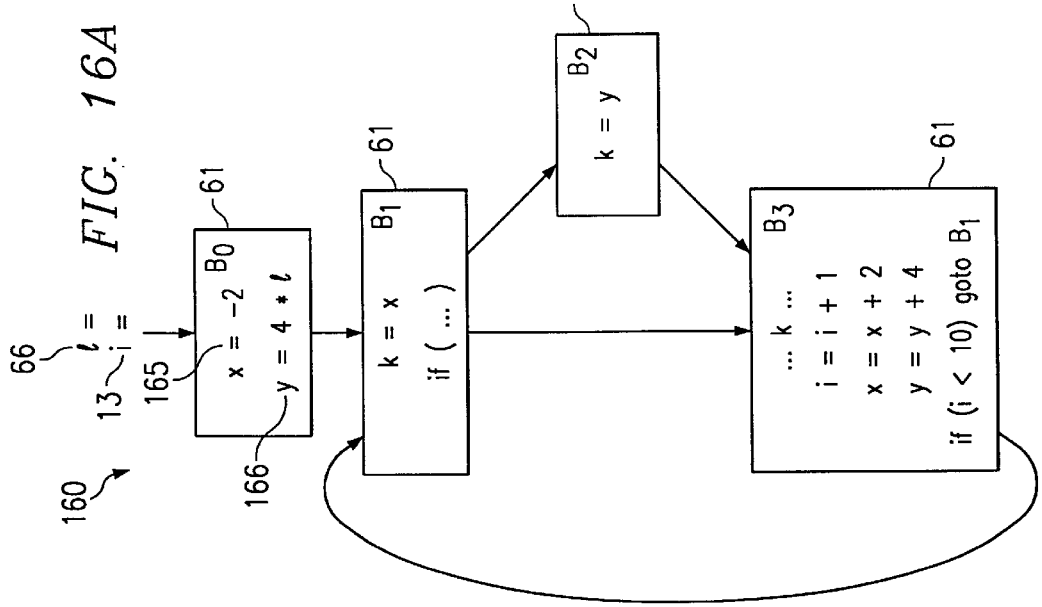

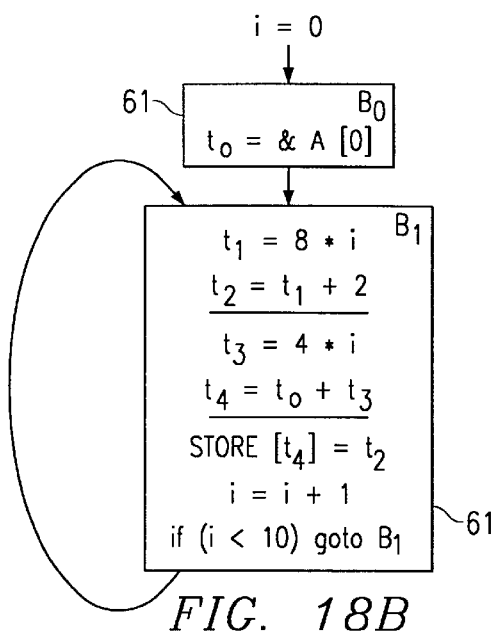
FIG. 18B
(PRIOR ART)
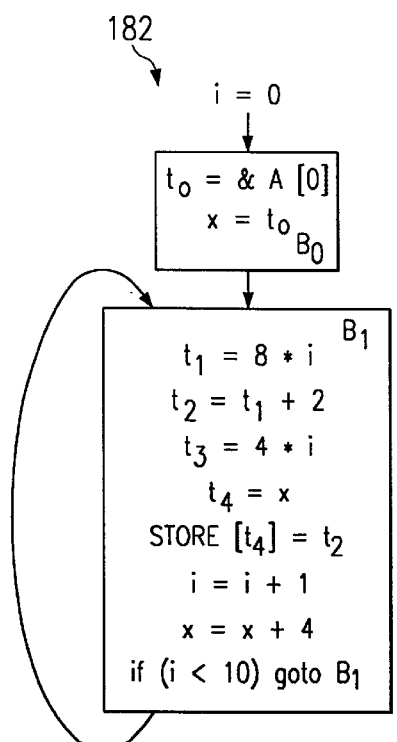
FIG. 18C
(PRIOR ART)
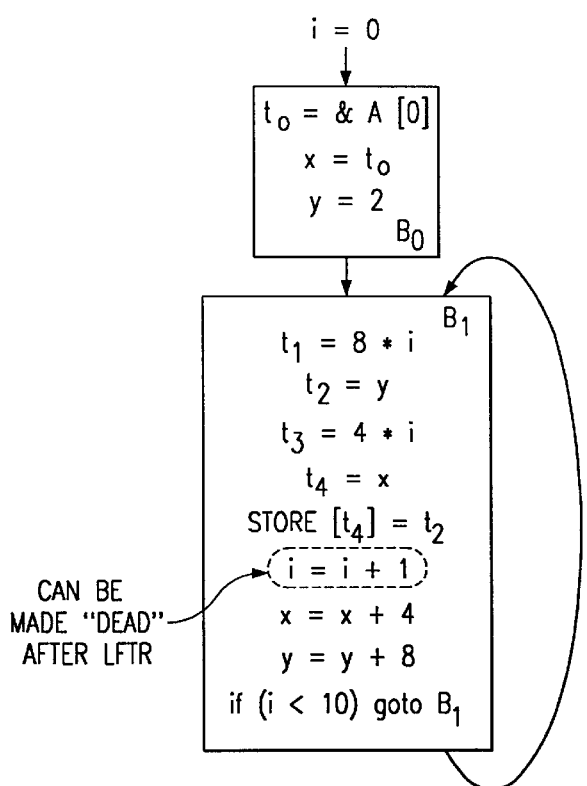
FIG. 18D
FIG. 18A
(PRIOR ART)

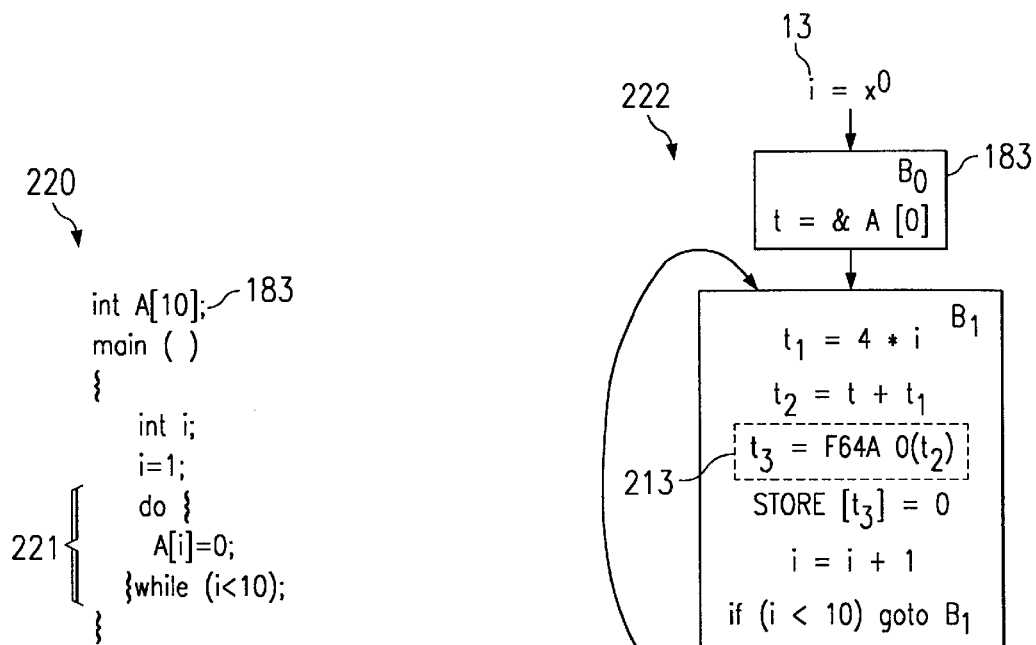
FIG. 22A
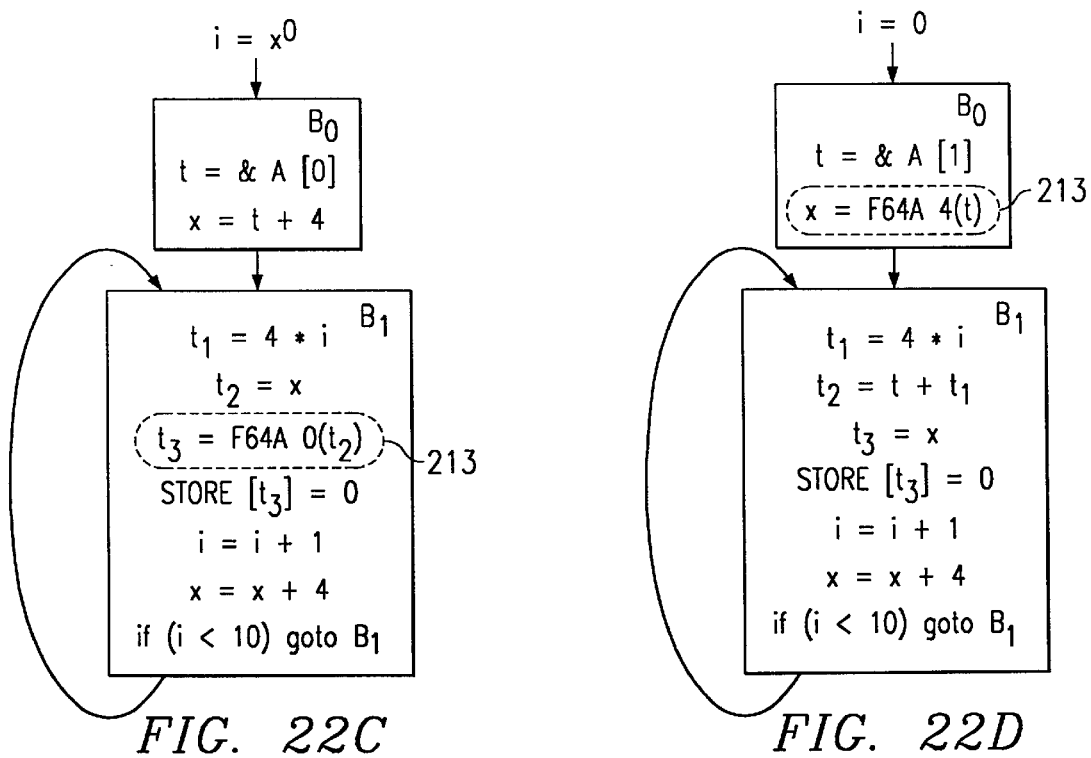
FIG. 22B
FIG. 22C
FIG. 22D

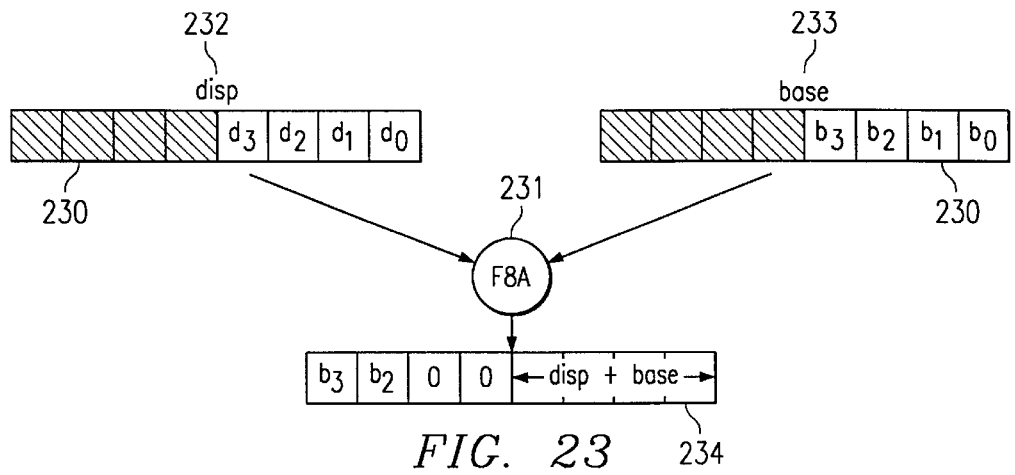
FIG. 23
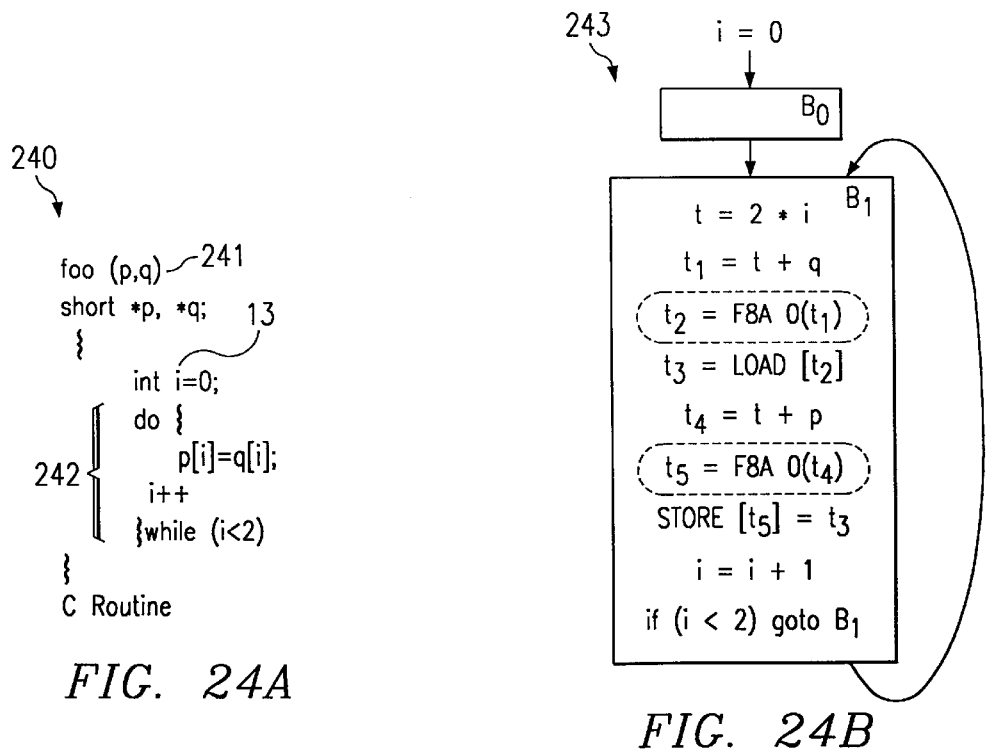
FIG. 24A
FIG. 24B

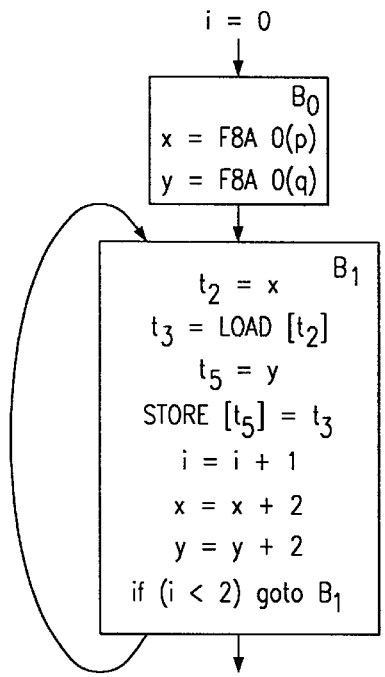
FIG. 25A
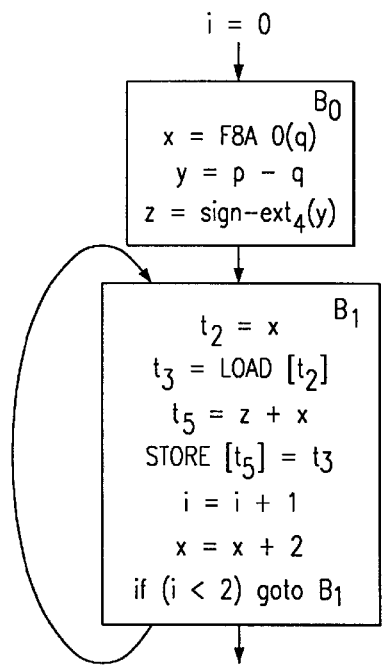
FIG. 25B
SUPPOSE p = ???? 0000
q = ???? 1100 ON ENTRY
|   | i = 0 | i = 1 |   |
|---|---|---|---|
| t | 0000 0000 | 0000 0010 |   |
| $t_1$ | ???? 1100 | ???? 1110 |   |
| $t_2$ | 1100 1100 | 1100 1110 | & q [i] |
| $t_4$ | ???? 0000 | ???? 0010 |   |
| $t_5$ | 0000 0000 | 0000 0010 | & p [i] |
FIG. 26A
x: 1100 1100
y: ???? 0100
z: 0000 0100
|   | i = 0 | i = 1 |
|---|---|---|
| $t_2$ | 1100 1100 | 1100 1110 |
| $t_5$ | 1101 0000 | 1101 0010 |
FIG. 26B 270
241 ~ foo (p,d)
int *p,d;    13
{
    int i=0;
    do {
        p[i+d]=0;
    }while (i<10)
}
C Routine
*FIG. 27A*
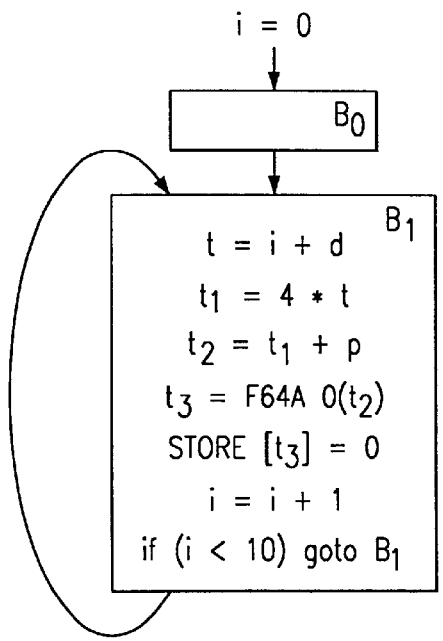
*FIG. 27B*
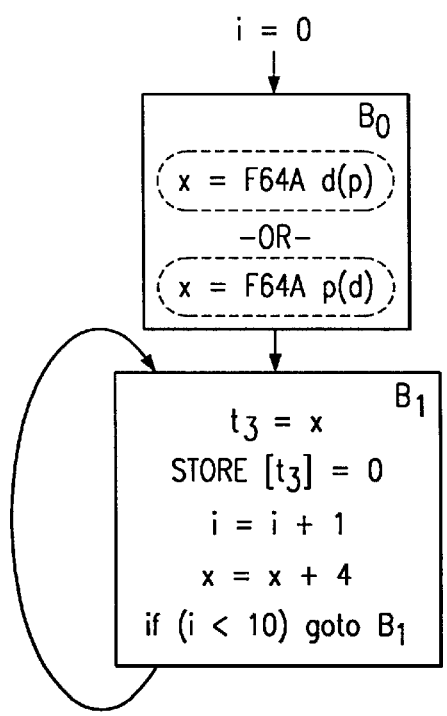
*FIG. 27C*
280
if (i < 10) {
    j = i - 1;
    k = j * 2;
}
... k ...
ORIGINAL C SOURCE
CODE FRAGMENT
*FIG. 28A*

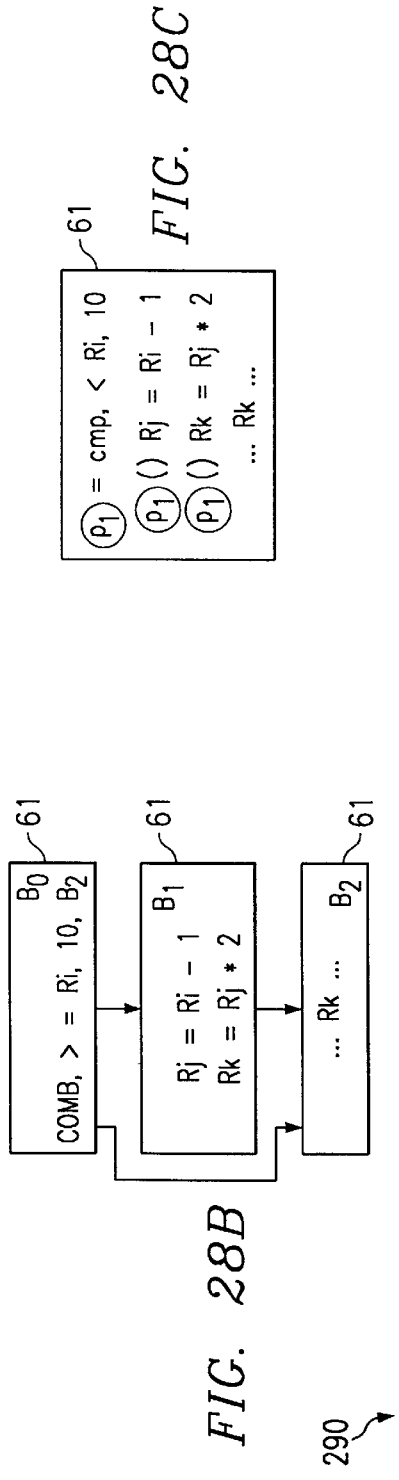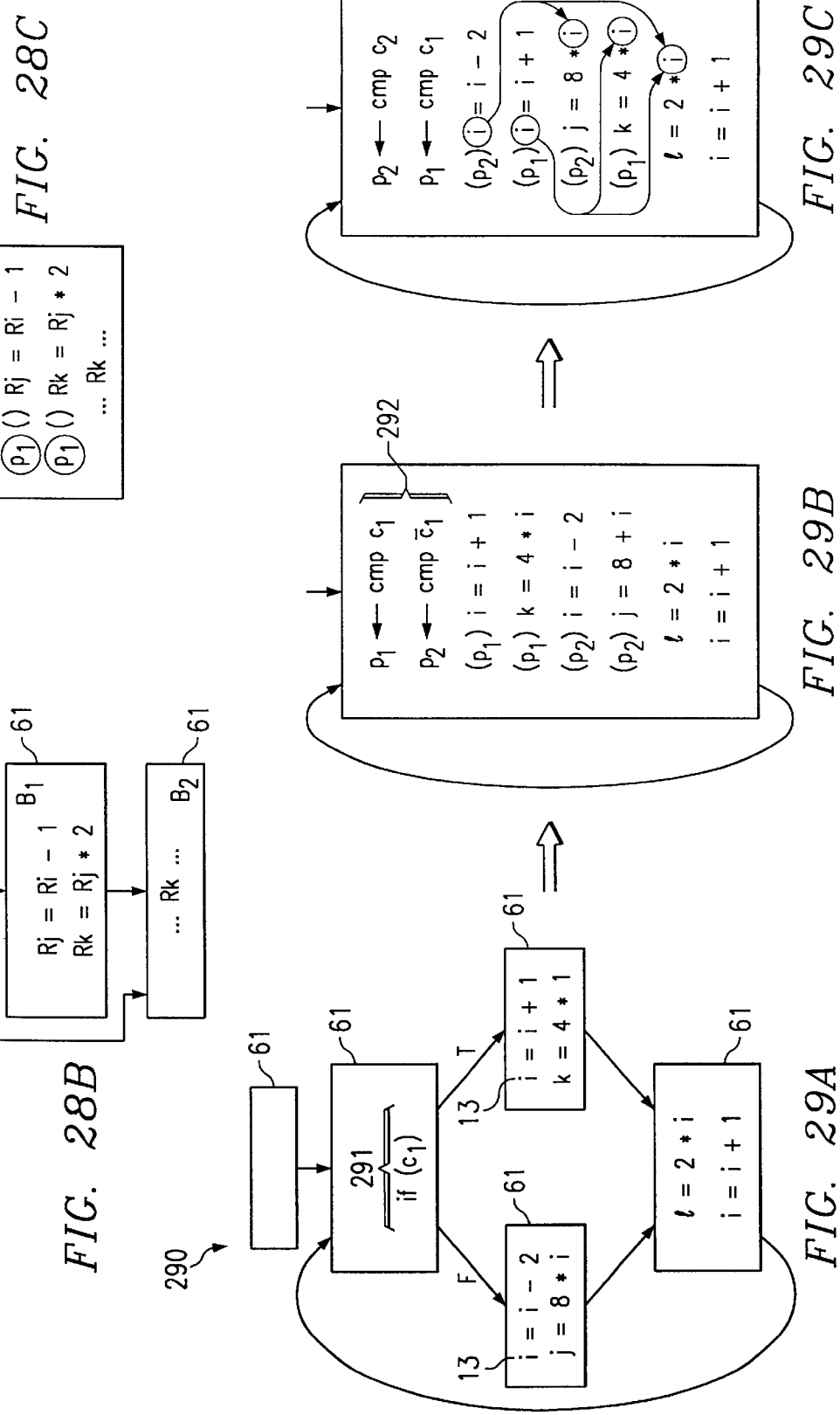

```
300
241 ~ foo (int *p)
      {
          int i;
          for (i=0; i<10; i++)
          {
              p[i]=i+5;
          }
      }
```
*FIG. 30A*
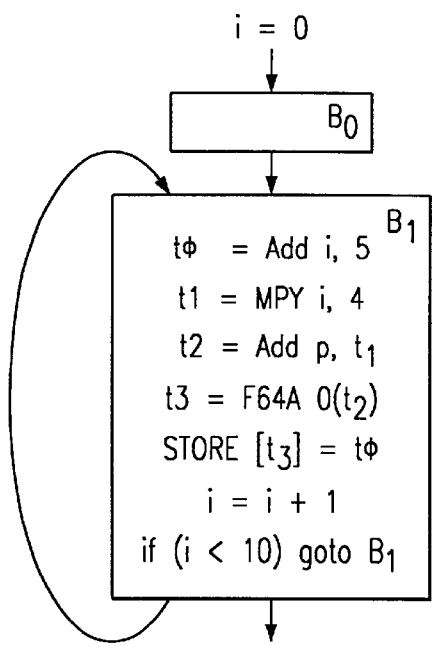
*FIG. 30B*
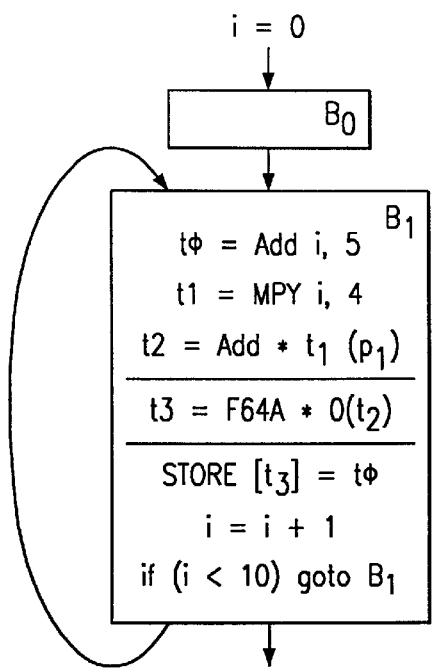
*FIG. 30C*

FIG. 33A
```
x=1;
if(cond) {
    x=2;
}
...x...
```
↗
330
FIG. 33B
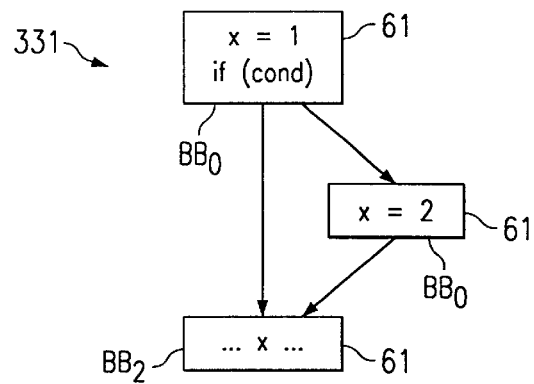
FIG. 33C
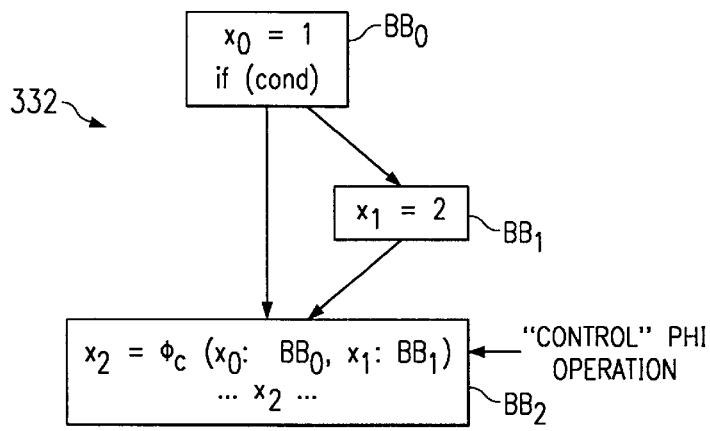
FIG. 33D
PREDICATED
CODE SEQUENCE
```
x = 1
p = cmp cond
(p?) x = 2
... x ...
```
FIG. 33E
PREDICATED CODE
SEQUENCE IN SSA FORM
$(p_T?)\ x_0 = 1$
$(p_T?)\ p_0 = $ cmp cond
$(p_0?)\ x_1 = 2$
$(p_T?)\ x_2 = \phi_P(x_0: p_T,\ x_1: p_0)$
― ― ― ― ― ― ― ― ― ― ―
$...\ x_2$
← PREDICATE PHI OPERATION

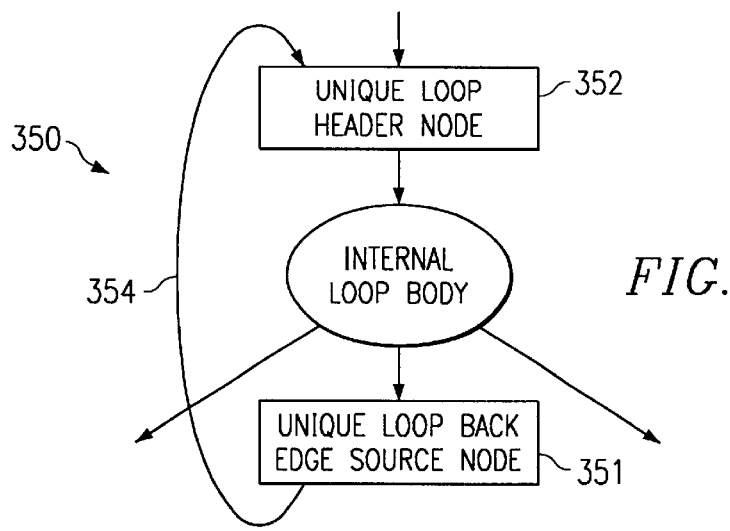
FIG. 35A
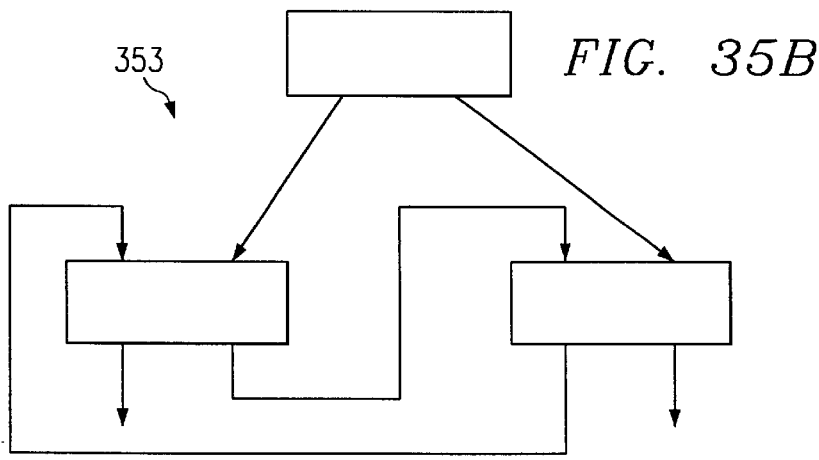
FIG. 35B
FIG. 36
<u>INDUCTION VARIABLES</u>
$IV_1 = IV_2$
$IV = IV + RC$
$IV = IV - RC$
$IV = \phi_c (x_1, x_2 \ldots x_n)$
$IV = \phi_p (x_1, x_2 \ldots x_n)$
WHERE x IS EITHER AN IV OR RC

FIG. 37
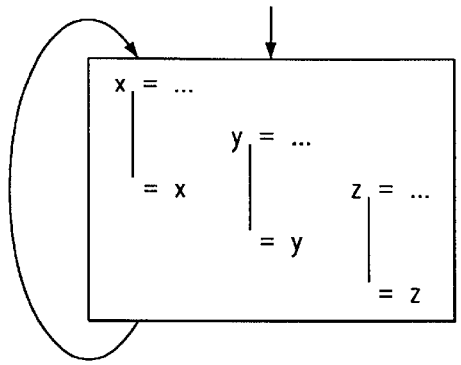
FIG. 38
```
int A[10] [10], k;
foo (p)                    380
int *p;
{
   int i, j, l, m, n;
   l=5;
   m=k+l;
   i=0;
   for (i=0; i<10; i++)
   {
      n=4*i+l;
      j=i+m;
      p[i*10]=n+A[j] [2];
   }
}
```
FIG. 39
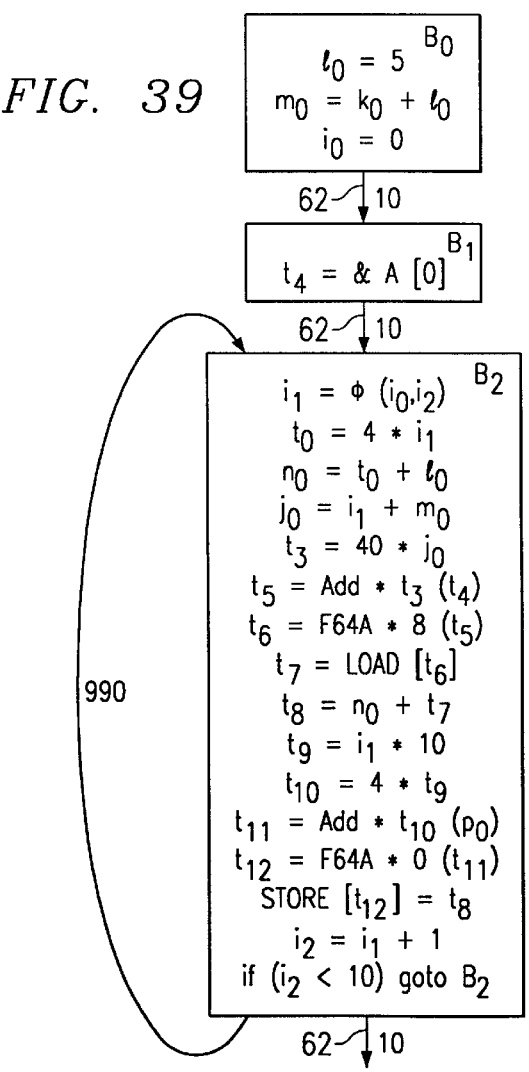
390
$RC = \{p_0, m_0, l_0, t_4, i_0\}$ — 391
$IV = \{i_1, j_0, i_2\}$ — 392
$BIV = \{i_1, i_2\}$ — 393
$BIVG = \{i_1, i_2\}$ — 394
BIVG IS AN ORDINARY INTEGER BIVG $$IX\ (p_0) = (\_,\ \_,\ F) * \_ + (\_,\ p^0,\ F)$$
$$IX\ (m_0) = (\_,\ \_,\ F) * \_ + (\_,\ k_0 + 5,\ F)$$
$$IX\ (\ell_0) = (\_,\ \_,\ F) * \_ + (\_,\ 5,\ F)$$
$$IX\ (i_0) = (\_,\ \_,\ F) * \_ + (\_,\ 0,\ F)$$
$$IX\ (t_4) = (\_,\ \_,\ F) * \_ + (\_,\ \&A[0],\ F)$$
$$IX\ (i_1) = (\_,\ 1,\ F) * i_1 + (\_,\ 0,\ F)$$
$$IX\ (t_0) = (\_,\ 4,\ F) * i_1 + (\_,\ 0,\ F)$$
$$IX\ (n_0) = (\_,\ 4,\ F) * i_1 + (\_,\ 5,\ F)$$
$$IX\ (j_0) = (\_,\ 1,\ F) * i_1 + (\_,\ k_0 + 5,\ F)$$
$$IX\ (t_3) = (\_,\ 40,\ F) * i_1 + (\_,\ 200 + 40k,\ F)$$
$$IX\ (t_5) = (\_,\ 40,\ F) * i_1 + (200 + 40k,\ \&A[0],\ F)$$
$$IX\ (t_6) = (\_,\ 40,\ T) * i_1 + (208 + 40k,\ \&A[0],\ T)$$
$$IX\ (t_7)\ \text{is not well formed}$$
$$IX\ (t_8)\ \text{is not well formed}$$
$$IX\ (t_9) = (\_,\ 10,\ F) * i_1 + (\_,\ 0,\ F)$$
$$IX\ (t_{10}) = (\_,\ 40,\ F) * i_1 + (\_,\ 0,\ F)$$
$$IX\ (t_{11}) = (\_,\ 40,\ F) * i_1 + (0,\ p_0,\ F)$$
$$IX\ (t_{12}) = (\_,\ 40,\ T) * i_1 + (0,\ p_0,\ T)$$
$$IX\ (i_2) = (\_,\ 1,\ F) * i_1 + (\_,\ 1,\ F)$$

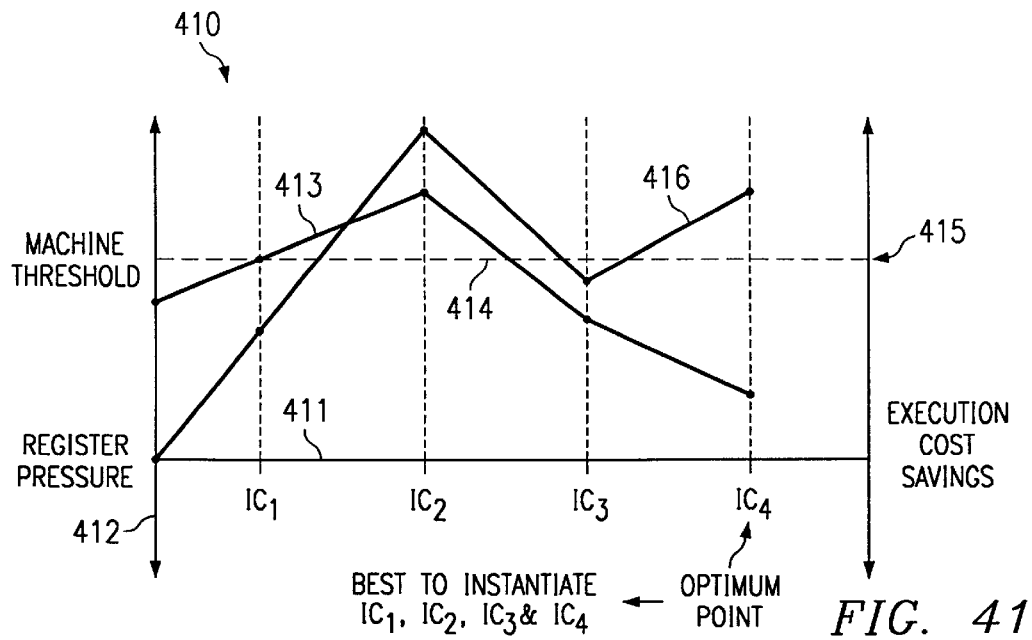

*FIG. 41*

COST-SENSITIVE SSA-BASED STRENGTH REDUCTION ALGORITHM FOR A MACHINE WITH PREDICATION SUPPORT AND SEGMENTED ADDRESSES

TECHNICAL FIELD OF THE INVENTION

This invention relates generally to compiler optimization techniques, and more specifically to a compiler optimization algorithm that deals with aggressive strength reduction of integer machine instructions found in loops.

BACKGROUND OF THE INVENTION

Typically, compiler strength reduction algorithms focus on integer address computations within loops that can be expressed as a simple linear function of a loop induction variable.

Prior approaches to strength reduction have generally adopted one of the following techniques:

a. Simple bit-vector based data-flow analysis to identify induction variables and region constants within loops, followed by identification of simple inductive multiplications within loops and replacement of those multiplications with temporaries that are updated within loop bodies in parallel with updates to the induction variable. See, Aho, et al. "Induction Variables and Reduction in Strength".

The drawbacks of this approach are that:

the bit-vector data-flow analysis precludes deep analysis of region constants used in strength reduction candidate expressions profitability issues are not considered reassociation opportunities are not exploited machine-specific issues (specifically, predication and segmented address computations) are not considered.

b. Simple bit-vector based data-flow analysis to identify induction variables and region constants within loops, followed by symbolic analysis of strength reduction candidate address expressions within loops and replacement of those expressions with temporaries that are updated within loop bodies in parallel with updates to the induction variable. Vatsa Santhanam, HP Journal 1992, "Register Reassociation in PA-RISC Compilers".

The drawbacks of this approach are that:

the bit-vector data-flow analysis precludes deep analysis of region constants used in strength reduction candidate expressions profitability in terms of optimal placement of temporary updates is not considered strength reduction and reassociation are not applied to expressions that do not compute an address value machine-specific issues (specifically, predication and segmented address computations) are not considered.

c. SSA-based data-flow analysis to identify induction variables and region constants within loops, followed by symbolic analysis of strength reduction candidate address expressions within loops and replacement of those expressions with temporaries that are updated within loop bodies in parallel with updates to the induction variable. P. Markstein, et al., December 1992 "Strength Reduction chapter of an unpublished text book on program optimization".

The drawbacks of this approach are that:

profitability in terms of optimal placement of temporary updates, net path-length reduction and register pressure are not considered machine-specific issues (specifically, predication and segmented address computations) are not considered.

only computations that are involved in computing address values are strength reduced.

d. A PRE-based data-flow analysis of arbitrary control-flow structures to identify multiplications that can be reduced in strength by replacement with temporaries that are updated at optimal points in the flow-graph to preserve the multiplication result.

The drawbacks of this approach are that:

reassociation opportunities are not exploited machine-specific issues (specifically, predication and segmented address computations) are not considered.

Often the strength reduction algorithm, and notably the reassociation transformation, is applied only to integer expressions that compute the address used by a memory access instruction. Moreover, strength reduction algorithms typically do not factor in the profitability of the code transformations in terms of register pressure impact and net path-length reduction within loop bodies.

An architecture that supports "Predication" is Ron Cytron, et al., entitled "Efficiently Computing Static Single Assignment Form and the Control Dependence Graph", poses some new challenges with regard to identifying and exploiting strength reduction opportunities within loop bodies. In particular, machine instructions that either update loop induction variables or are themselves candidates for strength reduction may be guarded by predicate registers. This poses a complication for strength reduction algorithms. In addition, on a 64-bit segmented architecture, the result of 32-bit address computations need to be converted into a 64-bit address value through an explicit conversion. Strength reduction of such address conversion operations can be quite important to achieve high performance within integer loops, but requires careful analysis to avoid compromising correctness—particularly in the presence of pointer values that may refer to different "segments".

FIG. 1 illustrates at a very high level the strength reduction transformation. The strength reduction transformation is an algorithm that is typically implemented in an optimizing compiler that is focused on code that executes within loops. The basic idea behind the strength reduction algorithm is to look for expensive multiply operations within the loop involving a pair of terms, wherein one of which does not vary during the course of the loop's execution, and the other of which, happens to be a variable that progresses through a linear sequence of values as the loop iterates. The goal of strength reduction is to identify such multiplications and replace them by cheaper operations, namely additions. This will allow for the loop to execute faster on processors, because multiply operations are generally more expensive than addition operations.

FIG. 1A depicts a code fragment of a high-level C source program 10. There is a variable called g 11 of type "int". It is an integer typed variable and is global in scope, in that it is declared outside the function main. Main 12 is a procedure function that is the routine where a program execution typically starts in a C program. Inside of this function main, there is a local variable i 13 declared to be an integer, and a loop 14 whose execution is controlled by the variable i, whereby i is assigned the value 0 by the for statement before entering the loop, and it is incremented by 1 each time through the loop, as indicated by the i++ expression at the end of that for statement. At the end of each iteration of the loop, i is checked to determine whether i is less than 10, as shown by the condition between the two semi-colons in the for statement. If that condition happens to be true, then execution of the loop is continued.

In other words, this for loop iterates ten times, where i assumes the value 0–9 in steps of 1, and when i reaches 10, then execution of the loop is terminated and the code that follows the for loop is executed. Now inside the for loop, there is an assignment to the global variable g of the expression 20*i+5 15. Thus, on the first iteration when i is 0, g would get the value 5, and the next iteration 25, and so forth. Therefore, there is an expensive multiply operation namely, 20*i; the 20 is a value that remains unchanged through the course of the loop's execution, and i is a variable that is incremented in steps of 1.

So there is strength reduction opportunity in this code fragment 10, and FIG. 1B illustrates how the strength reduction transformation, that is the compiler algorithm that performs this transformation, would effectively optimize this program. Specifically, the for loop is strength reduced so that the multiply operation is transformed into a loop that involves only additions.

FIG. 1B shows that the compiler effectively has created a new variable, a temporary variable called t 16 of type integer, and assigned it the value 5 outside of this loop. Thus, the temporary variable is initialized to 5, and the assignment to g that involved the multiplication of 20 with i and the addition of 5, has just been replaced with a simple assignment to g of t 17. The compiler has also generated code to increment the temporary variable t at the end of the for loop by 20 18. Thus, there is no multiplication inside the loop body, instead, there is an addition, namely t is equal to t+20. Therefore, the variable g will be assigned the same values as in the original program, that is, in the first iteration g gets the value 5, and in the second iteration it will get 25, and so on and so forth. It will progress on until in the final iteration where g will have the value 185, and the " . . . g . . . " notation after the for loop indicates that there is a use of g outside the loop that would receive the value 185 in both cases.

FIG. 2 illustrates the general structure of a typical compilation environment 20 wherein there are multiple source files 21 that comprise a program written by some user in some high level language. Each file is processed by the compiler 22 into an object file 23, which typically consists of a sequence of machine instructions that are the result of translating the high level source statements in the source file. These object files are then processed by a linker program 24, which combines the different object files and produces an executable program 26. The executable program is then eligible for direct execution on a computer 27. Thus, the program reads some input 25 and does some processing on it and generates some output. The strength reduction algorithm is typically implemented as part of the compiler program shown in FIG. 2.

FIG. 3 depicts a view of the internal structure of optimizing version of the compiler 22 of FIG. 2. This type of compiler not only translates source files into object files 23, but also attempts to improve the run time performance of the object file created. The compiler begins with the source file 21. The source file is read in and checked for syntax errors or semantic errors by a component of the compiler known as the front end 31. And assuming that there are no errors, the compilation proceeds with the front end 31 generating a high level intermediate representation 32. This representation is an internal abbreviated description of the source file that in many optimizing compilers, is digested optionally by a high level optimizer 33 that attempts to improve the structure of that high level intermediate representation and thereby increase run-time performance.

The high level optimizer performs transformations that would allow the code to be executed faster when the code is subsequently processed by other down stream phases of the compiler. The high level intermediate representation is converted into a low level intermediate representation 35 that is much closer to the sequence of instructions that a computer would actually be able to execute. The conversion process is carried out by a code generator 34. The low level intermediate representation is optionally subject to optimization by a low level optimizer 36 and once that is done, the final step involves generating the object file 23, which is typically done by the very back end of the compiler or object file generator 37.

FIG. 4 depicts the internal structure of a typical low level optimizer 36 that was shown in FIG. 3. The optimizer begins with the unoptimized low level intermediate representation 35 for each procedure being compiled and generates the optimized low level intermediate representation 40 for each procedure. The main phases that comprise the low level optimizer are shown in FIG. 4. The first phase is the control flow analysis phase 41, and the task of this phase is to create a graph representation of the low level intermediate representation, where the nodes of the graph are referred to as basic blocks. These blocks are sequences of instructions or low level intermediate operations that are to be executed without a change in the control flow. The edges of the control flow graph would correspond to possible transfers of control between the nodes, depending on conditional checks. For instance, an if statement in the program would correspond to a basic block that is terminated with control flow edges to the then clause and the else clause.

The second phase is the local optimization phase 42, which focuses on the individual nodes of the control flow graph, that is the individual basic blocks or stretches of instructions without intervening breaks in control flow. This is the scope of the local optimizer and the kinds of code transformations that are performed are simple things like recognizing duplicate computations and eliminating such redundancies. Another example is constant propagation. Operations involving register values are replaced, where possible, with operations involving constant values.

The third phase is interval analysis 43, where the task is to recognize the loop structure of the procedure that is being compiled. For example, in FIG. 1A, there was a loop 14 in the program, and the interval analysis phase 43 would recognize that there is a repetitive control flow structure that may involve multiple basic blocks, which constitute a loop. This is discussed further with regards to the description of FIG. 6.

The fourth phase is global data flow analysis 44, which determines how data values that are computed in the different basic blocks flow from one basic block to the other when a procedure in a global sense. So for instance, if the value 10 is computed and assigned to a variable i in basic block 1, the analysis determines whether the value assigned to the variable i propagates onto other basic blocks downstream from basic block 1 in the control flow graph. This phase also determines how data is transmitted through the different edges in the control flow graph. That is critical for many global optimization phases 45. Most global optimization phases rely on preceding global data flow analysis, and in the global optimization phase several classic optimizations take place, such as global constant propagation or global common sub-expression elimination.

The sixth phase is the loop optimizations 46, which is described in FIG. 5. As the name implies, these optimizations are focused on improving the performance of loops. That is, instructions that are found within loop structures identified by the earlier interval analysis phase are transformed by the phase.

The remaining phases illustrated in FIG. 4 are typical of most modern optimizing compilers. Next is a global instruction scheduling phase 47 that reorders instructions to improve hardware pipeline efficiency as the program executes on the hardware. After that is a register allocation phase 48 that assigns physical registers to different virtual register resources in the program. For instance, if there is a variable i that is declared in a source level program, the register allocator may decide to maintain the variable i in register R20 and it may decide to maintain another variable j in register R15. These are the typical kinds of decisions made by the register allocator. Register allocation is a necessary step in order to get a functional object file. Finally, the post register allocation optimization phase 49 includes sundry things like peephole optimizations and local instruction scheduling.

Thus, one of the classic optimization phases in a low level optimizer is a loop optimization phase that incorporates a strength reduction algorithm. FIG. 5 depicts the loop optimization phase 46 of FIG. 4 and illustrates the typical subphases of the loop optimization phase. This phase begins with unoptimized intermediate code 50 and performs region constant identification 51, followed by loop invariant code motion 52, induction variable analysis 53, strength reduction candidate identification 54, strength reduction application 55, linear function test replacement 56, and finally, dead code elimination 57 to produce optimized intermediate code 58.

Steps 51–56, are repeated for each loop that occurs in the source procedure, where each loop is considered in an order that reflects the reverse of the loop nesting order. In other words, the inner nested loops are optimized before the outer loops. The reason for this progression is to expose any code that migrates out of inner loops to outer loops for additional optimization opportunities in outer loops.

FIG. 6 depicts a portion of the control flow graph 60 that corresponds to a loop. The rectangles or squares denote the basic blocks 61, which are sequences of operations without breaks of control flow. Instructions in a basic block typically are executed sequentially, one after the other without any interruption. These basic blocks are a compiler internal data structure to help analyze the code stream, and the hardware does not perceive their existence. The edges 62 between the basic blocks represent possible transfers of control flow between different basic blocks.

Basic block B1 of FIG. 6 has a sequence of instructions that is terminated by an if check 63 that may correspond directly to a source level if statement 64. And depending on the outcome of that conditional evaluation, i.e. whether the if condition evaluates to true or false, control may transfer either to basic block B2 or basic block B3. These possible transfers of control flow are what is reflected in the edges that connect the basic blocks.

FIG. 6 includes a loop or a repeated executed control flow construct 14. The loop involves three basic blocks: B1, B2, and B3. Initially, the variable i 13 is assigned the value 0 outside of the loop, before basic block B0. As this loop is entered, some operations are performed in basic block B1, and the if test determines whether the instructions in B2 or the instructions in basic block B3 will be executed. In basic block B3, the variable i is incremented by one and if the variable i is not equal to 10, then the operation jumps back to basic block B1, and the instructions are executed again. Thus, the loop consisting of basic blocks B1, B2, and B3 are executed multiple times. In fact, this loop will iterate ten times, and the value of the variable i will progress from 0 through 9, until it reaches 10, ultimately in basic block B3, and at which point, the loop, is exited without going go back to basic block B1.

The basic block B0, which appears before the loop body of basic blocks, B1, B2, and B3, is typically referred to as a loop preheader basic block. This block is artificially created by the compiler to assist in further loop optimizations. In particular, when instructions are moved out of loop bodies, they are moved into a loop preheader. Basic block B3 is referred to as the loop back edge source basic block. This is the basic block from which the edge that causes the execution to repeat emanates. The arrow that goes from B3 to B1 is the back edge of the loop 67. Loops are distinguished by a unique back edge. Basic block B1 is the first basic block in the loop body, and is executed when the loop is entered from the preheader, and thus, is referred to as a loop header basic block.

The variable i as previously discussed, is incremented in steps of one each time through the loop. Because this variable progresses through such a regular progression of values, it is referred to as an induction variable. Meaning, that there is an inductive relationship from the value of the variable in one iteration to the value of the variable in the next iteration. Each value induces a new value in the next iteration of the loop. Actually, there is more than one induction variable in this loop: variable j 65, which is assigned the value i+2 in basic block B1, is also an induction variable, because it is just offset from the variable i by 2. So, if i goes through a linear progression, so does j, and therefore j is an induction variable as well.

In basic block B1, the second instruction, which is an assignment to l 66 of k*j, involves a multiplication. The variable k 69, on the right hand side of that assignment, refers to a value that is assigned outside of the loop body, and k is not modified within the loop body. In other words, k remains at the value that it had before the loop body was entered. Thus, within the context of this loop, it is effectively unchanging. Variables of this nature are called region constants (RCs). Simple constants like the numbers 2 and 3 that appear in the loop body are also region constants, in that they do not vary within the loop.

The value of 3+3 computed by the third instruction in basic block B1, and assigned to m 68 is a strength reduction candidate. The instruction l equals k*j, is also a strength reduction candidate, but a better candidate in this example is the assignment of m. Variables i and j are both induction variables. Variable i is a special kind of induction variable, called a basic induction variable (BIV), because it has a value that is assigned to it outside the loop, which is then incremented within the loop. Variable j is first assigned within the loop. It does not have a value (and may not even be defined) before the loop body is entered. Thus, variable j is a secondary induction variable that is derived from the basic induction variable, in this case by adding 2. So, basic induction variables are variables that may give rise to other secondary induction variables.

FIG. 7 is a chart 70 depicting the progression of the key variables in the loop of FIG. 6, in particular, the values of the four variables, i 13, j 65, l 66, and m 68, relative to basic block B1. So as the loop iterates, variable i progresses from 0 through 9, in steps of one. Variable j progresses from 2 to 11 in steps of one. Variable l, which tracks k*j, progresses in steps of k 69, starting with 2*k, and moving up to 11*k, and variable m progresses from 2k+3, and assumes the values 3k+3, 4k+3 to the final value of 11k+3.

As mentioned earlier, the value assigned to m is a good strength reduction candidate. FIG. 8 depicts the structure of the expanded expression for the variable m of FIG. 6, which is called an induction expression 80. An induction expression (IX) can be represented as some unchanging value, multiplied by a basic induction variable (BIV), plus some other unchanging value. In examining the values assumed by the variable m, a pattern can be perceived. The pattern can be expressed by the induction expression, k*i+2k+3. If the values of i 13 for each iteration of the loop, i.e 0 to 9, are inserted into the induction expression, then the induction expression evaluates to the values that are assigned to the variable m on each loop iteration. This is a classic induction expression, and has a basic induction variable (BIV) (here variable i) that is multiplied by a loop invariant coefficient, which is called the BIV coefficient (here the simple variable k 69). The BIV coefficient could in general be an arbitrary polynomial that involves only region constants (RC). And to the product of the BIV and the BIV coefficient, another loop unchanging value is added, in this case, 2*k+3, and this is referred to as the addend 81 of the induction expression.

The strength reduction algorithm focuses on induction expressions that occur inside of loops, and strength reduces them. FIG. 9 depicts the strength reduction transformation 90 as it pertains to the example in FIG. 6. Thus, in strength reducing the induction expression k*i+2k+3, when i 13 has the value 0, that is, when it is assigned the value 0 outside of the loop, the value computed by the induction expression is 2k+3 81. The variable that is used to maintain the value of the strength reduced induction expression is called a strength reduction temporary variable, which is shown as $t_1$ 91 in FIG. 9. This strength reduction temporary variable $t_1$ is incremented by k 69, corresponding to each time the original basic induction variable i is incremented by 1. In general, the strength reduction temporary variable is incremented by the basic induction variable increment multiplied by the BIV coefficient of the induction expression. Thus, this is how the strength reduction transformation is applied to the example in FIG. 6.

Once the strength reduction has been performed, another optimization opportunity called linear function test replacement arises. This involves replacing conditional checks involving the induction variable in the loop by equivalent checks involving strength reduced temporary variables. For instance, in the loop of FIG. 6, the final conditional instruction (if i not equal to 10, then return to basic block B1) can be recast to be an if check on the strength reduced temporary variable $t_1$ of the form, if $t_1$ is not equal to $t_2$ 92, go to B1. The variable $t_2$ is a new temporary variable that is created and initialized to the value of 12k+3, which corresponds to i=10. Therefore, the execution count of the loop governed by the original if statement, if i not equal to 10, go to B1, remains the same when expressed as if $t_1$ not equal to $t_2$, go to B1. By performing this transformation, all uses of the original basic induction variable are removed, and hence more instructions may be eliminated from within the loop.

FIG. 10 depicts the results of applying strength reduction and the linear function test replacement transformations on the loop shown in FIG. 6. As shown in FIG. 10, m 68 is assigned the value of $t_1$ 91, the strength reduced temporary variable. $t_1$ as shown in FIG. 9, is initialized to the value 2k+3 outside the loop 14, and this is done by inserting the initialization in the loop preheader block. Where i 13 was being incremented by 1, the strength reduction temporary variable $t_1$ is incremented by k 69, and this is shown in block B3. FIG. 10 also illustrates the results of the linear function test replacement. The if check that was at the bottom of basic block B3, is now expressed in terms of an if check 101 between the strength reduction temporary variable $t_1$ and a new temporary variable $t_2$, that is initialized to 12k+3 in the loop preheader B0. Since the value $t_2$ does not change in the loop, it is also a region constant.

The advantage of performing these two transformations is that it allows the elimination of some instructions from the loop. In FIG. 10, the instructions that are used to compute j 68 and l 71, are now no longer needed in the loop 65 because where they were originally being used to assign a value, which is being assigned the value of m 72, now a different variable is being assigned, the strength reduction temporary variable, $t_1$ 91. Thus, there are no more uses for the computation of l 71 and j 68, and so these are dead instructions, and can therefore, be altogether eliminated or removed from the loop body 65. Effectively, the strength reduction transformation 100 has eliminated the multiply operation, specifically the multiplication of k*j, and replaced it with an addition operation in basic block B3 61. Also note that an addition operation can been eliminated as well, as the assignment to j 68 has also been eliminated. The linear function test replacement allows the elimination of the increment of the variable i 66. Had this replacement not been performed, the increment of i 66 in basic block B3 61 would have had to be retained because it would have been used in the if check 63. By performing this linear function test replacement, the last remaining real use of i 66 has been eliminated.

FIG. 11 illustrates a loop 14, with basic blocks 61 and edges 62 that relate to the loop, wherein the edges of this control flow graph 60 are annotated with expected execution frequencies. The annotated numbers indicate how often each block is executed during a typical run of the program. From this information, the profitability of the strength reduction transformation can be determined. In this example, the loop is entered ten times and control passes through the loop preheader block B0 and into the loop header block B1 ten times. B6 is the back edge source basic block of this loop, and assume that in this example, it is terminated by an if check that causes this loop to iterate on average 99 times. So if this loop is entered ten times, then control is going to be transferred from basic block B6 to B1, 990 times (99 time for each entry into the loop). Therefore, basic block B1 effectively is going to execute 1,000 times, 10 times when it is entered from within the loop, and 990 times when it is executed by jumping to it from basic block B6.

Basic block B1 is terminated by an if check where, for instance, the if condition is such that 5 times out of a 1,000 control is transferred on to basic block B3, and 995 times, the remaining times, control is transferred to B2. The code in their respected blocks is executed in their respective blocks and control is transferred to a common basic block B4, which again is executed 1,000 times like B1. B4 terminated by an if check, where this if condition causes control to be transferred 600 times to basic block B5 and the remaining 400 times directly to B6. B6 is going to be executing 1,000 times again, and because the loop was entered ten times, the loop must exit ten times.

Assume that this loop body contains a strength reduction candidate induction expression, shown here in basic block B3, as 100* i+20. Also, assume that there is a basic induction variable which is updated at points within the loop body, shown here in basic block B5 and B6. In both cases, the variable is incremented by a region constant amount, either by 1 in B6 or by the variable k 69 in B5. k is assigned a value outside the loop body and remains unchanged throughout this loop body. Thus, strength reducing the induction expression in B3 would result in the loop 14 as shown in FIG. 12.

In FIG. 12 the strength reduced induction expression has been replaced with a strength reduction temporary variable, $t_1$ 91, which is initialized to the value 20 in the preheader. This is because originally the basic induction variable, i, started with the value 0 and so the expression 100* i+20 should effectively start with the value 20. At each of the two places in the loop body 14 where the induction variable is incremented, B5 61 and B6 61, $t_1$ is incremented correspondingly by a scaled amount. So, in B6 where i is being incremented by one, $t_1$ is incremented by 100, because that is the scale factor of the BIV coefficient multiplied by the BIV increment amount. In basic block B5 61, the variable $t_1$ 91 is incremented by $t_2$ 92, a region constant value. As shown in basic block B0 61, the preheader block, $t_2$ 92 is initialized to the value 100 times k 69 and remains invariant throughout the loop. Now, let us see whether this transformation is, in fact, profitable in terms of realizing an actual run-time performance benefit.

Assume that the annotations on the edges correspond to the typical execution frequencies of these control flow transfers. FIGS. 13A and 13B indicate the relative performance costs 130 both before and after the strength reduction transformation, respectively. Let it be assumed that a multiplication operation costs some number of cycles on the hardware, called multiply cost 131 which, for example may be four processor clock cycles. Assume that an addition operation costs some number of cycles on the hardware, called add cost 132, which for example may be one processor clock cycle. The cost of an induction expression computed in B3 can be represented as the execution frequency of basic block B3, multiplied by the sum of those two costs. Given that the execution frequency of the incoming arc was 5, since the induction expression in B3 involves both a multiply and an add, the total cost 133 is equal to 25 cycles over the entire execution of this loop, as shown in FIG. 13A. Now let us compare the 25 cycles worth of time that the induction expression evaluation would have taken to the time required to execute the strength reduced code.

As a result of strength reduction, new instructions have been inserted to basic block B0, basic block B5, and basic block B6. In basic block B0, a multiply and a simple assignment was added, which is typically accomplished through a copy operation in most hardware, which has an associated cost called copy cost 134 and is presumed to be one processor clock cycle. In B5 and B6, an addition has been inserted into each basic block. The time that the hardware will take to execute these instructions in these various basic blocks, thus equals B0's execution frequency times the sum of the multiply and copy costs, plus the B5 execution frequency times the addition cost 132, plus B6's execution frequency times the addition cost 132. Assuming that the cost of performing an add operation, is only one machine clock cycle, then given the execution frequencies that are annotated on the edges of the control flow graph, the total cost 133 for the transformed loop is 1,641 cycles. Thus, it takes 1,641 cycles to execute the new instructions that are introduced as a result of strength reduction. So, while strength reduction saved the computation of the induction expression and therefore, the 25 cycles, the reduced loop forces the hardware to spend far more cycles executed. Therefore, this illustrates that the strength reduction transformation can, in fact, be very unprofitable. The net impact of strength reduction for this example has been an increase in the loop execution time of 1,616 cycles.

There is also another impact on this loop as a result of the strength reduction transformation. In reviewing FIG. 12, it can clearly be seen that two new variables have been introduced in order to carry out the strength reduction transformation, $t_1$ 91 and $t_2$ 92. $t_1$ is the strength reduced temporary variable, and $t_2$ is the increment amount for the temporary variable that is used in B5. Now, these two variables will need to live in registers, and the register allocator will have to assign two distinct registers. Thus, two new registers need to be dedicated, at least in the context of this loop to hold the values of $t_1$ and $t_2$. This means that the register pressure within the loop has increased by two registers. Specifically, if the source program was being complied for a machine that has a limited number of registers, this increase in the register pressure within the loop, might just exceed the threshold of available registers, causing the introduction of register spill code within the loop. That is, values may need to be transferred back into memory and reloaded from memory as and when they are needed, due to scarcity of register resources. Introducing spill code into the loop is generally unprofitable, because integer computations eliminated by strength reduction (though they may involve multiples and adds) are typically not as expensive as memory operations that are introduced due to spill code. This is because memory operations entail cache accesses that can take multiple cycles, or if the data is not available in the cache, in multiples of tens of cycles. So, in general, spill code is something to be avoided, and thus this is another negative impact of strength reduction for this example. Neither the net cycle count nor the register pressure impact are areas that prior strength reduction algorithms really address.

Static single assignment (SSA) form is a convenient compiler renaming technique, wherein every resource definition site is assigned a unique, internal compiler name, in order to facilitate data flow analysis. There is available literature on static single assignment form, and the seminal paper on this topic is by Rod Cytron, et al, entitled "Efficiently Computing Static Single Assignment Form and the Control Dependence Graph". SSA form facilitates global data flow analysis, which is sort of an underpinning of the strength reduction transformation. In SSA form, in addition to renaming every definition and use of a resource, special $\phi$ operators are introduced at control flow confluence points in the flow graph to merge multiple reaching definitions of the same resource. The main advantage of using the SSA form, is that it is easier to identify reaching definitions of resources at use sites.

In SSA form, basic induction, variables, can be recognized as being chained together in a data flow sense around the loop. FIG. 14A depicts a classic loop not in SSA form 140. There are variables called l 66, i 13, j 65 and k 69 that are referred to in the loop 140, with variable i being a basic induction variable. The variable i begins with the value of 0 and it is incremented in B3 61 within the loop body. There are two assignments to the variable k inside the loop. In Basic Block B1 61, k is assigned the value j+2 and in Basic Block B2 61, k is assigned the value j+4. The variable j, in turn, is assigned some offset from the basic induction variable. Thus, the variable j is a secondary induction variable.

FIG. 14B is the same code as in FIG. 14A, just reexpressed in SSA form 141. New names have been given for each assignment location. For instance, where I was being assigned outside the loop 14, it is now named $l_0$ 142. The new names could be unique identifiers, but for the purposes of illustration, the new names use a numeric subscript. So $l_0$ is the assignment outside the loop to the original variable l, and $i_0$ 143 is assigned the value 0 corresponding to the assignment of 0 to i outside the loop.

The variable k in Basic Blocks B1 61 and B2 61 now have two assignments to the same variable k and in the SSA form, they are renamed to be $k_0$ 144 and $k_1$ 145. The definition of k in Basic Block B1 is now defining $k_0$ and the definition of k 69 in Basic Block B2 is now defining $k_1$. In the original loop, there was a use of the variable k in Basic Block B3, which occurs at the confluence point or merge point of the two control flow transfers from B1 and B2. As mentioned earlier, in the SSA form, this kind of merging of reaching data flow values results in a φ operation 146 being inserted.

The φ operation can be thought of as a switch or a gating operation, where depending on which control flow edge 62 is taken into the merge point, the appropriate renamed incoming definition is used to assign a value to the left hand side of the φ operation. So in B3, for instance, there is a φ operation that merges the value ko from Basic Block B1 with the value of $k_1$ coming out of Basic Block B2. What is created or assigned by the φ operation is the variable $k_2$ 147. Thus, subsequent uses of the original variable k will now refer to the variable named $k_2$. This is the case in Basic Block B3, where a fairly simple φ operation is used to merge the two values coming in from two different basic blocks. Similarly, there is a φ operation in Basic Block B1. In looking at Basic Block B1, there are two incoming arcs to that basic block, one from Basic Block B0 and one from Basic Block B3. Naturally, this gives rise to a φ operation 146 being inserted, in this case for variable i, because there is a definition of variable i that reaches from B0, namely the definition of the variable $i_0$ in SSA form, and there is a definition of variable i that reaches Basic Block B1 61 around from the back edge of the loop 67 from B3. In this example, the φ operation describes a new variable named $i_2$ 148. The definition of variable i in B3 was renamed and called $i_2$. So the φ operation then is merging $i_0$ with $i_2$ in Basic Block B1 and is creating a new variable called $i_1$ 149, so that subsequent uses of the variable i in the loop will refer to the variable $i_1$. In particular, the variable j in basic Block B1 has been renamed to be $j_0$ 157 and it is assigned the value $i_1-1$. Note that $i_1$ is the nearest reaching definition of the variable i, and is defined by the φ operation. This process of renaming variables is applied to all variable definitions whether they are occurring inside loops or outside loops, and the resulting code for the example here is shown in FIG. 14B.

One point to note here is that in the SSA form, the basic induction variable i now has three different names, specifically, the names $i_0$ $i_1$ and $i_2$, each corresponding to the different definition sites. The loop body definition of $i_0$ and $i_2$ comprise a basic induction variable group (BIVG). They are related to each other in that the flow of data values amongst the basic induction variable group members forms a cycle around the back edge of the loop that goes through the loop φ node. For instance, the $i_1$ definition in Basic Block B1, is sourced in the $i_2$ definition in Basic Block B3, which is then in turn sourced back in the same φ definition in basic block B1. Thus, the φ operation in basic block B1 and the increment operation in basic block B3 form a data flow cycle. One is defining a value that the other one needs. This is very typical of basic induction variables in SSA form. $i_1$ and $i_2$ are the basic induction variables that are part of the basic induction variable group (BIVG), and $i_0$ is the initial value of that basic induction variable group.

Beginning with intermediate representation, cast in an SSA form, strength reduction as it would operate on an SSA form would comprise the following steps at a very high level. First, identify the basic induction variable groups, and then identify strength reduction expression candidates. Next, insert new definitions of strength reduction temporary variables that mirror or parallel the definitions of the BIVG members, and then finally replace the strength reduced induction expression computations with the appropriate strength reduction temporary variable name. In FIG. 14B, there are two possible strength reduction induction expression candidates, the value computed into $k_0$ and the value computed into $k_1$. The value assigned to $k_0$ can be expressed as the induction expression $2*i_1,-2$ and the induction expression value assigned to $k_1$ can be expressed as $4*i_1+4*l_0$. Each expression has a BIV, and in this case they both happen to be the same BIV, namely, $i_1$. The BIV is multiplied by the BIV coefficient, which is a region constant. The loop invariant addends for the 2 IXs are 2 and $4*l_0$ respectively.

Assume that new strength reduction temporary variables called x and y are introduced for $k_0$ and $k_1$ respectively. The loop of FIG. 14B will be transformed as a result of strength reduction into the code fragment 150 shown in FIG. 15. To preserve the integrity of the SSA form, φ operations 146 have to be introduced for x and y much like the original φ operation for variable i. The assignment to $k_0$ 144 and $k_1$ 145 has been replaced with assignments from $x_1$ 151 and $y_1$ 152 respectively. Where the original BIVG members were being updated, there are corresponding updates to the strength reduction temporary variable x and y, which have also been suitably renamed. So, there are $x_0$ 153 and $y_0$ 154 beginning with some values corresponding to the original BIVG initial value $i_1$ and these assignments are placed in the loop preheader. Where the BIVG member $i_2$ 148 was being assigned $i_1+1$, the definitions of $x_2$ 155 and $y_2$ 156 as $x_1+2$ and $y_1+4$ are inserted respectively.

Because there is now a confluence point for x and y in Basic Block B1, φ operations need to be introduced much like the φ operation originally introduced for i, for merging the values of $x_0$, $x_2$ into $x_1$ as well as merging the values of $y_0$ and $y_2$ into the value $y_1$. What is depicted in FIG. 15 is the result of this strength reduction transformation. The advantage here is two instructions have been rendered dead, namely the assignment to $j_0$ 151 and the assignment to $j_1$ 158, neither of which have any remaining uses. The multiply operations in the loop have been replaced as a result of applying strength reduction.

FIGS. 16A and 16B illustrates further transformations to the loop 14 shown in FIG. 15. In particular, FIG. 16A illustrates the resulting code fragment 160 after dead code elimination (DCE) has been performed, where the instructions assigning $j_0$ and $j_1$ in basic block B1 61 and B2 61 have been eliminated, since they are no longer needed. The SSA form is exited and the variables will return back to the original names. The result of these two steps is shown in FIG. 16A. This is not very different from the strength reduction transformation results shown earlier without the use of the SSA form.

After the program is in the form shown in FIG. 16A, register allocation is performed. This is a process of binding variables to specific hardware register locations. For instance, variable l 66 may be assigned to register R1 161, where there would be an R1 definition outside the loop corresponding to the definition of l. The use of l in the loop preheader, as shown in FIG. 16A, is replaced with the use of R1. Similarly, other corresponding changes would take place for the different variables, for instance, the variable x 165 is assigned R3 162, the variable y 166 is assigned R4 163, the original variable i 13 is assigned to register R2 164 and so on.

There are three main problem issues with the prior art. The first issue with SSA based strength reduction is that sometimes the algorithm tends to insert more instructions to update strength reduction temporary variables than are actually needed.

The second issue with SSA based strength reduction is that previous algorithms focus solely on strength reducing induction expressions that compute memory address values. P. Markstein, et al. "Strength Reduction chapter of an unpublished text book on program optimization", December, 1992. That is values that are used to refer to memory locations accessed by load and store instructions. It ignores other strength reduction opportunities, thus previous SSA-based SR algorithms would have performed the transformations shown in FIGS. 1–16B only if the candidate induction expressions were computing memory addresses that feed into load or store instructions. Strength reduction candidate induction expressions certainly abound in the realm of memory address expressions, but there are induction expressions that are strength reduction candidates that may arise in different contexts that do not necessarily feed directly into a store or load.

Finally, the third issue is that the prior art does not discuss or apply to strength reduction of predicated code. Predication is a hardware feature that will be further described later on.

These issues are further described as follows.

The first issue was strength reduction may insert more instructions into the loop than necessary in order to update temporary variables. FIG. 17A depicts the original code fragment 170 for a loop with an induction variable i 13 which is incremented in two locations, basic block B1 61 and B2 61. The computation of 4*i that is assigned to the variable k 69 in basic block B3 61is a strength reduction candidate. The conversion of the code of FIG. 17A into SSA form results in variables being renamed as shown in FIG. 17B, where it can be noted that a couple of φ's 146 have been introduced for the original basic induction variable, one at basic block B1 61 and the other at basic block B4 61, because values of the renamed instances of the induction variable are being merged both at B1 and at B4. B4 is a merge point between B2 61 and B3 61 whereas B1 is a merge point between B0 61 and B4. The φ in B1 merges the value $i_0$ 143 which is the renamed instance of i as sourced from basic block B0, and $i_4$ 171, which is the value that flows from basic block B4 into basic block B1. Thus, the input operands for this φ are $i_0$ and $i_4$. The φ at B4 emerges the values of $i_3$ 172 from B2 and the value of $i_2$ 148 from B1. Thus, the input operand for this φ are $i_2$ and $i_3$. Note that if control is transferred from B1 to B3 and then on to B4, the basic induction variable i is not incremented, and so the value that is sourced along the B3, B4 edge 62 is in fact the same value that was computed in B1, and that is why the φ in B4 source $i_2$ directly, because that is the reaching definition from the B3 side. Applying strength reduction would result in the code shown in FIG. 17C. A variable x has been introduced along with instructions that update it in parallel with the definitions of $i_1$, $i_2$, $i_3$ and $i_4$. Thus, corresponding to the two φ's 146 for the original base induction variable i, there are two φ's 146 for the strength reduction temporary variable x, one in B1 61 and one in B4 61. Corresponding to the two increment points of the original basic induction variable i, there are two increment points for the variable x suitably renamed. Just as $i_0$ 143 through $i_4$ 171 are names corresponding to the different definition sites for i, there $x_0$ 173 through $x_4$ 174 are names for the strength reduction temporary variable x that has been introduced. The multiplication in B3 has been replaced by a simple assignment of $x_2$ to $k_0$. If control passes from B1 to B2 to B4, what happens is that the strength reduced temporary variable x gets incremented twice. The first time by four in B1, and a second time in B2 by four again. This parallels the two increment points for the original basic induction variable i, but is inefficient, since the strength reduction variable is being incremented twice.

What is preferred is to perform only one increment of the variable x in each of basic block B2 and B3 as shown in FIG. 17D. The inventive method would result the code depicted in FIG. 17D from the example of FIGS. 17A to 17C. This avoids incrementing x multiple times when executing basic block B1 followed by B2 and B4. Thus, the code shown in FIG. 17D executes a single instruction to increment x by eight in B2 if control passes from B1 to B2 to B4 and only executes the increment by four if control passes from B1 to B3 to B4. There is a net dynamic path length savings when taking the left hand limb of that if check, even though there is no saving on the right hand limb. Overall, it is beneficial to generate the code fragment that is shown in FIG. 17D.

This is a feature that the traditional strength reduction algorithm does not perform, but the current invention will perform this optimization. In FIG. 17D there are a few other features that should be mentioned. In FIG. 17C, $k_0$ 144 was assigned $x_2$ 155, but in FIG. 17D, $k_0$ 144 is assigned $x_1$ 151, which is defined by the φ. The initial value of x, namely $x_0$ 173, that is the value sourced basic block B0 61 by the φ in $B_1$, is four instead of zero. This skews the strength reduction temporary variable by four to effect the transformation. This preserves the correctness of the loop, and at the same time, realizes an improvement in the dynamic path line through this loop, especially as it relates to the B1, B2, B4 path. If it turns out that B1, B2, B4 are being executed more frequently than B1, B3, B4, then this could lead to some measurable gains.

The second issue, that SSA based strength reduction algorithm focuses solely on strength reducing induction expressions that compute memory address values, is illustrated in FIGS. 18A–18C. FIG. 18A depicts a C source code 180 listing of routine main 12 where execution typically starts for any C program. Inside this routine, there is a loop coded as a do-while loop 181 involving the local variable i 66 that is declared to be of type "int". The value zero is assigned to i 66 outside of the do-while loop 181. Inside of the loop, a value is assigned to an array A 183, which is a global array that is declared outside the scope of the function, and the array has 10 integer elements as can be seen from the declaration.

Each time through this do-while loop 181, a different element of array A 183 is assigned a value. This is very typical of array assignments and loops where the array variable is indexed by an induction variable, in this case the variable i 13, so that through the course of executing this loop, different values are stored to each element of the array. The variable i is incremented by one, which is the effect of the i++ statement that follows the assignment to the array variable A. The loop exit condition is governed by the while check, which indicates that while i is less than 10, the body of this do-while loop will be executed, for a total of 10 times, where i will take on the values 0 through 9. On the last iteration when i reaches the value 10, the while condition will no longer be true. That is, 10 will no longer be less than 10, and so the do-while loop will terminate execution. Thus, a value is assigned to the 10 elements of the array variable A, that correspond to indices 0 through 9, and what is being stored is an induction expression value, 8*i+2. Now the translated code for this source program is shown in FIG. 18B, which illustrates the low level intermediate representation before strength reduction is performed. For the purposes of this discussion here, SSA form will be ignored to clarify the main point.

In basic block B1 61, which is the only basic block in the loop body, there are a sequence of instructions to carry out the statement A[i] is equal to 8*i+2, the increment of i, and the while condition check. The array A has been declared to be of an integer type as shown in FIG. 18A. Typically, on many machines, an integer data type occupies 4 bytes of memory space. Thus, in order to store values to the consecutive elements of the array A, one needs to scale the index value by 4.

In examining the instructions in basic block B1, the right hand side is first evaluated, which is 8*i+2, and this is done by of first multiplying i by 8 and then adding 2 to the result. The variables $t_1$, $t_2$, $t_3$ and $t_4$ are merely internal compiler temporary variables; they don't necessarily reflect SSA renaming discussed previously. $t_1$ is assigned 8*i and $t_2$ is assigned $t_1$+2. Thus, $t_2$ computes the right hand side of the statement A[i]=8*i+2. Next, $t_2$ is assigned to an element of array variable A. This is done through a store instruction. Now, the store instruction needs to specify a memory address, in particular, the address of the element A[i], and this is done by scaling i by 4. The scaling is by 4 because each element of array is a 4 byte integer quantity, according to the assumption. The scaled value is added to the base address of the array variable A. If $t_0$ corresponds to the base address of array variable A, what must be done is sum that with the scaled index value and produce the effective address where the value of $t_2$ will be stored. The variable $t_0$, which corresponds to the base address of array variable A, has been initialized in basic block B0 61.

In the C language, array elements start with an index of 0 and progress onwards. The very first element of the array variable A is referred to as A[o], and so the address of that is what is assigned to to and is summed with the scaled value $t_3$ in producing the effective address $t_4$ within the loop.

The rest of the instructions in B1 are fairly self-explanatory. There is an increment of i and a check against 10 to determine whether further iteration is required. FIG. 18C illustrates the transformed loop 182, assuming that only the address induction expressions are strength reduced. In FIG. 18B, there are two induction expressions, the one that is assigned to $t_2$ and the one that is assigned to $t_4$. The induction expression that is assigned to $t_4$ or computed by $t_4$ is sourced directly by a store instruction as the base address value. That refers to the location where a value needs to be stored in memory. That is considered an address induction expression (AIX).

The induction expression that is computed by $t_2$, is an ordinary induction expression (OIX), in that it does not feed into a base address value. It is sourced by the store, but it is in fact the value that will be stored in memory, not the address to which it will be stored. Assuming that strength reduction is only applied to address induction expressions, then this would result in the code as shown in FIG. 18C, where $t_4$, the address induction expression, has been strength reduced and is assigned a strength reduced temporary variable x, that is initialized in the preheader and incremented in steps of 4 within the loop. Note that the computation of $t_3$ has been rendered dead and can be removed. There is an advantage in strength reducing the AIX, but the OIX computed by $t_2$ has not been strength reduced.

This is a feature that the SSA based strength reduction algorithm described by Markstein, et al. does not perform, but the current invention will perform this strength reduction. Had this been done, then the resulting code be as shown in FIG. 18D, where both $t_2$ as well as $t_4$ are strength reduced using strength reduction temporary variables x and y. Strength reducing both the OIX and the AIX allows the elimination of two instructions as dead, the computation of $t_1$ and the computation of $t_3$. Moreover, since the only use of the original basic induction variable i is in the if check, linear function test replacement can be performed, and then the increment of i can be eliminated from the loop. This discussion again ignores the SSA form to simplify the explanation, but this would apply in the SSA form as well.

The third issue is the issue of supporting predicated code. Now predication is a technique that eliminates conditional branches in a program by guarding the execution of the instructions that are to be conditionally executed by a boolean hardware flag that is initialized with the result of the original branch condition. This is illustrated in FIG. 28. FIG. 28A depicts an if statement 280, where if i less than 10 j is set to i minus 1, and k is set to j times 2, and k is used subsequently. FIG. 28B is the intermediate representation corresponding to that code fragment where basic block B0 61 performs the if check, with the use of a machine opcode called compare and branch (COMB). This opcode compares the value in register Ri which contains the value i against 10 and compares it for a greater than or equal to relationship. And if that relationship holds, then control is transferred to basic block B2 61, otherwise control passes to the next sequential block of code in basic block B1 61. Note, the COMB checks the inverse of the original if condition because the semantics are that if the condition holds, then a branch operation to B2 is performed, which skips around the instructions that assign values to j and k in basic block B1.

Now the same block of code if it were to be predicated would appear as shown in FIG. 28C. There is a compare operation that checks a "less than" relationship between Ri and 10. And if that condition happens to be true, it sets a one bit predicate register to one, and if not it sets it to zero. The $P_1$ predicate register is used to guard the execution of the instructions that compute j and k. This is shown by prefixing the instructions that compute Rj and Rk with $P_1$ enclosed in parenthesis. The convention is that $P_1$ is a qualifying predicate which is being queried, before executing the guarded instruction. So the way this works is if the predicate register happened to have the value 1, then the guarded instruction is executed. If it happened to have the value 0, then the guarded instruction is not executed. Thus, the two codes of FIGS. 28B and 28C are equivalent.

The code sequence involving the conditional branch instruction and the code sequence involving the predicated instruction sequence are in fact equivalent, in that if i is less than 10 (i.e., the contents of Ri is less than 10), then the assignments to j and k are executed and if not, they are omitted. However, branch instructions are worse than predication in terms of high performance instruction pipeline processing. They can cause interruptions in pipeline sequencing and incur performance penalties. Predication, on the other hand, is generally easier to process and does not incur pipeline penalties. Predication is a feature provided by hardware and is used in the translation of conditional constructs into straight line constructs, as shown in FIGS. 28B and 28C, where there originally were basic blocks B0, B1, and B2 and through predication only a single basic block 61 remains. Effectively, what has happened is a conversion of a control dependence relationship into a data dependence relationship. While the branch at the end of basic block B0 was originally controlling the execution of B1, the execution of the instructions in basic block B1 are now dependent on the predicate data value $P_1$ that is produced by the compare.

There are several problems that predication causes for strength reduction. First, there is the issue of recasting predicated code into SSA form and that is an issue that needs to be addressed for all SSA based optimizations, not necessarily just SSA based strength reduction. Another problem introduced by predication as regards to strength reduction is the recognition of BIVGs in predicated code. That is, how are basic induction variable groups recognized in predicated code? Other problems include the identification of strength reduction candidate induction expressions in predicated code, and updating the predicated code to reflect the effects of strength reduction while preserving integrity of the SSA form.

FIG. 29 illustrated the problems introduced by predicated code. FIG. 29A depicts a loop 290 involving multiple basic blocks 61 in its body. There is an if check 291 within the loop body that causes a basic induction variable i 13 to be either incremented by one or decremented by two, depending on the if condition result. There are three induction expressions that are strength reduction candidates. The first computes eight times i which is assigned to j. The second computes four times i that is assigned to k. The third computes two times i that is assigned to l. Now the equivalent predicated code sequence for the loop body is shown in FIG. 29B where there are two compares 292, one compare that evaluates condition $C_1$, the condition that the if statement was originally checking, and a second compare that checks the inverse of that relationship, namely $C(bar)_1$. In other words, $P_1$ and $P_2$ are predicate registers that are complementary, thus if one of those predicates is true, the other predicate is false, where true would correspond to the predicate register having the value one and false, the predicate register having the value zero. So, the statements that appear on the right hand side of the original if then else construct, the i=i+1, k=4*i, will be guarded by the true predicate $P_1$, and the instructions that are on the left hand side of that if then else construct are guarded by the complimentary predicate register $P_2$. So, depending on the result of the compare, either i=i+1 and k=4*i are executed or i=i−2 and j=8*i are executed. And then, regardless of how the comparison turns out, the L=2*i and i=i+1 instructions are executed.

It is possible for the code shown in FIG. 29B to have been reordered by an earlier code optimization phase, a phase that operates ahead of strength reduction, and just for illustration purposes, it is assumed that the instruction scheduling has reordered these instructions to improve pipeline efficiency, and the result of instruction scheduling is shown in FIG. 29C. What has happened is that the compare instructions have been inverted. But more importantly, the pair of instructions that were each guarded by predicate $P_1$ or predicate $P_2$ have been swapped. The assignment that decrements i by 2 is guarded by predicate $P_2$ which appears first, and then is followed by the increment of i that appears under the complementary predicate, and then there are assignments to j and k that follow. Now, looking at this sequence of code, ascertaining the value of i that is actually being multiplied by 8 and assigned to j, is not immediately answerable. It may be that i is decremented by 2, or it might be that the value of i is incremented by 1.

The arrows with circled i's FIG. 29C indicate the true reaching values. Note, for instance, that the use of i in the 2*i computation could get its value from either one of the previous assignments to variable i. The variable i sourced by the 8*i statement, is guarded by predicate $P_2$, and the value that is being sourced there is the value of i decremented by 2 from its previous value, and not the value of i incremented by one from its previous value. This can only be deduced after establishing that $P_1$ and $P_2$ are complementary, that if one is true, then the other is false. However, in general, that is not always the case. There may be predicates guarding instructions that are not complementary and so when one is true, it is not necessarily the case that the other is false. Great care must be taken in doing this kind of analysis. This sort of reaching definition analysis is quite important in order to carry out strength reduction optimizations.

SUMMARY OF THE INVENTION

These and other objects, features and technical advantages are achieved by a system and method which provides an improved algorithm that overcomes the shortcomings of standard strength-reduction algorithms and also addresses machine-specific for an architecture that supports predication and segmented virtual addresses.

There is fourth issue that the invention will address in addition to the three issues listed above, and that issue is that strength reduction has to be extended in some way in order to deal with address induction expressions that correspond to segmented virtual addresses. For machines with a segmented virtual address space, the kind of address expressions that are achieved are slightly different in nature. The prior art strength reduction algorithm does not address this machine specific issue.

The new algorithm performs strength reduction on a machine-instruction level representation of source programs using an SSA form representation. The SSA representation used is itself novel in that phi-instructions that merge values defined by predicated instructions are inserted into the machine-instruction representation in addition to the classical "control" phi-instructions. These "predicate" phi-instructions are used to facilitate the strength reduction of instructions whose execution is guarded by predicates. The new algorithm also makes use of a symbolic-expression representation that permits independent analysis and reassociation of the (base and offset) components of a segmented address computation. Loop bodies are scanned in a forward walk to identify all the linear induction expressions computed within a loop body which are considered candidates for strength reduction—whether they serve to compute address values or otherwise.

The strength reduction algorithm relies on critical edge-splitting, phi-instructions, and back-substitution of induction expression values to help identify the optimal placement of a minimal number of instructions to update strength-reduction temporaries. Moreover, the profitability of the code transformation is considered based on the estimated net path-length impact within loop bodies (optionally making use of profile information if available) as well as the net register pressure impact within the loop.

The current invention is an SSA-based strength reduction and compiler optimization algorithm that solves the problems discussed previously which are not addressed by prior art. Specifically, the current invention incorporates the following features. The expected profitability of the strength reduction code transformation is considered before performing the optimization. In particular, the net impact on several performance factors are taken into account, namely, the dynamic instruction path length and the register pressure in the loop body. Also, the number of updates to strength reduction temporary variables that are inserted into the loop is reduced and this helps reduce the dynamic instruction path length. Further, all "essential" ordinary induction expressions and address induction expressions computed within a loop are considered for strength reduction in an integrated manner. Also, simultaneous strength reduction of segmented address induction expressions is supported by recognizing when such transformations are safe. Moreover, concurrent strength reduction of multiple segmented address induction expressions is supported. And finally, SSA based strength reduction of predicated code is supported for loops that may contain predicated basic induction variable definitions and/or predicated induction expression computations that are strength reduction candidates.

The inventive strength reduction method and apparatus comprises twenty-two different steps.

The first step is to annotate address arithmetic operations in the low-level intermediate representation. The second step is to annotate the basic blocks in the control-flow graph with probable execution frequencies and then split critical edges in the control-flow graph. The third step is to convert the low-level intermediate representation into a static single assignment (SSA) form, inserting predicate-phi operations to merge predicated definitions of the same variable. The fourth step is to compute the loop interval hierarchy, identifying all the loop nests in the procedure. And then for each reducible loop in the procedure, considered from innermost nesting level to outermost nesting level, repeat steps 5–19.

Step five is to visit all instructions in the loop body and identify region constant operands. Step six is to visit all instructions in the loop body and identify all induction variables computed in the loop body. Step seven is to seek out the basic induction variables (BIV) from the list of identified induction variables (IV) and group the basic induction variables into disjoint basic induction variables groups (BIVG). Step eight is to estimate initial register pressure in the loop. Step nine is to analyze induction expressions (IX) computed by each BIV in the BIVG and enter each of the computed IX's into an induction expression database. Step ten is to classify each BIVG according to a scheme that will be explained in detail later. Step eleven is to visit all loop body instructions and construct an induction expression database. Step twelve is to identify the entries in the induction expression database that are strength reduction candidates. Step thirteen is to place the strength reduction candidate induction expressions into disjoint induction expression classes (IC). Step fourteen is to sort the induction expression classes based on expected profitability of instantiation. Step fifteen is to choose a representative induction expression to instantiate for each induction expression class. Step sixteen is to assess the number of induction expression classes to instantiate based on the overall profitability and register pressure impact. Step seventeen is to insert updates for strength reduction temporary variables needed to instantiate each induction expression class (IC). Step eighteen is to insert definitions in the loop preheader to initialize strength reduction temporary variables and any region constant values that are needed. Step nineteen is to rewrite the loop body computations of strength reduced induction expressions.

The remaining three steps do not apply to each loop interval, but do apply to the program as a whole. Step twenty is to perform global copy propagation. Step twenty-one is to perform global dead code elimination. And the final step, Step twenty-two is to exit static single assignment (SSA) form and to perform register allocation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A and B depict the prior art strength reduction transformation.

FIG. 2 depicts the general arrangement of a prior art compilation environment.

FIGS. 13A and 13B indicate the relative performance costs both before and after the strength reduction transformation, respectively.

FIGS. 16A and 16B depicts the results of performing dead code elimination and the register allocation on the loop shown in FIG. 15, respectively.

FIGS. 18A to 18C illustrates how the prior art SSA based strength reduction algorithm focuses solely on strength reducing induction expressions that compute memory address values.

FIG. 18D shows the results of the inventive strength reduction method on the example shown in FIGS. 18A to 18C.

FIGS. 22A to 22C illustrate how the prior art SSA based strength reduction algorithm does not handle segmented virtual address computations.

FIG. 22D shows the results of the inventive strength reduction method on the example shown in FIGS. 22A to 22C.

FIG. 23 depicts forming an 8 bit address from a 4 bit virtual address.

FIGS. 24A and 24B depict a C code fragment and the associated low-level intermediate representation containing multiple segmented address induction expressions.

FIGS. 25A and 25B depict the results of strength reducing the AIXs of FIG. 24B separately and jointly, respectively.

FIGS. 26A and 26B depict value of the variables from FIG. 24B and FIG. 25B respectively.

FIGS. 27A to 27C depicts the issue of identifying the correct base address to use in preheader address conversion operations.

FIGS. 28A to 28C depict predicated code that eliminates conditional branches in a program by guarding the execution of instructions by a qualifying predicate register.

FIGS. 29A to 29C illustrate the problems introduced by predicated code in performing strength reduction.

FIGS. 30A to 30C depict an example of an intra segment add instruction and an intra segment F64A instruction emitted for a C-source construct.

FIGS. 33A to 33E depict the conversion of low level intermediate representations into SSA form and the insertion of a predicate φ operation.

FIGS. 35A and 35B illustrate reducible and irreducible loops respectively.

FIG. 36 depicts a list of different types of assignments to variables that are known as induction variables.

FIG. 37 illustrates overlapping live ranges that contributes to register pressure.

FIG. 38 depicts a C source code extract.

FIG. 39 depicts the low level intermediate representation for the source code shown in FIG. 39.

FIG. 40 depicts the IX database entries for code shown in FIG. 38.

FIG. 41 depicts a graph illustrating profitability and register pressure impact in relation to instantiation.

DESCRIPTION OF THE PREFERRED EMBODIMENTS

Figure 19:
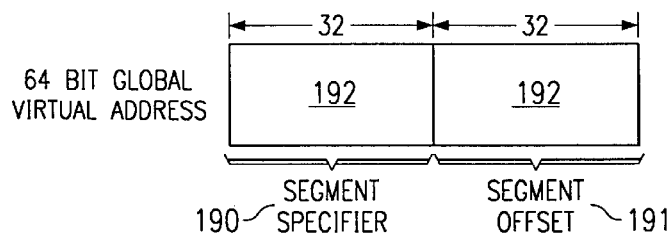
FIG. 19 depicts the address being partitioned into a segment specifier and a segment offset.
Figure 20:
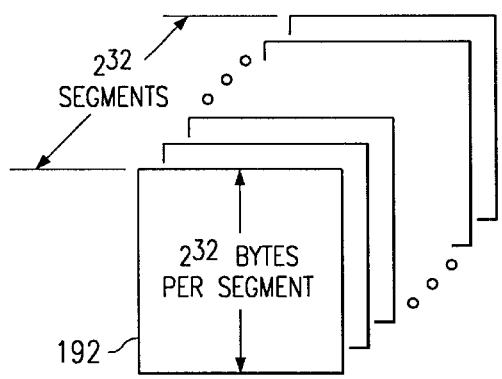
FIG. 20 depicts the segmented virtual address space.

A further discussion of the fourth issue requires an understanding of what a segmented virtual address space entails is necessary. On computers that support 64 bit addressing, virtual addresses that are 64 bits may be partitioned into different segments. The following is a typical example of how partitioning might be implemented in a system with 64 bit addressing. As shown in FIG. 19, the address is partitioned into a segment specifier 190 and a segment offset 191, each being 32 bits in length. The top 32 bits may denote a particular segment, and the bottom 32 bits will denote an offset within that segment. So effectively the $2^{64}$ bytes of virtual address space has been partitioned into $2^{32}$ segments 192, each of which consists of $2^{32}$ bytes per segment 192, as shown in FIG. 20. So in order to identify any particular byte in this $2^{64}$ byte address space, the segment specifier 190 will choose one of the 4 billion segments and the offset into that segment will be used to choose one of the 4 billion bytes within the segment. This is how a virtual address is formed.

Figure 21:
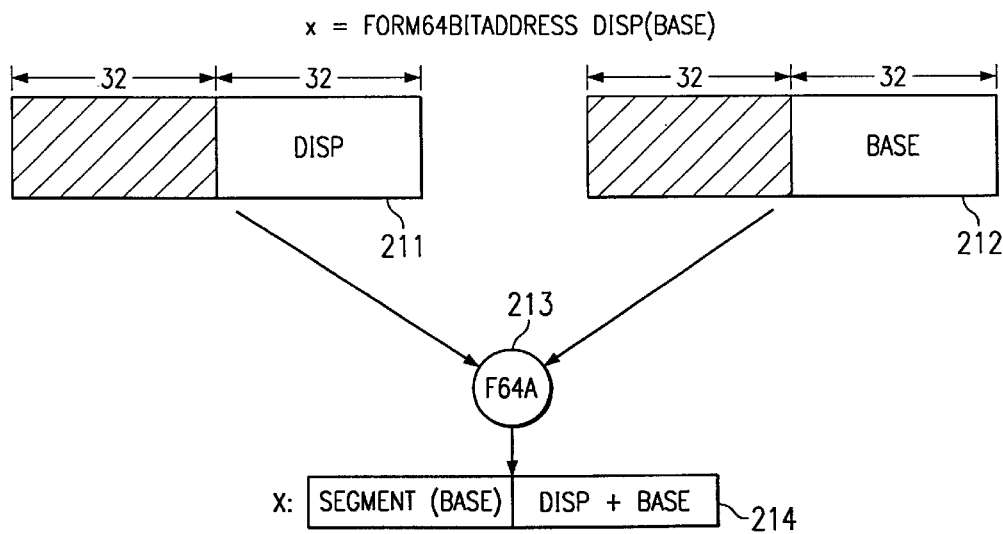
FIG. 21 depicts forming a 64 bit address from a 32 bit virtual address.

Now when compiling 32 bit programs where pointer variables are 32 bits in length, there is a translation step that must occur in converting from a 32 bit address tracked by 32 bit pointer variable into a 64 bit global virtual address that is understood by the underlying computer hardware. Let us assume that this can be done through an explicit instruction called "form 64 bit address" (F64A) 213. This "form 64 bit address" (F64A) instruction may be defined in a computer architecture to generate a 64 bit address 213 by summing two 32 bit values, one of which is a displacement value 211 and the other of which is a base address value 212, as shown in FIG. 21. Assuming that these displacement and base address values are 32 bit quantities that reside in 64 bit registers, the top 32 bits may contain garbage because they are not relevant and are not used. The bottom 32 bits contain the true values corresponding to the displacement and base. Now, when these input operands, the displacement and the base address, are consumed by the F64A instruction, a 64 bit address 214 is produced where the bottom 32 bits corresponds to the sum of the displacement and the base and the top 32 bits corresponds to the segment specifier which is obtained by some calculation performed on the base. Generally, it could be any kind of calculation, but typically it is a very simple function of the base address value and this is what is shown in FIG. 21.

FIG. 22A illustrates a C program 220 having an array variable A 183 of 10 elements, each of which is a 4 byte integer. This code fragment is performing a simple store, storing the value 0 to every element of the array using a do-while loop 221.

FIG. 22B illustrates the low level intermediate representation 222 before strength reduction. The index variable i, which is a basic induction variable 13 is scaled, by 4, corresponding to each element of the array being 4 bytes, and summed with the base address of the array variable A 183, which is kept in variable t and the result of that is the effective address, which is a 32 bit address. Thus, the address needs to be extended out to 64 bits using an F64A instruction 213, as shown in FIG. 22B. Once the 64 bit address is produced in $t_3$, it is used as the base register of the store that assigns the value 0. So the F64A is an extra instruction that would be needed on computer architectures that support a segmented virtual address space where 32 bit addresses need to be converted into 64 bit addresses before they can be used for accessing memory through loads and stores. Now, if only ordinary induction expressions (OIX) such as that computed by $t_2$ were strength reduced, the resulting code would appear as shown in FIG. 22C. The F64A instruction 213 is opaque to the analysis, and thus, it is not known whether the instruction is computing an induction expression. So the best that can be done is to strength reduce the value computed by $t_2$, since what is computed by $t_3$ would be opaque or not understood by a strength reduction algorithm. There is an advantage in that a multiplication has been rendered dead. (Note that this multiplication was not in the original source code, but was implied by the index operation.) It has been rendered dead as a result of strength reduction where now the strength reduction temporary variable x tracks the address of A[i] around the loop and is incremented by 4.

However, it is desirable to strength reduce the F64A instruction 213 in conjunction with the larger induction expression. This is illustrated in FIG. 22D. Assume that the variable x, instead of tracking a 32 bit address is tracking the extended 64 bit address around the loop and is incremented by 4 again. But now the initialization of this strength reduced temporary variable would have to extract the 64 bit initial address value outside the loop in the preheader. Variable x is initialized to F64A of 4 off of t. So the advantage of being able to understand what the F64A opcode does and fold it into the induction expression analysis for the purpose of strength reduction is that the F64A instruction has now been eliminated from within the loop. It has been replaced with a simple assignment of $t_3$ gets x, thereby rendering two instructions dead as opposed to just one. So it is advantageous to be able to support strength reduction of 64 bit segmented address induction expressions.

However, there is a particular complication in being able to strength reduce multiple segmented address induction expressions. Assume for explanation purposes only, that there is an 8 bit global virtual address space 230 with 4 bit segment descriptors and 4 bit segment offsets. Thus, there would be an F8A instruction 231 instead of an F64A instruction, that behaves as shown in FIG. 23. It takes a displacement 232 and a base 233 addresses and forms an 8 bit global virtual address 234 where the bottom 4 bits correspond to the sum of the displacement and base which are each 4 bit quantities now. The top 4 bits correspond to the segment descriptor which is formed using a very simple function of the 4 bit base input value. Essentially the segment descriptor as computed by this F8A instruction, replicates bits B3 and B2 of the base into the higher order 2 bit positions of the 8 bit address and inserts zeros in the other two bit positions. So the top 4 bits of the 8 bit global virtual address space are generated by just sourcing the top 2 bits, $b_3$ and $b_2$ of the base input value and replicating them in the very top.

Assuming that this is how this instruction operates by examining a small example, it may be noted that several issues arise when attempting to perform a strength reduction of multiple segmented address induction expressions. FIG. 24A shows a simple C source program fragment 240, where there is a routine called foo 241 that takes as input two parameters that are declared to be pointers to short data types. Assume that these are pointers that are 2 byte objects. So inside the body of the routine foo there is a loop 242 based on the basic induction variable i 13 that is used to store to the first two elements of the array variable pointed to by the parameter p. The store is performed by indexing these pointer variables just as if they were arrays themselves and indexing them in this example with induction variable i. So this loop in fact is going to iterate only twice, with i taking on the value $i_0$ and 1. So effectively, two values are read from the array variable pointed to by q and stored in the first two elements of the array variable pointed to by p.

FIG. 24B illustrates the low level intermediate representation before strength reduction 243, depicting scaling operations by a factor of 2. t computes two times i and $t_1$ and $t_4$ compute the 4 bit addresses of the array element locations that are being referenced in each loop iteration. $t_1$ is t plus q and $t_4$ is t plus p. The $t_2$ and $t_5$ computations are needed in order to convert these 4 bit quantities into full 8 bit addresses. So the two 8 bit quantities computed by $t_2$ and $t_5$ are then used as base address values on the load and store, respectively.

Thus, there are opportunities for strength reduction. However, there is a choice in how to go about strength reducing the address induction expressions that appear in FIG. 24B. Either strength reduce the segmented 8 bit address induction expressions computed by $t_2$ and $t_5$ separately, or strength reduce those two induction expressions jointly. FIG. 25A illustrates the result of strength reducing the $t_2$ and $t_5$ induction expression computations separately. Two different strength reduction temporary variables, x and y, have been created, and each of them has been initialized outside the loop to point to the starting element of the respective arrays pointed to by p and q. So inside the loop, F8A instructions have been eliminated and the computation of t, $t_1$ and $t_4$ have also been rendered dead, and thus, eliminated from within the loop. However, it is better to strength reduce the induction expressions jointly in this case, and this is shown in FIG. 25B. Here, only one strength reduction temporary variable x has been created that tracks the starting location of the array variable pointed to by q and is incremented in steps of 2 within the loop. And the value computed by $t_5$ originally is now re-expressed as x summed up with another loop invariant quantity z, where z is initialized outside loop. x is tracking the addresses of the array variable elements pointed to by q, and is used by the load, where x is assigned to $t_2$ which is then directly sourced by the load. Now for the store what is needed is a base address value that refers to addresses of the elements of the array pointed to by the variable p. Thus, the base address that is needed by the store can be formed by adding in the difference between the starting locations of the two array variables. And so y in basic block B0 is assigned the difference of p and q with the intent of summing that to x. However, before the difference summed into x, it must be sign extended because p and q are 4 bit quantities where the top 4 bits are garbage. In other words, the difference of two 4 bit quantities that have undefined values in the top 4 bits needs to be extended out into a proper 8 bit quantity before it can be summed up with another 8 bit quantity, and this is the purpose of the sign extension. Basically, the sign extension operation replicates the most significant defined bit, that is B3 bit into the top 4 bits. This effectively computes a legal 8 bit difference of two pointer values. The difference that is assigned to z is then added to x inside the loop and assigned to $t_5$.

The advantage of strength reducing induction expressions together is that instead of having to use two strength reduction temporary variables, only one is used, albeit at the cost of introducing a new region constant z. But in comparing the bodies of the loop, that are contained in B1 in FIGS. 25A and 25B, there are only two increments in FIG. 25B, whereas there are three in FIG. 25A. This is because the variable y is not needed, and thus, does not have to be incremented within the loop and thus this is the advantage of strength reducing induction expression jointly. However, in performing this strength reduction, care must be taken to avoid the problem illustrated in FIG. 26.

Suppose that p and q happen to have the values as shown in FIG. 26A, that is 4 undefined bits (?) in the top 4 bit positions and then 0000 for p and 1100 for q. Since the loop is iterating two times with i taking on the value 0 and 1, the different variables t, $t_1$, $t_2$, $t_4$ and $t_5$ would be computed as shown in FIG. 26A. Now these values correspond to what would have been computed by the original loop shown in FIG. 24B. The most relevant values are the values computed by $t_2$ and $t_5$ because they correspond to the 8 bit extended addresses that are used for loading and storing values for memory.

When the address induction expressions (AIX), are strength reduced jointly, x, y and z would effectively be initialized to the values shown in FIG. 26B, that is, the code that would execute in block B0 in the preheader of FIG. 25B would compute the indicated values for x, y and z. The sign extension operation that was used to compute z has effectively replicated bit position $b_3$ which happens to be the value 0 all the way out into the top 4 bit positions to end up with a legal 8 bit value.

The values computed by $t_2$ and $_5$ after strength reducing the address induction expressions jointly are shown in FIG. 26B. Now it can be observed that $t_5$ in fact gets incorrect values because of this transformation. And this problem stems from the fact that when z is added to x, the top 4 bits are not being affected. The array variables p and q reside in different segments as shown in FIG. 26A. One of them resides in segment 0000, the other one resides in segment 1100. However, in the loop, when z and x are added together, the correct segment is not being specified and thus, incorrect 8 bit address values are being used for the store. In other words, the operation is storing into the wrong segment, even though the segment offset has been correctly computed. Note that this particular problem does not occur when p and q are in fact pointing to the same segment on entry.

Therefore, it is safe to strength reduce multiple segmented address induction expressions jointly only if each of those address induction expressions refers to the same segment. The prior art does not provide such a solution.

There also needs to be a way to identify the correct base address to use in preheader address conversion operations, and this issue is illustrated in FIG. 27. FIG. 27A illustrates a simple C routine 270 called foo 241 which now takes two parameters, p which is a pointer to an integer (and could be the pointer to the first element of an array variable), and d which is some integer variable which might denote an index offset amount. So in the loop elements of the array pointed to by the pointer variable p are assigned. A zero is stored into array index locations offset from the basic induction variable i 13 by d. In other words, p[i+d] is set to zero. The low level intermediate representation is shown in FIG. 27B and again depicts the address extension operation, the F64A, that is applied to $t_2$ which corresponds to p plus 4 times (i plus d). $t_2$ computes the 32 bit virtual address and $t_3$ computes the 64 bit virtual address that is used by the store instruction. Now, if the induction expression computed by $t_3$ is strength reduced, it would result in the code shown in FIG. 27C. The issue here is how should x be initialized. Should x be initialized to F64A of d(p) or the other way around? In other words, what is the base register or the base address to be used for that instruction and what is the displacement? This is something that the strength reduction algorithm will need to figure out.

The inventive strength reduction method and apparatus comprises twenty-two different steps.

Figures 3, 4:
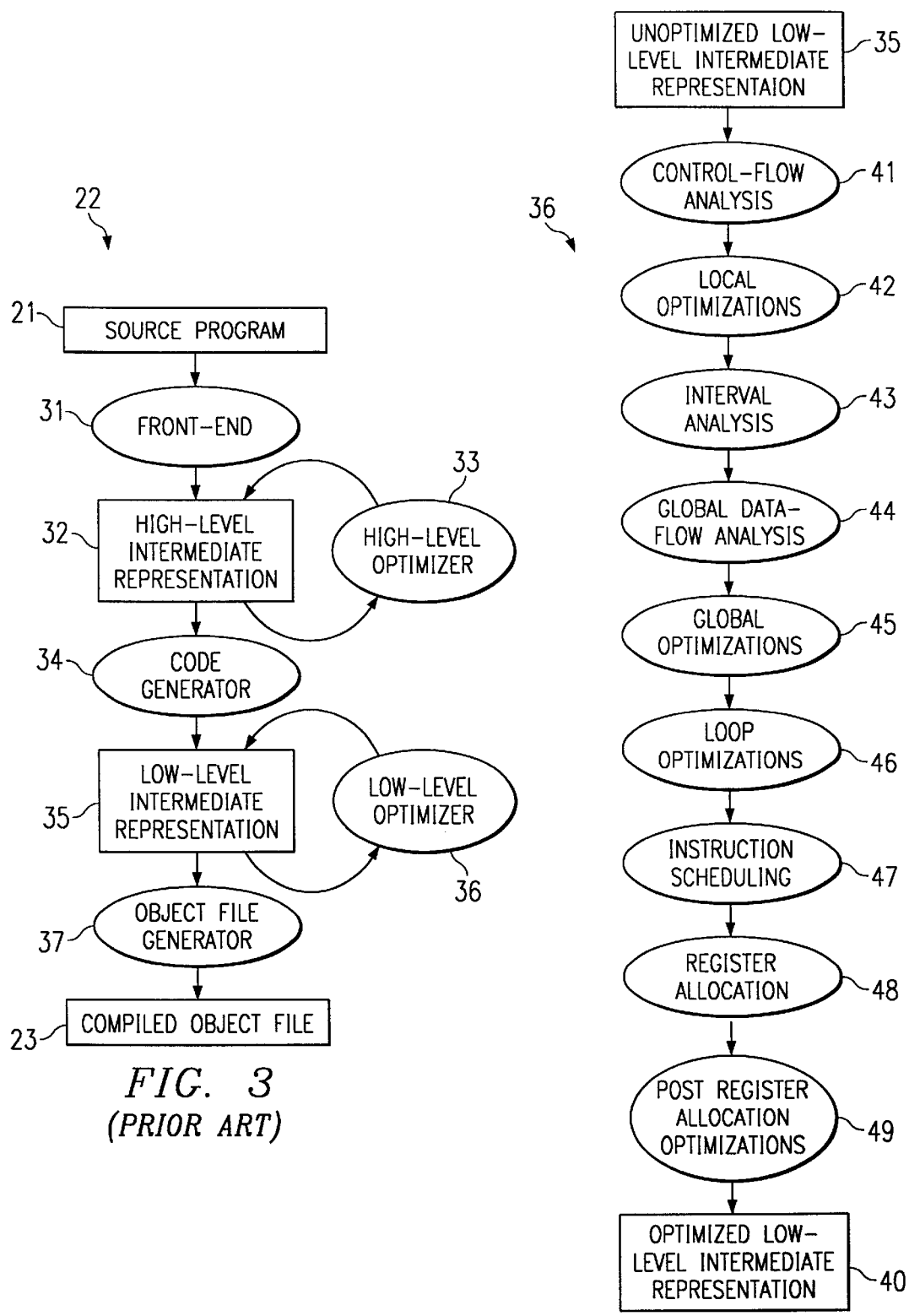
FIG. 3 depicts the internal structure of a prior art compiler of FIG. 2.
FIG. 4 depicts the internal structure of the low level optimizer of FIG. 3.
Figure 5:
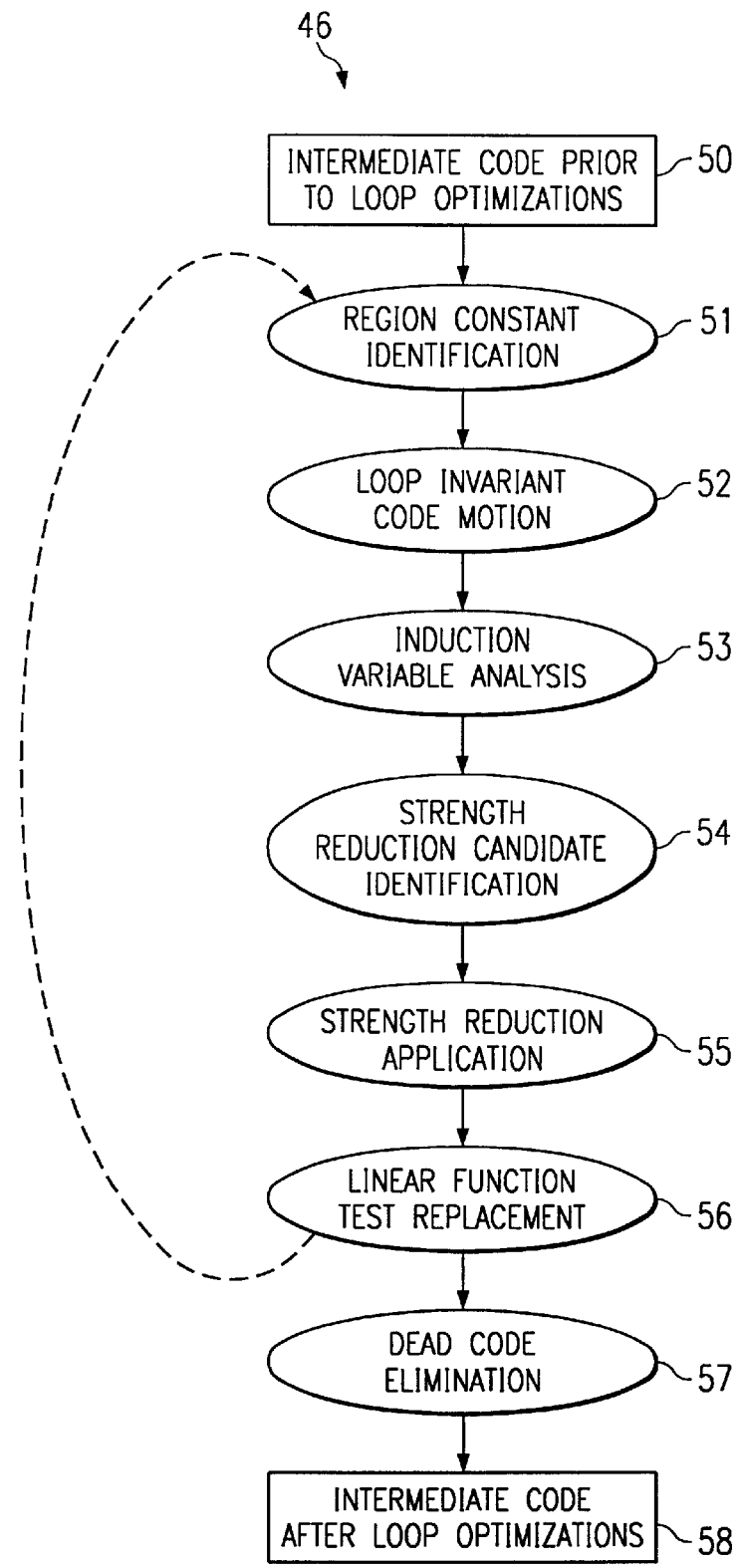
FIG. 5 depicts the loop optimization phase incorporating strength reduction of FIG. 4.

The first step of the invention is to annotate address arithmetic operations in the low-level intermediate representation. This is performed by defining a new kind of opcode, or a pseudo opcode. The opcode is an annotation on an addition operation, and is referred to as an Intra Segment Add. This opcode, or instruction is emitted and inserted by the code generator into the low-level intermediate representation, where some kind of address arithmetic is occurring and this annotation will then assist the low level optimizer shown in FIG. 3 in performing strength reduction. The semantics of the intra segment add are very much like an add operation in that a sum of two quantities is being computed, in this case, an offset quantity and a base address quantity.

The base address and the offset operands are position dependent, unlike an ordinary add, where for example, the statement x is equal to add y+z could also be expressed as x is equal to add z+y, and either expression would accomplish the same result. In an intra segment add, the intent is to identify the source operand that corresponds to a memory base address value, a pointer variable operand for instance, with a particular operand position, and the other operand is the offset operand. The semantics are similar to an add operation again, but which of the two operands is the base address and which is an offset that is being added is clearly identified to the low level optimizer. In the FIGURES the intra segment add is identified by the notation of an asterisk next to the add opcode.

The "intra segment" qualifier is an indication that the sum of the offset and the base address is a value that does not spill over into the segment specifier bits as shown on FIG. 19.

With an intra segment add basically the assertion is that the sum of the base and the displacement or offset, is a quantity that can be represented entirely within the segment offset portion of the full 64-bit address. So the intra means within the segment, and not crossing over into a new segment and affecting the segment specifier bits.

Now just like an intra segment add, one can define an intra segment F64A operation which would again do an addition operation, but in this case the segment specifier bits would actually be defined to contain some meaningful value, in particular, the segment extracted from the base address operand. So these intra segment opcodes are opcodes that the code generator would emit, and the code generator knows when to emit an add and when to emit an intra segment add based on the incoming code stream. Typically, address arithmetic is very well recognized from source level constructs and so it is generally clear which operand is the base address and which one is a pure integer quantity that is being added. Programs that perform address arithmetic yielding results that are not truly contained within a segment would be considered ill-behaved, and one can imagine a command line compiler option that the user might switch on to say "I'm doing address arithmetic but none of this is going to stay within a segment" so never emit intra segment add or intra segment F64A opcodes. For the most part, these two pseudo-opcodes are opcodes that help identify when address arithmetic is being performed, where a memory address is added to an integer quantity.

FIGS. 30A–30C show an example of where an intra segment add instruction and an intra segment F64A instruction might be emitted for a typical C-source construct. FIG. 30A depicts a fragment of C-source code, 300 where a routine foo 241 takes a parameter that is a pointer to an integer typed object. This is a C-idiom, where the pointer parameter is really pointing to the first element of an array of objects. All this routine foo is doing is in a loop that iterates 10 times, assigning the value i+5 to the individual elements of the array object pointed to by the pointer P. FIG. 30B depicts the low-level intermediate representation for that source code and this is assuming that these special annotations are not used on the add and F64A operations. The code generation is fairly straight forward. The add that combines P and the temporary $t_1$ forming $t_2$ is actually performing address arithmetic whose result is converted into a full 64-bit address by the next instruction. So here once again, the integers and pointer variables are 32-bits in length, whereas the machine expects to work on a 64-bit address model. So the 32-bit addresses that have been computed with 32-bit variables or pointer variables need to be extended into 64-bits using the F64A operation. FIG. 30C depicts the same code sequence but the add and the F64A instructions are marked with an asterisk to denote that they are intra region address arithmetic operations. And again, observe that the operand position of $t_1$ and P have been flipped to make sure that the right operand is identified as the base address. Since P here is the pointer variable, clearly it would be the base address operand. So again, the task of the code generator would be fairly straight forward in terms of emitting these special opcodes.

Figure 12:
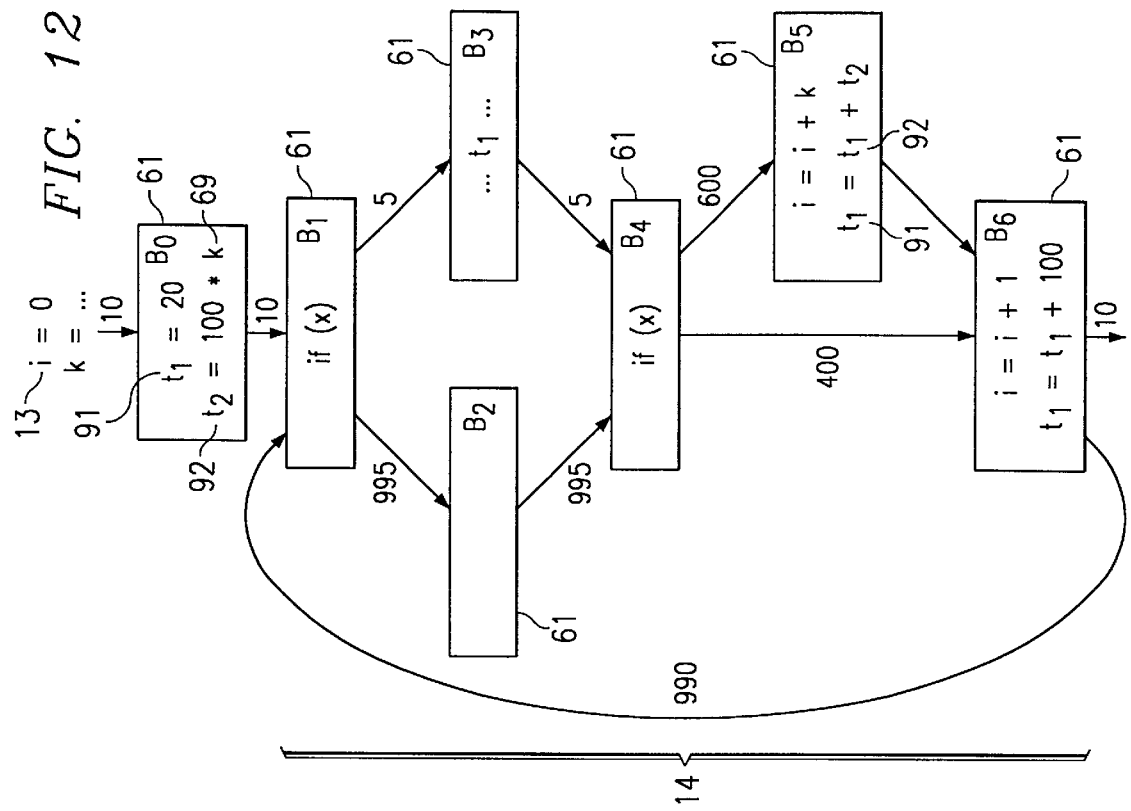
FIG. 12 depicts the results of performing strength reduction on the loop of FIG. 11.
Figure 11:
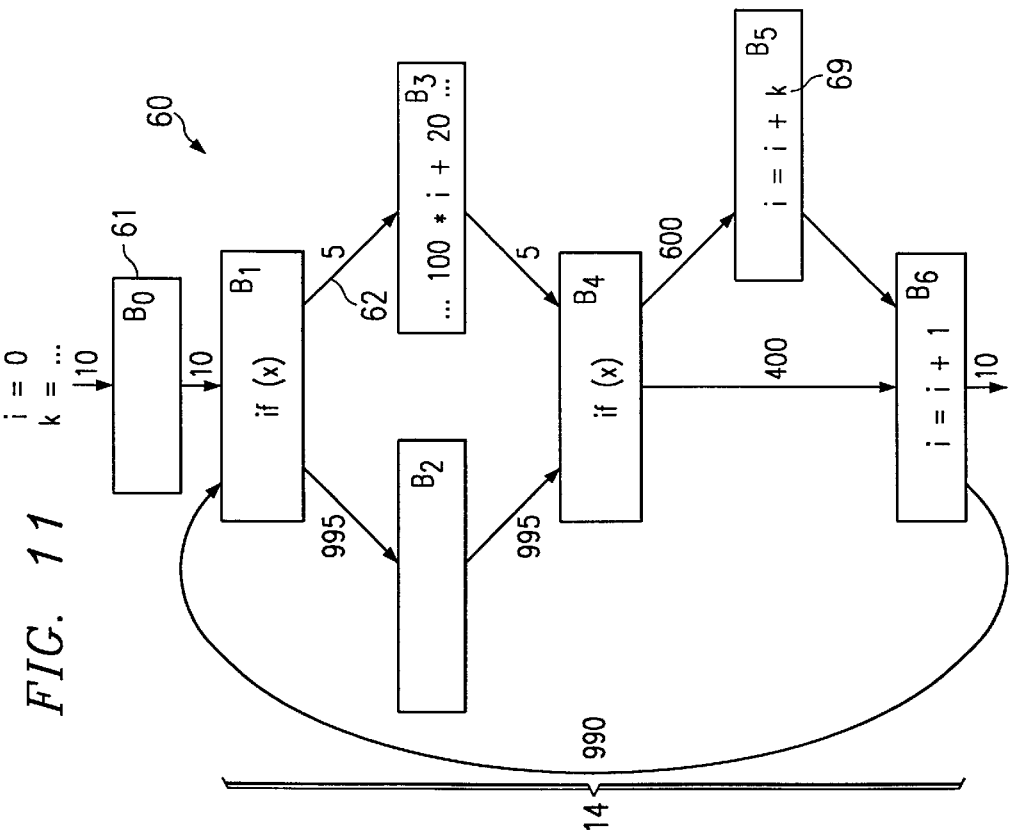
FIG. 11 depicts a loop that has been annotated with expected execution frequencies.
Figure 31:
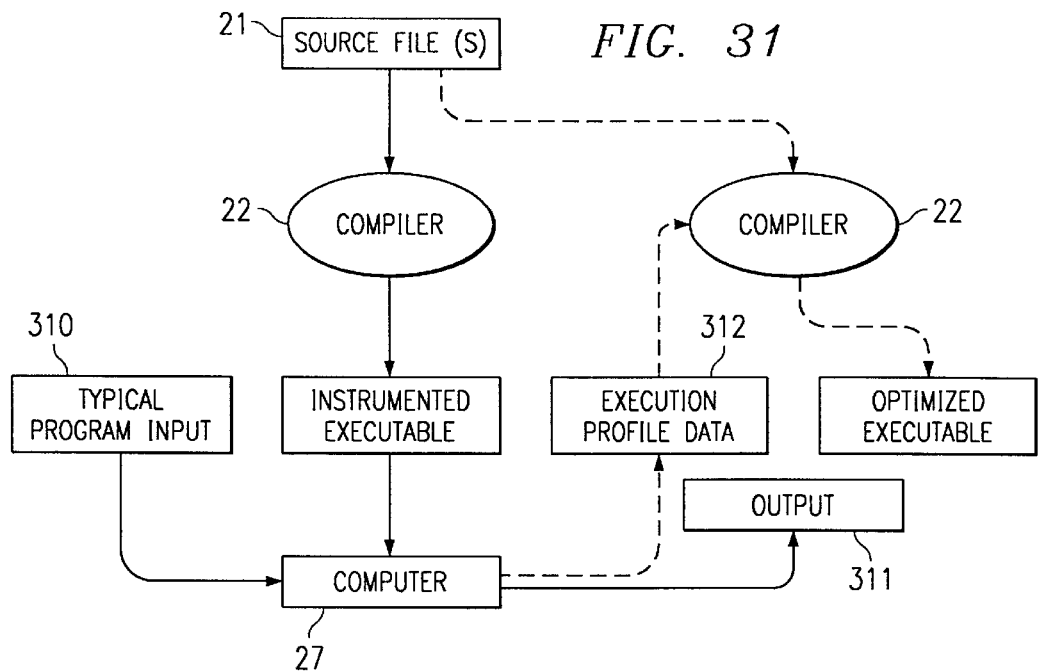
FIG. 31 depicts the method by which compilers extract execution profile data from previous runs of a program.

Step two of the invention is shown in FIG. 31, which illustrates a method that compilers can use to extract execution profile data from previous runs of a program 21. The compiler 22, under a special user supplied option, annotates the code that it would normally emit when translating source codes with special instructions so that when the resulting program is actually run on the computer 27 and fed a typical set of inputs 310 and generates output 311, as a byproduct of that execution generates an execution profile 312, which is collected and stored in a separate file on a disk. Thus, on a subsequent compilation of the same source files the compiler can be instructed to read-in the data contained in the execution profile file and then use that to annotate the control flow graph (which ought to be the same since it is using the same source files). So the control-flow graph can be annotated with edge execution frequencies as illustrated in FIGS. 11 and 12. So when the programmer supplies typical program input, then the compiler, has a very good idea as to how this program actually behaves in terms of which paths are more frequently executed and which are not. The compiler can therefore perform its optimizations can perform its optimization based on that information, and it would try to shorten certain path lengths at the expense of others knowing that it is better for typical program input.

It is also possible that in the absence of execution profile information fed back in this manner, the compiler may choose to heuristically estimate execution frequencies and that is also a fairly standard technique in the industry. There are somewhat fairly very well known static heuristics that one can think of to come up with some relative execution frequencies of different edges in a control flow graph.

Step two also splits critical edges in control flow graphs, and this step is going to address one of the earlier problems cited. Basically, the problem was that sometimes strength reduction inserts more instructions to update strength reduction temporary variables than needed. One of the ways that the current invention addresses this problem is by splitting critical edges to facilitate the solution to this problem. Basically, a critical edge in a control flow graph is a control flow edge that links a basic block that is a split point with a basic block that is a join point. A basic block that is a split point is a basic block with multiple successors and a join point basic block is a basic block with multiple predecessors. So effectively, a critical edge goes from a basic block that has multiple successors to a basic block that has multiple predecessors. What is preferred is to end up with edges connecting basic blocks that either have multiple successors or multiple predecessors, but not both.

Figure 32:
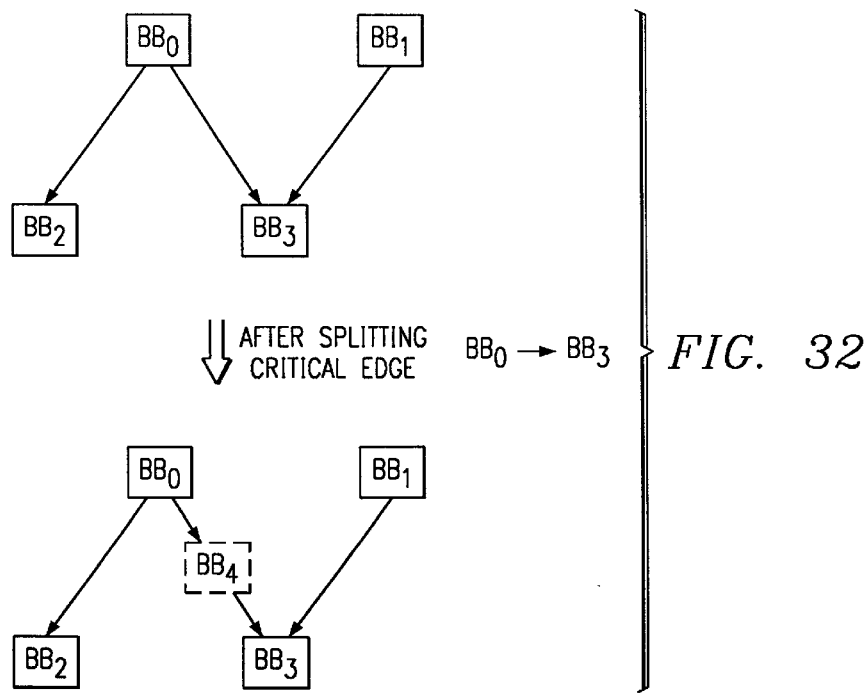
FIG. 32 depicts the method for splitting critical edges.

This is done by creating new basic blocks, which are empty to begin with, except for perhaps an unconditional jump to make sure that control flow semantics are not violated. A new basic block is created pretty much on the critical edge and the original source of the critical edge is now redirected to this newly inserted basic block and the newly inserted basic block is terminated with an unconditional jump instruction that causes control to be transferred to the original target of the critical edge as illustrated in FIG. 32. So one can observe that there still are basic blocks with multiple successors such as BB0 and basic blocks with multiple predecessors such as BB3, but they are not linked together directly by any edge. The critical edge linking BB0 and BB3 has been split and that is the reason why that condition does not hold anymore.

Step three is to convert the Low Level Intermediate Representation (LLIR) into SSA form. In dealing with predicated code, that is, code that contains predication, as described earlier, constructing SSA form can be continued, but with one small adjustment, and that is to insert a special kind of φ operation called a predicate φ operation after predicated variable definitions.

FIG. 33A depicts a fragment of C-code 330 wherein variable x conditionally assigned a value 2 following which there is a use of x. FIG. 33B depicts the control flow graph 331 (CFG) for the code of FIG. 33A, and it is a fairly simple control flow graph where there are three basic blocks 61. Now when this control flow graph and the code sequence contained therein is rendered into a traditional SSA form 332 as shown in FIG. 33C. There are two definitions of x, named $x_0$ and $x_1$. The merge point BB2 contains a control φ operation that merges the value of $x_0$ (sourced along the BB0, BB2 edge) and $x_1$ (sourced from BB1 along the BB1, BB2 edge) and produces a new definition $x_2$ which is the variable name that is referred by the subsequent use. Now the same code sequence, if it were to get predicted, through "if conversion" and rendered into a code sequence where there are no branches, would appear as shown in FIG. 33D. Rather than branch on a condition, the condition is evaluated and based on the result of that condition, a predicate register P is initialized to either 0 or 1. The predicate register P is then used as a qualifying predicate on the instruction that redefines x to be 2 which is followed by a subsequent use of x.

However, to convert that into SSA form, it is preferred to end up with arrangement shown in FIG. 33E. Predicate PT is a special predicate that is always true. Hence it is suffixed with the capital letter T and essentially that is saying "I'm always true" and so the instruction that is being qualified will always execute. Having $x_0$ set to 1 is typical of standard SSA form. While the compare operation is predicted by the true predicate, PT, the predicate register computed is itself renamed as $P_0$. Now the qualifying predicate on the subsequent instruction is now $P_0$ because that is the renamed instance of the predicate register that is being sourced and used to determine whether the $x_1$ is equal to 2 assignment is to be executed or not.

The predicate φ operation is sort of the analog of the control φ operation in the predicated code sequence world, and here again the predicate φ has source operands $x_0$ and $x_1$ much like in the control φ instance, but instead of qualifying each of those incoming source operands with a basic block number that indicates which basic block the value is flowing from, the source operands of the predicate φ operation are qualified with the predicate register under which the source operands of the predicate φ operation are being defined and sourced. So instead of having basic block annotations on the φ source operands there are now predicate annotations on the φ source operands for predicate φs. In fact, with this change, predicated code sequences can be dealt with very much like unpredicated code in standard SSA form.

Figure 34A:
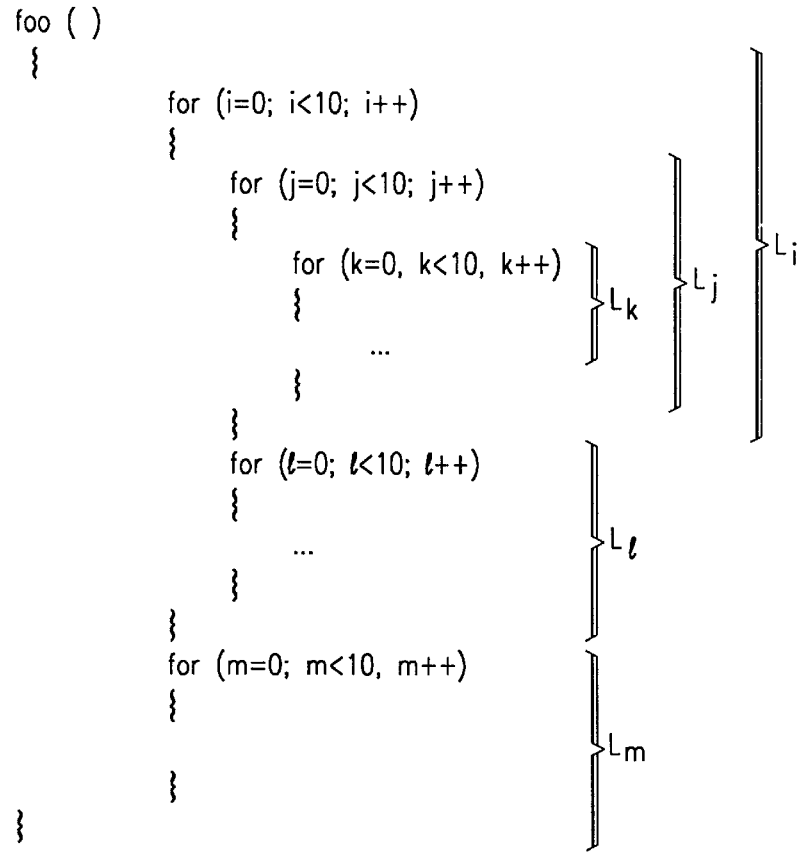
FIGS. 34A and 34B depict the computation of the loop interval hierarchy, identifying all the loop nests in the procedure.
Figure 34B:
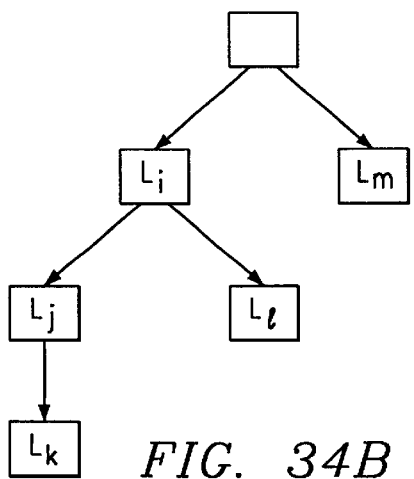

FIGS. 34A and 34B illustrates step four, computing the loop interval hierarchy, identifying all the loop nests in the procedure. For each "reducible" loop in the procedure considered from innermost to outermost loops, steps 5–19 are repeated. FIG. 34A illustrates a routine foo, that consists of multiple loops. Some loops are nested inside of other loops which means that the execution of the inner loop is itself repeated for each iteration of the enclosing loop. So there are loops on variables i, j, k, l and m and on the right hand side the nesting structure can clearly be seen. The interval hierarchy is just another way of representing this loop nesting structure and typically, it is going to end up looking like a data structure called a tree (as opposed to a general graph in that there are no nodes in this tree with multiple predecessors) as shown in FIG. 34B. So the entire body of routine foo can be considered an interval. It is really not a loop per se, but typically one refers to that as an outermost interval that refers to the whole program structure. There are in this example two outermost loop interval nodes, $L_i$ and $L_m$ that refer to the loop that iterates on the variable i and the loop that iterates on the variable m. Since i has nested loops within it, the corresponding interval node in the interval hierarchy tree has descendants, in this case an interval node for $L_j$ and an interval node for $L_l$; because loop k is further nested in loop j, the corresponding interval node for $L_j$ has yet another descendant, $L_k$. The point of identifying the interval structure and coming up with this interval hierarchy tree is to facilitate the application of loop optimizations on the loops that are present in the program in reverse nesting order. Thus, it is preferred to visit loop $L_k$, then followed by $L_j$ and then $L_l$ before moving on to loop $L_i$, and then loop $L_m$. The reason for considering loops in reverse nest order is so that any optimizations that are performed on an inner loop that causes new instructions to be created in the preheader of that inner loop will now be considered subject to loop optimizations in the scope of the outer loop. (The preheader of a loop is considered outside the body of the loop and is considered part of the enclosing loop structure if there is one.)

Step four also identifies the loops that are reducible. Reducible loops are standard well-behaved loops in that they have a unique back edge that causes the iteration to happen and they also have a unique loop entry node or loop header node. FIG. 35A depicts a typical reducible loop 350, also sometimes referred to as a "proper" loop, where the loop is being entered from the preheader presumably with control transferring into the loop header node 352 and then having some loop body internal control flow structure from which the loop can be exited from one or more places. Control flow ultimately reaches a unique loop back edge source node 351 or basic block from which there is at least one control flow transfer possibility back into the loop header node. This can be contrasted that with an irreducible loop 353 shown in FIG. 35B, which is a loop that does not have a unique back edge 354 or a unique loop entry node. FIG. 35B depicts the classic control flow structure that causes irreducibility or results in irreducible loops. There is a node that can transfer control to one of two other nodes which iterate amongst themselves and these are inconvenient nodes to perform loop optimization on and irreducible loops are ignored, in particular because there is no place to put a unique preheader. Moreover, there is no topological ordering of nodes within irreducible loops because either entry node could be a starting place. So, these loops are ignored.

Step five is the first of several steps, i.e. steps 5–19, that are applied to each loop. Step five comprises visiting all the instructions in the loop body and identifying region constant operands. These are variables that do not change their value as the loop executes. P. Markstein et al. "Strength Reduction chapter of an unpublished text book on program optimization".

Step six is to visit all instructions in the loop body and identify all induction variables that are computed in the loop body. Now an induction variable for the purposes of description here, is any variable that is defined within the loop, and is of one of the forms illustrated in FIG. 36, that is a definition of the form $IV_1$ is equal to $IV_2$ where an induction variable is being assigned to another, or an addition or subtraction operation where one of the terms is a region constant and the other is an IV or an intra segment add or a φ operation, whether it is a control φ or a predicate φ, either one would be eligible for being considered as defining an induction variable. In these instructions, some of the operands have been referred to as x generically where x could either be in induction variable or a region constant. This definition is recursive, as it defines and induction variable in terms of other induction variables. The algorithm that is used to identify induction variables reflects this aspect and uses a work list approach to discover induction variables in the loop. P. Markstein et al. "Strength Reduction chapter of an unpublished text book on program optimization".

Step seven, after having identified induction variables, involves seeking out the basic induction variables from the list of IV's that have been found, and then grouping the BIV's into disjoined BIV groups. Now a BIV is basically an IV that participates in a def-use chain cycle that passes through the loop header basic block exactly once. A basic induction variable group is nothing more than a collection of BIV's that actually participate in the def-use chain cycle. BIV's are culled from the set of IV's identified by essentially following the def-use chain backwards around the loop. Starting at the loop header control φ operation that defines an IV source operands are chased around the back edge and up in a backwards fashion until finishing at the φ operation that was started. Any source operands that were visited in that backward control flow visit would be considered a BIV. P. Markstein et al. "Strength Reduction chapter of an unpublished text book on program optimization".

Figures 14A, 14B:
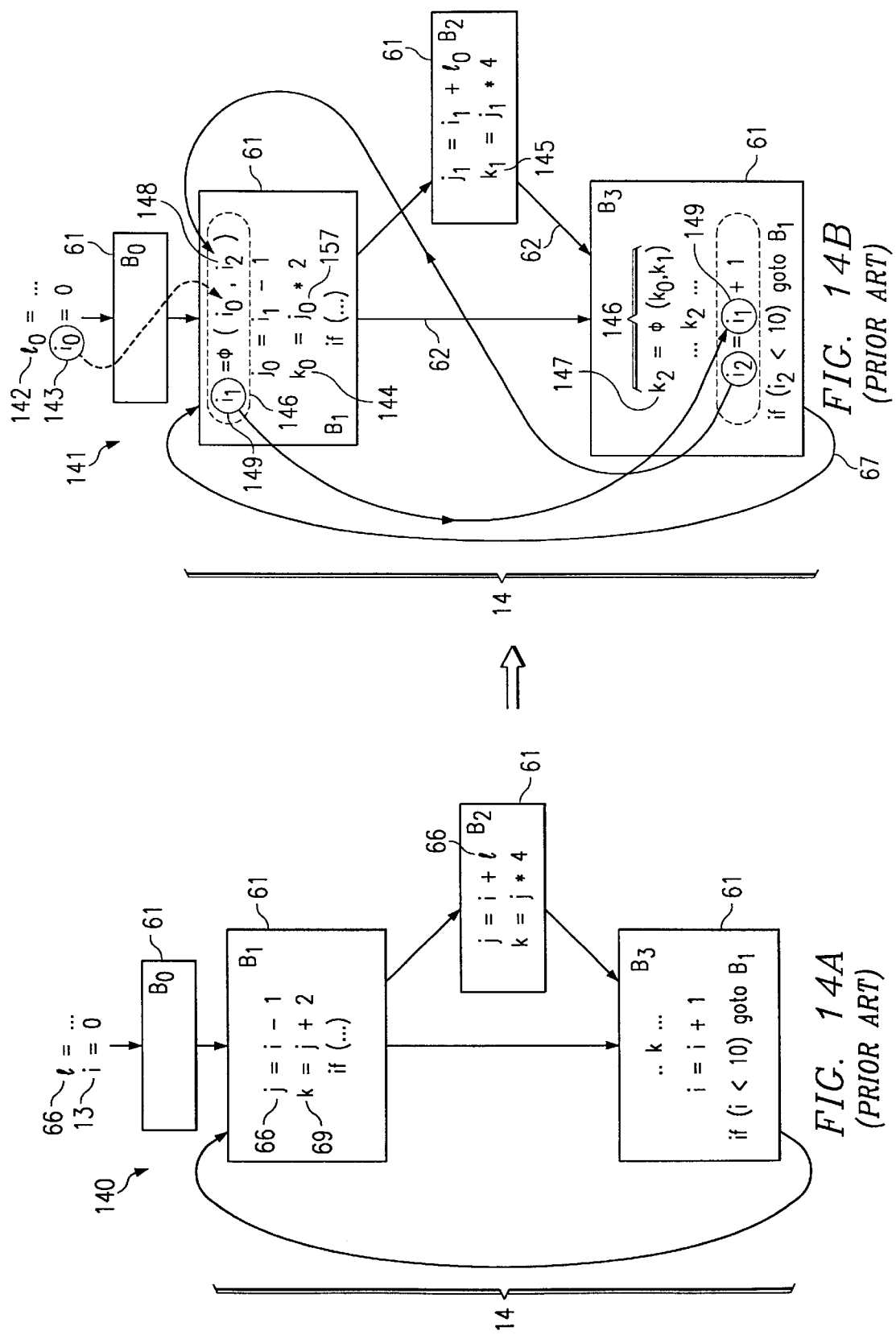
FIGS. 14A and 14B depict a code fragment containing a loop, and the same code fragment expressed in SSA form, respectively.
Figure 15:
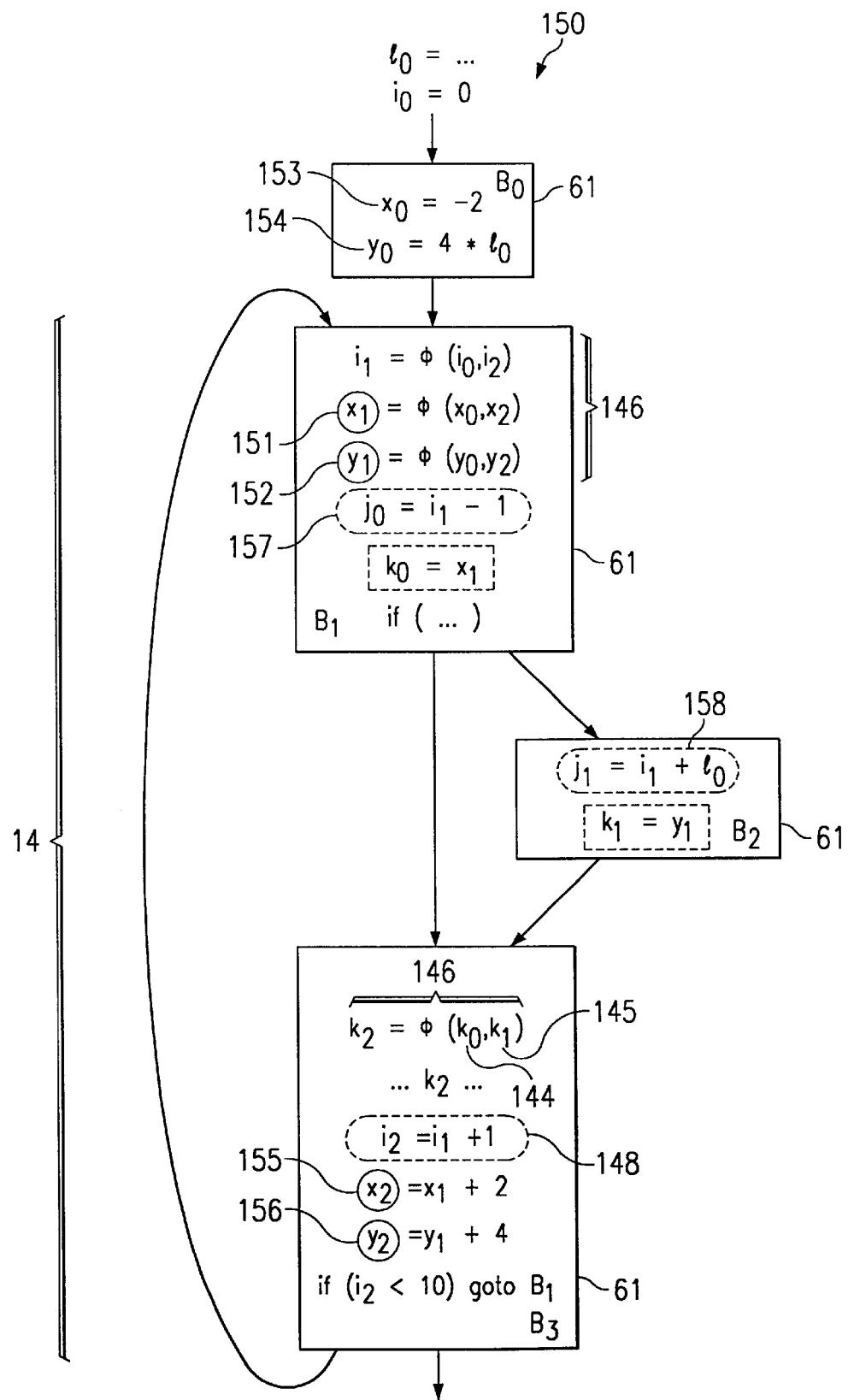
FIG. 15 depicts the strength reduction transformation applied to the SSA form of the loop of FIG. 14B.
Figure 17A:
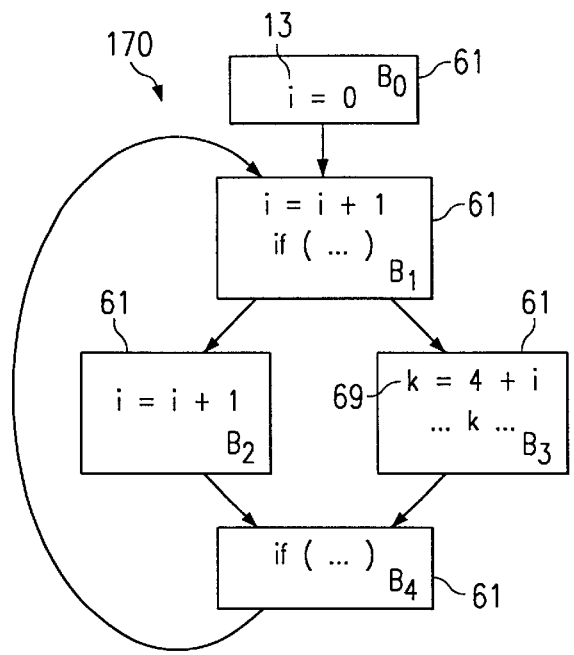
FIGS. 17A to 17C illustrates how the prior art SSA-based strength reduction algorithm inserts more instructions into the loop than are necessary in order to update temporary variables.
Figure 17B:
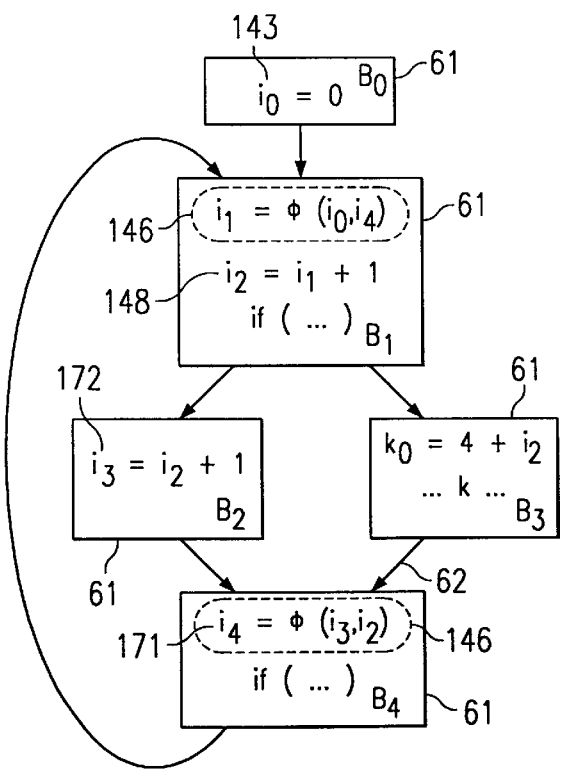
Figure 17D:
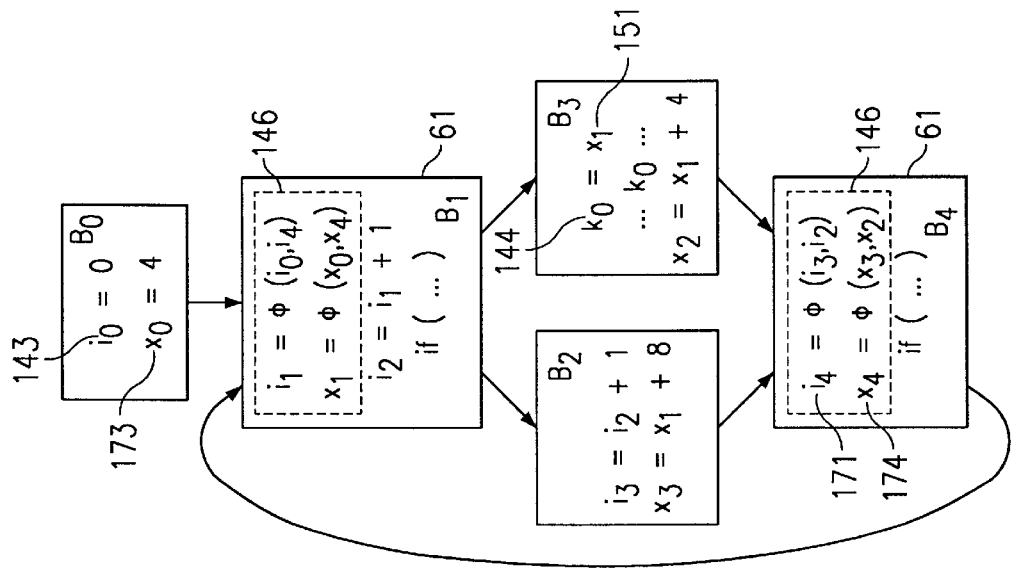
FIG. 17D shows the results of the inventive strength reduction method on the example shown in FIGS. 17A to 17C.
Figure 17C:
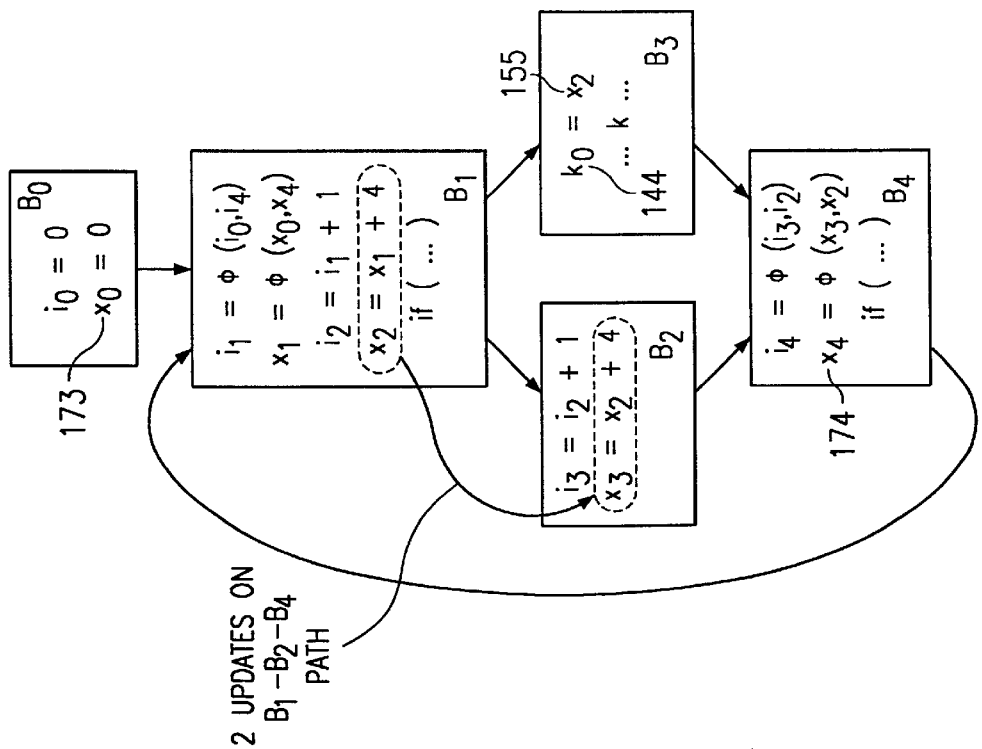

Referring back to FIG. 14B, the region constants for that example, would consist of $i_0$ and $l_0$. The induction variables would be $i_1$, $i_2$, $j_0$ and $j_1$ and the basic induction variables would be $i_1$ and $i_2$, both of which would belong to the same basic induction variable group. Note that $j_0$ and $J_1$ are excluded from being BIV's because neither $j_0$ nor $j_1$ participate in a def-use chain cycle that goes around the loop header node. The header BIV of this BIV is $i_1$ and that is the BIV that is defined by the loop header node φ operation.

Step eight involves estimating initial register pressure in the loop. FIG. 37 demonstrates the meaning of register pressure, by showing a collection of variables that are defined and used within a loop and the lines connecting the definitions and the uses of these different variables denote live ranges. A live range refers to a stretch of code over which a register holding a value would be considered in use or "live". Clearly, when there are variables whose live ranges or whose spans overlap, as is the case here with x, y and z, then different registers need to be dedicated, because one register cannot be dedicated to holding values for two different variables. Thus, separate registers are needed if variables are live concurrently, and so overlapping live ranges is what induces register pressure. This is true both in code outside of loops as well as code inside of loops. As shown in FIG. 37, x and y overlap and y and z overlap, and these overlaps occur at different points within the loop and thus the maximum register pressure induced by these live ranges is 2. This is because 2 registers will be required, for example R1 and R2, where in the beginning R1 may hold the value x and R2 may hold the value y, but after the last use of x, R1 can be recycled to hold the value z.

Now in addition to live ranges of the type shown in FIG. 37, each distinct region constant or BIVG contributes to register pressure in the loop. These resources are live or active simultaneously around the loop back edge, and in fact the entire body of the loop, and so they would need separate registers of their own. An RC typically is defined outside the loop and sourced within the loop and so its live range may span more than just the loop body. BIVG is typically initialized outside the loop, as well and so different registers will be needed to hold the value of each distinct RC as well as each distinct BIVG. This will result in increased register pressure around the loop.

Register pressure contributions apart from RCs and BIVGs are not cheap to compute. So typically what is preferred is to estimate the register pressure contributions, aside from RCs and BIVGs, heuristically. For instance, take into account some gross loop characteristics such as the number of integer computations that are found within the loop, the number of basic blocks in the loop, and/or the loop nesting level under the premise that a loop that has more instructions will have higher register pressure. Exactly how much higher could be estimated heuristically. Similarly, a loop with multiple basic blocks, or more basic blocks will have more register pressure than one with fewer basic blocks. Also, a loop that contains nested loops within it may have higher register pressure than one that is at the very bottom of the loop interval hierarchy and does not have any nested loops itself. Nonetheless, given the computing time, register pressure within the loop can be very accurately determined, but that involves live range analysis which is more expensive to perform in a compiler and involves construction of an interference graph that is also expensive. The preferred approach is to just estimate this heuristically.

Step nine is to analyze induction expressions computed by each BIV and BIVG and enter the computed induction expressions into an induction expression data base. An induction expression can be viewed as a linear function of a BIV of the form A*BIV+B, where A and B are in general region constant symbolic expressions, which could be simple constants. Each of these terms A and B are also referred to as an induction expression BIV coefficient and an induction expression addend term, respectively. Each of these two terms can be expressed as canonical sum of products of the form $C_0+C_1*RC_1*RC_2 \ldots +C_2*RC_3*RC_4 \ldots + \ldots$ The Cs, again, are simple compile time constants and the RCs are variables that do not change their values within the loop.

Now for a BIV definition, the A term or the coefficient is going to be 1. The B term could be anything but the A term is typically going to be 1 for a BIV definition. So to analyze the IX's computed by each BIV, each BIV definition in each BIVG is visited in control flow order. That is, the BIV that is defined earlier in the control flow graph would be visited first before one that appears downstream of it. If the instruction defining BIV is i, then i can be of a few different forms. If i is of the form $BIV_1$ is equal to $BIV_0$ plus or minus RC, then the induction expression that it computes is basically the inducted expression computed by $BIV_0$ plus or minus the RC term. If the BIV is defined by a φ consisting of n source operand, then the induction expression that the φ operation computes is one times the target BIV ($BIV_1$ in this case) plus 0. If i is of the form $BIV_1$ is equal to $BIV_2$ then the induction expression computed is the same as the induction expression computed by the source operands. Note that in each case there is at least one BIV source operand and that follows from the fact that BIVs are connected together in the def-use chain cycle, and so if there is a BIV definition that does not involve any BIV source operands, then the chain does not pass through that definition and therefore it would not be a BIV definition to begin with.

When identifying the induction expressions computed by each BIV, it is preferred to enter it into an induction expression database. An induction expression database could in fact be a simple associative array where the array can be indexed into with the SSA name of a variable that is defined in a loop and the induction expression computed by that resource can be retrieved from the database from the corresponding array entry. What makes this work is the fact that there are distinct names for each definition site under SSA form and there is a one-to-one correspondence, given a name. Knowing that each resource is defined only in one place, if it defines an induction expression that has been entered into the database, it can be retrieved using the resource name. This facilitates later analysis, in particular steps 11 and 12.

Step ten classifies each BIVG. The classification scheme involves examining each BIVG and if every BIV increment in the BIVG is defined by an arithmetic operation that is an intra segment add operation of the form $BIV_1$=Add*RC offset ($BIV_0$), where $BIV_1$ is some RC offset added to a base address that is $BIV_0$, then classify the entire BIVG as an intra segment pointer BIVG, meaning that this variable is incremented around the loop and tracks a pointer value or memory address value. This would be the case if each of the definitions of the BIV that is an increment operation, as opposed to a φ operation is of the form illustrated involving an intra segment add opcode. Otherwise, the BIVG is just an ordinary integer BIVG.

Step eleven involves visiting all the loop body instructions and constructing an induction expression database for all the induction expressions computed in the loop.

A loop invariant symbolic expression (SX) is viewed as a triple, (offset, base, F64A?) where, "offset" and "base" are represented as canonical "sum-of-products" sub-expressions, each of the form:

c0+
c1*RC11*RC12* . . . +
c2*RC21*RC22* . . . +
:
cn*RCn1*RCn2* . . .
   where the "c" terms refer to simple compile-time integer constants and the RC terms refer to loop invariant SSA-renamed integer variables. The "F64A?" component of SX is a boolean flag that is set to TRUE for values computed directly or indirectly by an F64A instruction and FALSE otherwise.

An induction expression (IX) is a symbolic expression that is partitioned as the sum of a loop varying sub-expression and a loop invariant sub-expression. Let the canonical representation for an IX be:

$$IX=(a*biv)+b$$

where a and b are loop invariant symbolic expressions, each of which are represented as an (offset, base, F64A?) triple as discussed before, and biv is a loop basic induction variable.

Any reference to an RC within the loop body can be considered to evaluate to a loop invariant IX value, RCx, that is determined by analyzing the definition of RC outside the loop body. RCx is defined based on the following RC IX formation rule:

RCx.a=(,,FALSE)
RCx.biv=RCx.b=(R(bar)C.offset, RC.base, FALSE)
   where RCx.b is determined by applying the following RC SX formation rules based on the type of instruction defining RC. (The RC SX formation rules may in turn be applied recursively to any source operands of the instructing defining RC, to determine the symbolic expressions that they evaluate.)

1. if RC is defined by an instruction of the form
   RC=LoadImmediateConstant C
   RC.offset=RC.base=C(bar)
2. if RC is defined by an instruction of the form
   RC=Copy RC1
   RC.offset=RC1.offset
   RC.base=RC1.base
3. if RC is defined by an instruction of the form
   RC=Add RC1, RC2
   RC.offset=RC.base=R(bar)C1.offset+RC1.base+RC2.offset+RC2.base
4. if RC is defined by an instruction of the form
   RC=sub RC1, RC2
   RC.offset=RC.base=(R(bar)C1.offset+RC1.base)−(RC2.offset+RC2.base)
5. if RC is defined by an instruction of the form
   RC=Mpy RC1, RC2
   RC.offset=RC.base=(R(bar)C1.offset+RC1.base)*(RC2.offset+RC2.base)
6. if RC is defined by an instruction of the form:
   RC=IntraSegmentAdd RC1 (RC2)
   RC.offset=RC1.offset+RC1.base+RC2.offset
   RC.base=RC2.base
7. if RC is defined by any other type of instruction
   RC.offset=RC.base=R(bar)C Induction expression analysis proceeds by visiting every instruction in the loop body in control-flow order and augments the induction expression database with entries corresponding to well-formed IX values computed by certain types of loop body instructions. Each well-formed IX value entered into the database is associated with the SSA-renamed target resource of the instruction that computes the IX value. The IX database may be subsequently queried to retrieve the IX value computed by the target resource.

An integer arithmetic loop body instruction, I, that computes an SSA-renamed target resource x, can be analyzed to determine if it defines a well-formed IX value, IXx, based on the IX formation rules given below. (Any loop invariant source operand, RC, of an arithmetic loop body instruction, is first analyzed as per the RC IX formation rule listed earlier, to determine its corresponding IX value, before applying the IX formation rules listed below.)

1. if I of the form: x=LoadImmediateConstant C $IXx.a = (\_, \_, FALSE)$ $IXx.biv =$ $IXx.b = ((bar)\_, C, FALSE)$ 2. If I is of the form: x=Copy y
   if (IXy is well-formed) then $IXx.a = IXy.a$ $IXx.biv = IXy.biv$ $IXx.b = IXy.b$ else
   IXx is not well-formed 3. If I is of the form: x=Add y, z
   if (IXy is not well-formed OR IXz is not well formed) then
   IXx is not well-formed
   else if (IXy.biv=="" AND IXz.biv=="") then
   IXx.a=(,,FALS(bar)E)
   IXx.biv=IXx.b=I(bar)Xy.b+IXz.b//Apply SX formation rule 3
   else if (IXy.biv=="") then
   IXx.a=IXz.a
   IXx.biv=IXz.biv
   IXx.b=IXy.b+IXz.b//Apply SX formation rule 3
   else if (IXz.biv=="") then
   IXx.a=IXy.a
   IXx.biv=IXy.biv
   IXx.b=IXy.b+IXz.b//Apply SX formation rule 3
   else if (IXy.biv==IXz.biv) then
   IXx.a=IXy.a+Ixz.a//Apply SX formation rule 3
   IXx.biv=IXy.biv
   IXx.b=IXy.b+IXz.b//Apply SX formation rule 3
   else
   IXx is not well-formed 4. If I is of the form: x=Sub y, z
   if (IXy is not well-formed OR IXz is not well formed) then
   IXx is not well-formed
   else if (IXy.biv=="" AND IXz.biv=="") then
   IXx.a=(,, FALS(bar)E)
   IXx.biv=IXx.b=I(bar)Xy.b−IXz.b//Apply SX formation rule 4
   else if (IXy.biv=="") then
   IXx.a=IXz.a*(,−1, FALSE)//Apply SX formation rule 4
   IXx.biv=IXz.biv
   IXx.b=IXy.b−IXz.b//Apply SX formation rule 4
   else if (IXz.biv=="") then
   IXx.a=IXy.a
   IXx.biv=IXy.biv
   IXx.b=IXy.b−IXz.b//Apply SX formation rule 4
   else if (IXy.biv==IXz.biv) then
   IXx.a=IXy.a−IXz.a//Apply SX formation rule 4
   IXx.biv=IXy.biv
   IXx.b=IXy.b−IXz.b//Apply SX formation rule 4
   else
   IXx is not well-formed 5. If I is of the form: x=Mpy y, z
   if (IXy is not well-formed OR IXz is not well formed) then
   IXx is not well-formed
   else if (IXy.biv=="" AND IXz.biv=="") then
   IXx.a=(,, FALS(bar)E)
   IXx.biv=
   IXx.b=I(bar)Xy.b*IXz.b//Apply SX formation rule 5
   else if (IXy.biv=="") then
   IXx.a=IXz.a*IXy.b//Apply SX formation rule 5
   IXx.biv=IXz.biv
   IXx.b=IXz.b*IXy.b//Apply SX formation rule 5
   else if (IXz.biv=="") then
   IXx.a=IXy.a*I(bar)Xz.b
   IXx.biv=IXy.biv
   IXx.b=IXy.b−IXz.b//Apply SX formation rule 5
   else
   IXx is not well-formed 6. If I is of the form: x=IntraSegmentAdd y(z)
   if (IXy is not well-formed OR IXz is not well-formed) then
   IXx is not well-formed
   else if (IXy.biv=="" AND IXz.biv=="") then

```
    IXx.a=(,, FALS(bar)E)
    IXx.biv=IXx.b=I(bar)Xy.b+IXz.b//Apply SX forma-
       tion rule 6
  else if (IXy.biv=="") then
    IXx.a=IXz.a
    IXx.biv=IXz.biv
    IXx.b=IXy.b+IXz.b//Apply SX formation rule 6
  else if (IXz.biv=="" then
    IXx.a=IXy.a
    IXx.biv=IXy.biv
    IXx.b=IXy.b+IXz.b//Apply SX formation rule 6
  else if (IXy.biv==IXz.biv) then
    IXx.a=IXy.a+IXz.a//Apply SX formation rule 6
    IXx.biv=IXy.biv
    IXx.b=IXy.b+IXz.b//Apply SX formation rule 6
  else
    IXx is not well-formed
7. If I is of the form: x=IntraSegmentF64A y(z)
  if (IXy is not well-formed OR IXz is not well formed)
    then
    IXx is not well-formed
  else if (IXy.biv=="" AND IXz.biv=="") then
    IXx.a=(,, TRU(bar)E)
    IXx.biv=IXx.b=I(bar)Xy.b+Ixz.b// Apply SX forma-
       tion rule 6
    IXx.b.F64A?=TRUE
  else if (IXy.biv=="") then
    IXx.a=IXz.a
    IXx.a.F64A?=TRUE
    IXx.biv=IXz.biv
    IXx.b=IXy.b+Ixz.b//Apply SX formation rule 6
    IXx.b.F64A?=TRUE
  else if (IXz.biv=="" then
    IXx.a=IXy.a
    IXx.biv=IXy.biv
    IXx.b=IXy.b+IXz.b//Apply SX formation rule 6
    IXx.b.F64A?=TRUE
  else if (IXy.biv==IXz.biv) then
    IXx.a=IXy.a+IXz.a//Apply SX formation rule 6
    IXx.biv=IXy.biv
    IXx.b=IXy.b+IXz.b//Apply SX formation rule 6
    IXx.b.F64A?=TRUE
  else
    IXx is not well-formed
8. if I is of the form: x=phi (x1, x2, x3, . . . , xn)
  if (any one of IXx1, IXx2, . . . IXxn is not well-formed)
    then
    IXx is not well-formed
  else if (x is not a BIV) then
    IXx is not well-formed
  else
    IXx.a=(,1, FALSE)
    IXx.biv=x
    IXx.b=(,0, FALSE)
```

Note that when applying an SX formation rule, if either source SX operand has its F64A? flag set to TRUE, then the resulting SX as well as the associated IX is considered well-formed if an only if I is of the form: x=IntraSegmentAdd y(z).

FIG. 38 depicts a C source code 380 example. FIG. 39 illustrates the low level intermediate representation 390 for the source code shown in FIG. 38. The low level intermediate representation is shown as a control flow graph, with annotations on the edges 62 for the execution frequencies, which may have been retrieved from a prior run of the program. The intra-segment addition operations are denoted by asterisks. The right hand side FIG. 39 includes a list of the Region Constants 391, induction variables 392, BIVs 393, and BIVGs 394 that were identified in the earlier steps. Note that there is just one BIVG in this example.

The BIVG, consisting of the BIVs $i_1$ and $i_2$, would be considered an ordinary integer BIVG in this case because in examining the sole addition operation defining the BIV $i_2$, it is noted that it is an ordinary add and not an intra-segment add. So this BIV is just an ordinary integer variable, which correlates well with the source code. In relating the BIVG back to source code, it corresponds to the variable i and i is not declared to be a pointer variable, it is just an ordinary integer variable. So it is just as well that this BIVG is recognized as an ordinary integer BIVG in this low level analysis.

FIG. 40 depicts the induction expressions 400 that are computed by the different variables that are shown on FIG. 39. For instance, there are the induction expression corresponding to the different RC terms, specifically $p_0$, $m_0$, $l_0$, $t_4$, and $i_0$. The underscore is a place holder to indicate that the corresponding value is irrelevant. So for an RC, for instance, an RC by definition is not loop variant, so it cannot be a linear function of a BIV per se. That's why the BIV term in these induction expression has an underscore, meaning that it is irrelevant or not meaningful in context. Note that the induction expression $m_0$ has been analyzed to be $k_0+5$. Basically, in analyzing that RC definition, we have triggered a backward analysis on $l_0$ and applied the SX formation rules to end up with the induction expression for $m_0$.

Although the induction expressions for the five different RCs are listed at the top, this is for simplicity and does not suggest and that those induction expressions are analyzed in a prepass. The induction expressions corresponding to those RCs would be determined during the visitation of the different instructions in the loop in the control flow order.

The IX corresponding to $i_1$ and the IX corresponding to $i_2$ would have been identified as part of step nine and are simple induction expressions. The induction expression for $i_1$ is basically $1*i_1+0$ and the induction expression for $i_2$ is $1*i_1+1$, ignoring some of the other components of the symbolic expressions. The remaining induction expressions $t_0$, $n_0$ and so on are the IXs identified in step 11. Again, instructions are visited in control flow order one after the other and the IX formation rules are applied based on the instruction type and by looking up the induction expressions corresponding to the source operands in the induction expression data base. In the case where a source operand happens to be a region constant, the induction expression is formed by applying the RC IX formation rules defined above. Every well-formed IX identified in this step is entered into the induction expression database.

Figures 6, 7, 8:
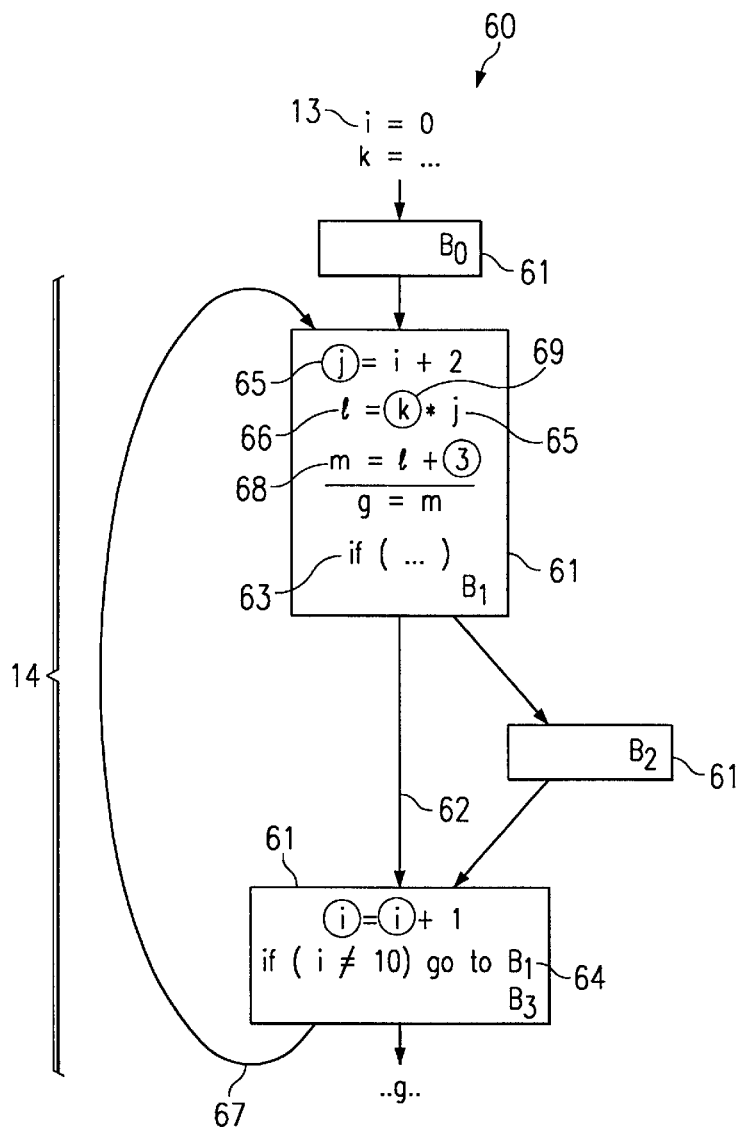
FIG. 6 depicts a portion of the control flow graph that corresponds to a loop.
FIG. 7 is a chart depicting the progression of the key variables in the loop of FIG. 6.
FIG. 8 depicts the induction expression for the variable m of FIG. 6.
Figure 9:
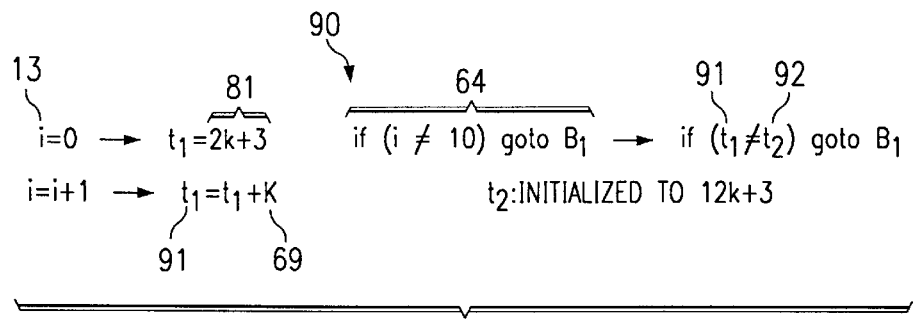
FIG. 9 depicts the strength reduction transformation and the linear function test replacement for the loop in FIG. 6.
Figure 10:
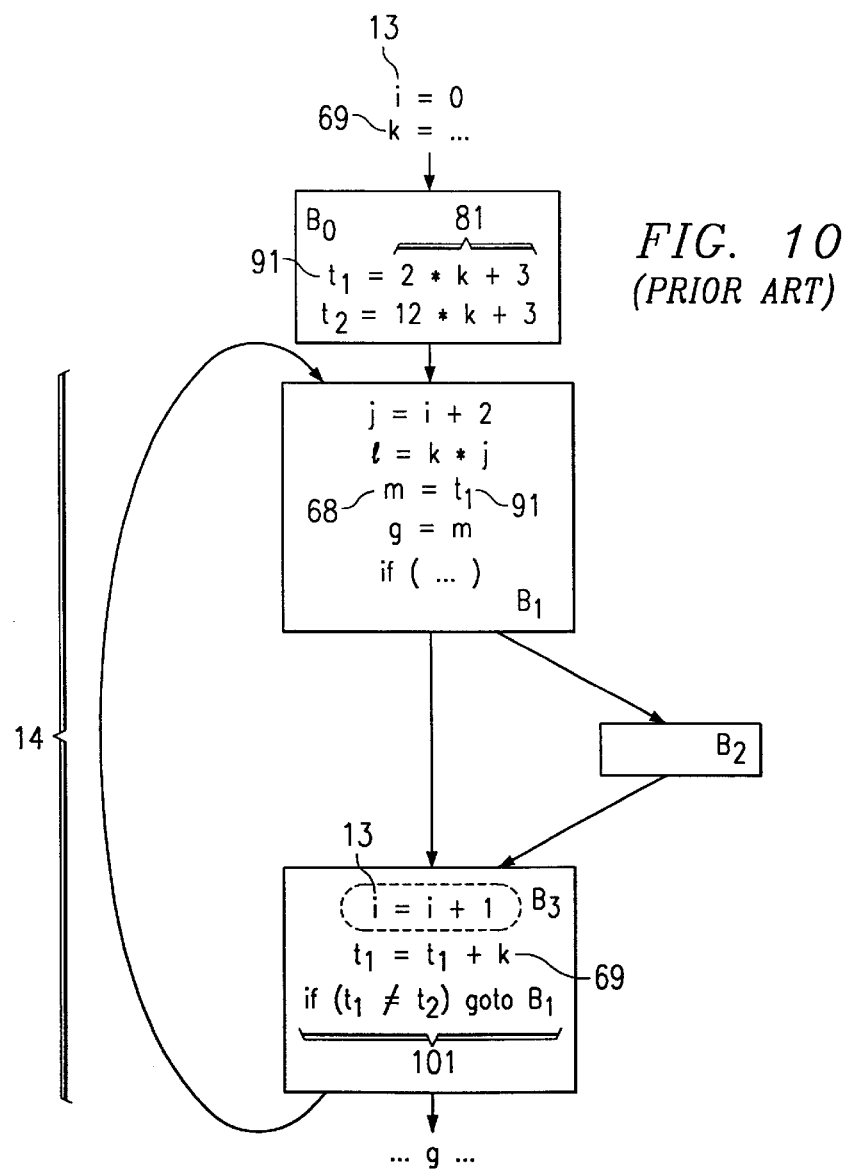
FIG. 10 depicts the results of applying strength reduction transformation and the linear function test replacement of FIG. 9 on the loop in FIG. 6.

Step twelve is to identify entries in the induction expression data base that are strength reduction candidates. Now all the induction expressions shown in FIG. 40 are entered into the induction expression data base at the end of step 11. So, in step 12 each entry in the induction expression data base is examined to determine if each of those entries is an essential or non-essential induction expression. An induction expression computed by a non-BIV variable T is considered essential if there is at least one instruction within the loop that uses T as a source operand and does not itself compute another IX. As shown in FIG. 6, the induction expression 1 is used to compute a larger induction expression value that is assigned to m. So, the induction expression computed by 1 would be considered non-essential, whereas the induction expression computed by m is being used in an ordinary assignment statement and so it would be considered essential. If this is not the case then the induction expression is considered to be non-essential. So, in examining FIGS. 39 and 40, there is an induction expression computed by $t_0$ and in looking at the uses of $t_0$, there is a use of $t_0$ as a source operand in the instruction that computes $n_0$. However, that instruction itself computes another induction expression, namely the IX for $n_0$. Thus, the definition of essential induction expressions would disqualify the induction expression computed by $t_0$ from being considered essential. Only the circled now BIV induction expressions shown in FIG. 40 are considered essential. It is useful to identify essential induction expressions because those are the only real interesting strength reduction candidates, there is not much value in strength reducing non-essential induction expressions. So only the IX for $n_0$, the IX for $t_6$, and IX for $t_{12}$ are going to be considered essential and hence strength reduction candidates.

Step thirteen is to place the strength reduction candidate IXs into disjoint induction expression classes. The term disjoint induction expression classes (IC) means that an induction expression does not appear in more than one class, thus, a given induction expression can appear in at most one induction expression class. Certain conditions must be satisfied in placing induction expressions in induction expressions classes.

(a) All IXs in an IC must have the same BIV coefficient SX;
(b) All IXs in an IC must be linear functions of BIVs that belong to the same BIVG;
(c) All IXs in an IC must have the F64A SX component of their BIV coefficient/addend set to the same value; and
(d) for an IC whose member IXs have F64A set to TRUE either:
  (i) all IXs will have addend SXs whose offsets are null (""); or
  (ii) all IXs will have addend SXs whose offsets are non-null; and
(e) for an IC whose member IXs have F64A set to TRUE, either:
  (i) all IXs will have addend SXs whose base components are identical; or
  (ii) all IXs will have addend SXs with non-null offset components and the base BIVG of the IC must be an intrasegment pointer BIVG.

All induction expressions in the IC must have the same coefficient SX or symbolic expression. They must all be linear functions of BIVs that belong to the same BIVG. They do not necessarily need to be linear functions of the same BIV, as long as the BIVs all belong to the same BIVG. The reason for placing IXs into different ICs is so that all the IXs that are within an IC can be considered for strength reduction in unison, which results in a better strength reduction transformation. Another condition is that all IXs and ICs should have their F64A SX component of their coefficient and addend set to the same value. That flag refers to whether an induction expression was computed either directly or indirectly by an F64A intra segment add operation. So either all IXs should have that flag set to TRUE or all IXs in an IC should have flag set to FALSE.

Another requirement is that for ICs whose member IXs all have their F64A flags set to TRUE, either one of two conditions must hold: either all IXs will have addend SXs whose offsets are null, which is irrelevant, or all IXs will have addend SXs whose offsets are non-null. For an IX whose member IXs have that flag set to TRUE, either all IXs will have addend SXs whose base components are identical or, all Ixs will have addend SXs with non-null offset components and the base BIVG of the IC must be an intra segment pointer BIVG. Again, these rules are largely there to facilitate the strength reduction transformation.

These rules can be explained by way of the example shown in FIG. 39. As previously mentioned, three induction expressions are identified as being essential, the induction expression computed by $n_0$, $t_6$ and $t_{12}$. Taking the induction expression computed by $n_0$ and $t_6$, $n_0$ has to be considered by itself. Since there are no induction expression classes at the outset, a new induction expression class $IC_0$ is created and includes the induction expression computed by $n_0$. Next $t_6$ is considered for inclusion in the same IC or to a new IC. Comparing the IXs for $n_0$ and $t_6$ and the list of rules, the first rule is that all IXs in an IC must have the same IX coefficient. Clearly that is not the case for induction expression computed by $n_0$ and the one computed by $t_6$. $n_0$ has a coefficient of 4 and $t_6$ has a coefficient of 40, and thus the two induction expressions must belong to different induction expression classes. So a new induction expression class $IC_1$ is created which includes $t_6$.

Now consider the last essential induction expression, $t_{12}$, again going down the steps, the first requirement says induction expressions must have the same coefficient to belong to the same induction expression class. This is, again not the case for $n_0$ and $t_{12}$, but this requirement is satisfied when comparing the induction expressions for $t_6$ and $t_{12}$. Now the next requirement, which is that the two IXs must be linear functions of BIVs that belong to the same BIVG in order to be placed in the same IC, is also satisfied by $t_6$ and $t_{12}$. That is, they are both linear functions of the BIV $i_1$ and clearly since they are functions of the same BIV, they are members of the same BIVG as well.

The next requirement is that all IXs should have the same F64A setting, and this is met as both have their F64A flag set to TRUE, meaning that both induction expressions were computed using an F64A add instruction at some point. Moving on to the next requirement which states that for ICs whose member IXs have the F64A flag set to TRUE, either the offsets of the addend SX for all the IXs should be null. This is not met by $t_6$ and $t_{12}$, the offset component of the addend SX for $t_6$ is 208+40*k and the offset component of the addend SX for $t_{12}$ is 0. So the first sub-requirement is not met, but the second one is met, in that both have non-null offsets.

The final requirement, which states that for an IC whose member IXs have the F64A flag set to TRUE, either all IXs will have addend SXs whose base components are identical. And this requirement is not met because in one case, the addend component is the address of &A[0] and in the other case it is $P_0$, and they are not identical. The other possibility is that all IXs will have the addend SXs with non-null offset components and the base BIVG of the IC must be an intra segment pointer. As mentioned earlier, the BIVG is an ordinary integer BIVG and so this condition is not met. Since this condition is a requirement for the two IXs to be placed into the IC, these IXs will have to be placed in different ICs. The net result is that each of the three induction expressions are placed in three distinct induction expression classes, $IC_0$, $IC_1$ and $IC_2$.

Step fourteen involves sorting the ICs based on expected profitability of instantiation or strength reduction. Estimated profitability of strength reducing an IC is determined by the weighted cost of the non-essential induction expression computations used to compute source operands of the instructions defining the essential IX members of the IC. For the purposes of estimating profitability here, ignore IXs computed by RCs and BIVs that serve to indirectly define the essential IXs in the IC. The weighted cost is computed by summing up the product of the machine cycles needed to execute the non-essential induction expression computing instructions, multiplied by the execution frequency of those instructions. This product is computed for each instruction that is involved in computing an essential IX in an IC and is summed up across all the instructions that are used to compute all essential induction expressions in the IC.

Assume that all the integer operations that are shown in FIG. 39, are one cycle each. From the execution frequencies denoted on the edges of FIG. 39, it is apparent that the loop will execute 1,000 times. It is entered 10 times from the preheader and the loop takes the back edge 990 times and therefore, the body executes 1,000 times. So, the weighted cost for the non-essential induction expression computations associated with each of those ICs is 1,000 for $IC_0$, and 3,000 each for $IC_1$ and $IC_2$. This is because there are either one or three non-essential induction expression computations that serve to define the essential induction expressions in each of these ICs. Now if these ICs were sorted based on these estimated profitability factors, the end result would be a sort order of $IC_1$ to $IC_2$ followed by $IC_0$. That is to say, $IC_1$ seems as though it is the most profitable to strength reduce. (The other order to strength reduce, is $IC_2$ before $IC_1$ which would be just as good.) This concept will be tied in with the register pressure impact in step 16.

Step fifteen is to choose a representative IX in order to strength reduce each IC. Strength reducing an IC amounts to selecting a representative member IX, creating a temporary variable to track the value of that chosen IX within the loop, and then rewriting the computations of all other IX members of the ICs as some loop invariant offset amount added to the temporary variable value. This process is also referred to as IC instantiation. The fact that ICs can be considered independently for strength reduction purposes was one of the advantages of forming these ICs, in that to determine what the strength reduction transformation would be for an IC, there is no need to examine the contents of other ICs in this step.

The representative IX may be chosen in different ways. For example, it could just be chosen arbitrarily, e.g. select the first induction expression that is a member of an IC, and call it the representative. The preferred way of selecting the representative IX is to factor in the magnitude of the loop invariant constant offset amounts that will be needed if that IX is chosen as the representative. As an example, assume that there are five different IXs as shown below that would all be considered members of the same IC:

IC Members:
$IX_1$: 4*BIV+10
$IX_2$: 4*BIV+200
$IX_3$: 4*BIV+$RC_1$
$IX_4$: 4*BIV+$RC_2$
$IX_5$: 4*BIV+100 (best instantiation choice)

As illustrated all of the IXs are linear functions of the same BIV, they have the same coefficient, and they differ only in their addend terms.

For simplification, the symbolic expression terms in these IXs have been reduced to just the base component. And so, in selecting the best IX to instantiate, the part that is different between these IXs is examined, that is the addend term. Note that some of these addends have terms that differ from each other by simple compile time constants, in particular, $IX_1$, $IX_2$ and $IX_5$, whereas the others have addend terms that have a region constant term, that is a non compile-time constant value.

The best instantiation choice among these induction expressions is $IX_5$. The reason is because when $IX_5$ is chosen as the induction expression value that would be tracked around the loop, the other IXs, namely $IX_1$ and $IX_2$, are computed by adding a delta amount to the instantiated value. The delta amount would be minus 90 to get to $IX_1$ and plus 100 to get to $IX_2$, and non compile-time constant values for $IX_3$ and $Ix_4$, specifically $RC_1$ minus 100 and $RC_2$ minus 100, respectively.

Now $IX_1$ could have been selected and then the delta amounts for $IX_2$ and $IX_5$ would have been 190 and 90 respectively. This selection is not a good as $IX_5$ as the representative IX. Suppose there was a machine where there are add instructions that could add a constant value to a register value to form a result, but the constant value had to be a value that was in the range of an 8-bit signed constant, meaning that a value could be represent from minus 128 to plus 127. If the constant was outside of that range, then there would be a need to use a different form of that add instruction, where two register source operands are added and compute a result. Then by choosing $IX_1$ as the representative IX, the machine will have to compute the constant 190, which would be the difference between $IX_2$ and $IX_1$ addends, into a separate register.

This value would be computed into a register outside the preheader and then the definition of $IX_2$ is rewritten in terms of an addition operation where one of the source operands was the instantiated temporary variable corresponding to $IX_1$, and the other one would be the register corresponding to the value 190. The problem is that a separate register is dedicated to holding an RC value that is a compile time constant and that RC value effectively would increase register pressure. So, it is preferable to avoid having to maintain constant values in registers because they are oversized and do not fit in instruction immediate fields. Thus by choosing $IX_5$, the delta amounts will have smaller absolute magnitudes and have a greater chance of fitting in the instruction immediate fields.

Step sixteen is to assess the number of ICs to instantiate based on the overall profitability and register impact. When an IC is instantiated, instructions have to be inserted into the loop. Now, this is needed to update the instantiated temporary variable, in a standard strength reduction algorithm. Wherever a BIV is updated, a corresponding update is inserted for the strength reduced temporary variable. That increases the execution cost of the loop, so it is not in and of itself a good thing. But, the advantage of the strength reduction transformation is that some non-essential IX computations are rendered dead, and can now be eliminated from the loop body. So this has a positive influence in terms of profitability and execution cost of the loop. When non-essential induction expressions are eliminated as a by-product, references to certain RCs that were sourced by those non-essential induction expression computations may also be eliminated from within the loop. So that might have a good impact in terms of register pressure as well as execution cost. In some cases, the instructions that update BIVs may also be rendered dead, especially if the LFTR transformation is performed. That means that the associate of BIVG is no longer needed and can be removed. Again, that contributes positively both in terms of instructions removed from within the loop as well as register pressure, because now the BIVG is no longer needed, and thus there is no need to dedicate a register to hold its value across the loop. As mentioned, eliminating RCs and BIVs reduces register pressure within the loop. Eliminating non-essential IX computations leads to execution cost savings, but inserting instructions within the loop results in execution cost increases.

In addition, when there are multiple IXs in an IC, they end up in some cases having to dedicate registers to hold delta values either because they are oversized compile time constants or because they are truly not known at compile time, such as the deltas for $IX_3$ and $IX_4$. So those delta terms, if they have to be kept in a register, cause an increase in register pressure. In addition, each time an IC is instantiated the temporary variable associated with it has to be maintained in a separate register, which is a negative impact on register pressure. So the strength reduction transformation has both potentially positive as well as negative influences, both in terms of profitability or execution cost reductions as well as register pressure impact. Therefore, it is preferable when sorting the ICs based on an initial estimate of profitability, to plot the net impact on register pressure as well as execution cost as a result of instantiating that IC and perhaps, higher priority ICs that were sorted earlier φ in the list.

Suppose a loop ended up with four different ICs, the impact of instantiating can be plotted for either just $IC_1$ or $IC_1$ and $IC_2$, or $IC_1$, $IC_2$ and $IC_3$, or all four ICs. As shown in FIG. 41, the impact of those four choices relative to the register pressure can be plotted as well as the execution cost within the loop. The ICs appear in their sort order on the x axis 411. On the left y axis 412 is the register pressure, with its associated line 413, and with the horizontal line 414 indicating the machine threshold. On the right y axis 415 is the execution cost savings with its associated line 416. Instantiating no ICs results in some register pressure within the loop, as shown on the left y axis 412. Consider the impact of instantiating just $IC_1$ or $IC_2$ or $IC_3$, the register pressure sort of goes up and then starts to come down, and this could be because the instructions that are rendered dead as a result of instantiating $IC_1$ and $IC_2$ do not source any interesting region constants, or if they do, there are still other references to those same RCs. So the positive register pressure impact that is expected is not occurring yet, even though there is some realization of execution cost savings. But after a certain point, deciding to instantiate $IC_1$, $IC_2$ and $IC_3$, results in a favorable register pressure impact in that the instructions that are rendered dead collectively, that is, the non-essential induction expression computing instructions that are rendered dead as a result of instantiating all three ICs, may now have had references to RCs that go away in their entirety from within the loop, and so that buys back some register pressure. The same effect is a little bit more pronounced when all four ICs are instantiated.

If more registers are used in the loop then available in the machine as indicated by threshold line 414, then certain values will need to be spilled from registers to memory because all of them cannot be kept in registers and thus some values have to be kept in memory and this is not a good thing. Therefore, an instantiation choice that results in the net register pressure being higher than the machine threshold should be avoided.

Now, at the same time on this graph of FIG. 41, is plotted the execution cost impact or savings 416 on the right y axis 415. When no ICs are instantiated the savings is zero. Choosing to instantiate a couple of ICs, the savings keeps going up and then suddenly, it drops when choosing to instantiate $IC_3$. This could be because instantiating $IC_3$ involves placing a lot more updates for temporary variables in the loop. $IC_1$, $IC_2$ and $IC_3$ may contain IXs that are linear functions of different BIVG members, and the one that $IC_3$ is a linear function of may have been updated many different places within the loop causing the insertion of many more temporary updates when that IC is instantiated. Perhaps the BIVG in and of itself was not rendered dead as a result of instantiating $IC_3$, there are other references to the BIVG members, which is why the net execution cost goes up or the savings comes down. It is also shown that the savings go up again when choosing to instantiate all four. So the concept of this step is to have these estimates in hand, generated automatically by the compiler, and to choose to instantiate as many ICs as possible wherein the net register pressure does not exceed the machine threshold, but the execution cost savings are maximized. So going by that criteria, the savings are largest when electing to instantiate all four and the register pressure is not exceeded and this is the optimum point. To perform this step is simply a matter of diligent bookkeeping.

Steps seventeen and eighteen will be discussed together. When instantiating an IC, instructions need to be inserted in the loop body to update the instantiated temporary variable, as mentioned earlier. Given the IX analysis strategy, the cost of these instructions can be reduced. In particular, for each BIV definition that is other than a φ defined BIV, the best location for inserting the corresponding update for the instantiated strength reduction temporary, can be determined exclusively based on uses of that BIV in down stream BIV φ definitions, that is, based on source operand uses in such φ definitions. More specifically, if a BIV is not sourced by a down stream BIV φ definition, then no SR temp update is needed. On the other hand, if a BIV is sourced by a down stream predicate φ operation, the corresponding update for the strength reduction temporary variable needs to be inserted right next to the BIV definition. A similar strategy would be used for placing a φ operation for 10 an SR temporary variable corresponding to a BIV φ operation. If a BIV definition X is sourced as a source operand of multiple control φ operations, and those source operands correspond to basic blocks, B0, B1, BN, that is the value of X flows into one or more control φ operation from basic blocks B0, B1, BN, the instruction that updates the corresponding strength reduction temporary variable is inserted at a basic block called Bopt, such that Bopt is the nearest dominator of B0, B1 and BN. A basic block X dominates another basic block Y, if every path from the control flow graph start node to basic block Y has to pass through basic block X. So the nearest dominator of a collection of basic blocks would be a basic block that first of all dominates all those basic blocks but moreover, is closest in a control flow sense to the basic blocks it dominates.

To instantiate an IC whose representative IX is of the form AxBIV+B, the BIV definitions in the BIVG that the BIV belongs to are examined in control flow order. The first thing is that for each BIV φ definition in the BIVG that is of the form BIV0 is equal to a φ of $X_1$, $X_2$, $X_3$, XN, a corresponding φ instruction is inserted into the loop of the form $t_0$ is φ of $t_1$ through TN. For a BIV φ source operand $X_1$ that is a region constant, the corresponding temporary variable φ definition source operand $t_i$, would be an RC that is initialized in the loop preheader. The initial value's symbolic expression is computed as a product of the symbolic expression for the BIV coefficient, and the symbolic expression for RC, which is the φ source operand, summed with the symbolic expression corresponding to the addend of the induction expression that is being instantiated, SX(initial value)=SX(a)*SX(RC)+SX(b). Furthermore, if the F64A flag is true for the induction expression that is being strength reduced, that is either the A symbolic expression or the B symbolic expression, then $t_i$ is initialized in the preheader, using an F64A intra-segment operation that use the initial value as the source and computes a new value, $t_i$=F64A*0 (initial value) where initial value=SX (initial value) base.

If a φ source operand $X_i$ is a BIV, then the corresponding φ source operand for the temporary variable $t_i$, would be the temporary variable that corresponds to that BIV.

Now let's consider a BIV member of a BIVG, BIV i that happened to compute an induction expression of the form, one times BIV j, plus delta, where both BIV i and BIV j are essentially members of the same BIVG. If the instruction computing BIV i was qualified by a predicate P, then a corresponding instruction is inserted to update the temporary variable of the form (p?) $t_i=t_j+c$. $t_j$ would be the temporary variable that corresponds to BIV j. This instruction is to be inserted at the optimal location that was previously determined for this BIV definition. That is, if it is used as a source operand in down stream φs, then it would be placed in the nearest dominator of the basic blocks corresponding to the φ source operands. The c term is initialized to the base component of a symbolic expression that tracks the scaled increment value, where the scaled increment value is the product of the symbolic expression for the BIV coefficient and the delta amount, where delta was the addend for the induction expression computed by BIV i. So if C is a simple compile time constant, $t_i$ is updated using a simple addition operation. On the other hand, if it is not a compile time constant, then its value is computed in the preheader and loaded into a register, and then it will be that register that would be used as a source operand in the instruction defining $t_i$.

Step nineteen is to rewrite the loop body computations of strength reduced IXs, for each definition of an IX member in an instantiated IC that is of the form A times BIV i, plus B. If the representative IX of the IC was defined using an instruction i that defines X and is guarded by a predicate Pnth, that instruction is replaced by an instruction guarded by predicate P that assigns $t_i$ to X, where $t_i$ would be the temporary variable that is created in step 17, corresponding to BIV i. So having already created a temporary variable corresponding to each BIV definition, it would be a simple matter to look up the corresponding variable associated with any BIV and that is the one that would be sourced.

On the other hand, when dealing with an IX that was not the chosen IX, then, the instruction i is replaced with an addition operation, where X now is computed as the sum of $t_i$, again the same temporary variable corresponding to BIV i, added to an offset amount, where offset is computed as the difference in the addend symbolic expression of this induction expression and that of the representative IX. And again, if IX is not a simple compile time constant, then it will have to be initialized in the loop preheader into a register value and it would be the register value that would have to be sourced.

Figure 42:
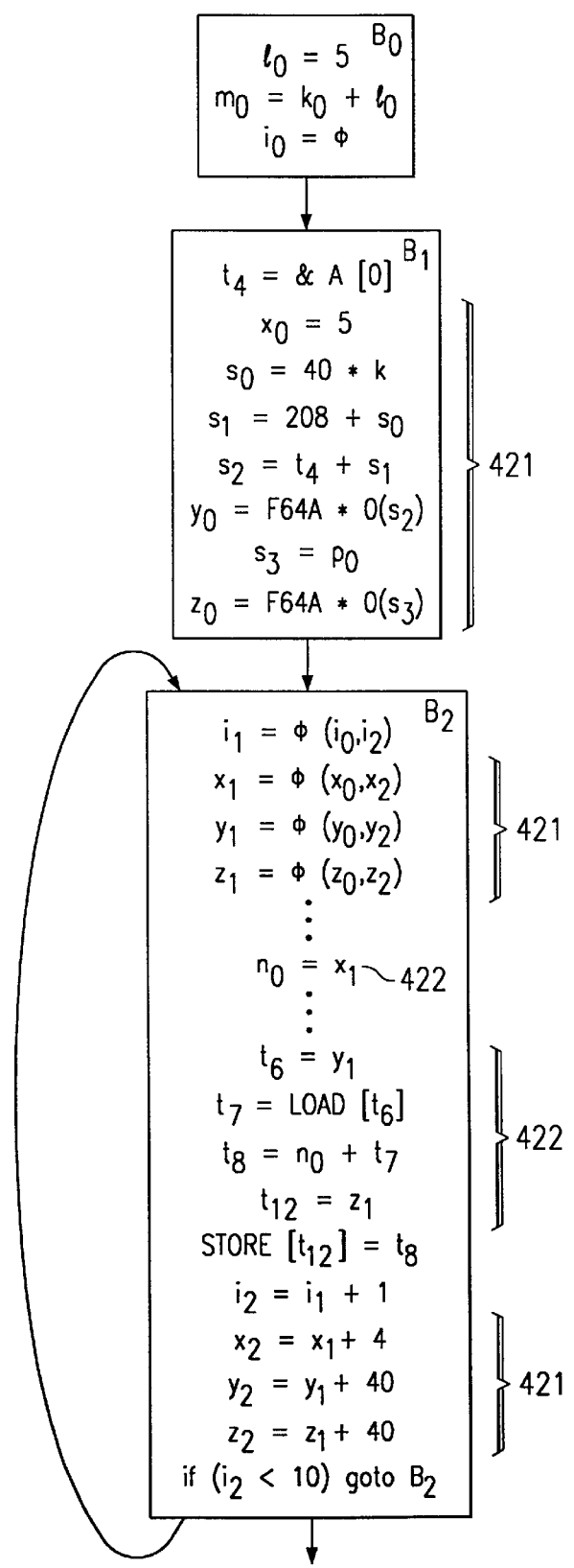
FIG. 42 depicts the results of steps 17, 18, and 19 on the example shown in FIG. 39.

FIG. 42 depicts the results of steps 17, 18, and 19 on the example shown in FIGS. 38 and 39. The instructions 421 are the new instructions that are inserted into the loop body and the loop preheader. The instructions 422 are the loop body instructions that were rewritten as part of step 19. There are two temporary variable definitions that correspond to the two BIVs $i_1$ and $i_2$ for each of the three ICs. For $IC_1$, which contains the IX that computes $n_0$, there is the temporary variable X, for $IC_2$ there is Y, and for $IC_3$ one called Z. And thus there is corresponding to $i_1$ and $i_2$, an $X_1$ and an $X_2$, and likewise for Y and Z.

Step twenty involves copy propagation. If there is a copy instruction that defines A to be the same as B, and there is subsequent uses of A and B, it is desirable to replace subsequent uses of A with uses of B so that the copy is rendered dead. This transformation is applicable to the example in terms of instructions that replaced the definitions of $n_0$, $t_6$ and $t_{12}$. Those assignments are really copy operations and thus this step is to replace the use of $n_0$ in the instruction computing $t_8$ with $x_1$ and likewise replace the use of $t_6$ in the load instruction that computes $t_7$ with $y_1$ and likewise replace $t_{12}$ that is sourced by the store instruction with $z_1$.

So effectively, by doing the copy propagation the copy instructions are rendered dead. It is important to be a little careful in doing this when the copy target is sourced in φ operations.

So after performing this copy propagation, step twenty one involves dead code elimination or getting rid of all the instructions that were rendered dead, either because of strength reduction by itself or strength reduction in combination with global copy propagation. This is just really reaping the expected benefits of the strength reduction transformation. Finally, since we are operating on SSA form, step twenty two is to exit SSA form and perform register allocation as needed.

Although the present invention and its advantages have been described in detail, it should be understood that various changes, substitutions and alterations can be made herein without departing from the spirit and scope of the invention as defined by the appended claims.

What is claimed is:

1. A method for strength reducing code represented by a control flow graph having basic blocks, wherein the graph has at least one loop, the method comprising the steps of:

determining probable execution frequencies of the basic blocks of the control flow graph;

analyzing all induction expressions in the loop;

determining essential induction expressions from the induction expressions in the loop;

analyzing the essential induction expressions based upon expected profitability of strength reduction determined from the execution frequencies;

evaluating register pressure in the loop;

selecting the induction expression to strength reduce based upon the expected profitability and register pressure impact; and performing strength reduction on the selected induction expression.

2. The method of claim 1, further comprising the step of:

annotating address arithmetic operations in the code with an opcode.

3. The method of claim 2, wherein the opcode is an intra segment add that identifies a base address operand and an offset operand that describe a memory address.

4. The method of claim 1, wherein the step of determining probable execution frequencies of the basic blocks of the control flow graph comprises the steps of:

collecting execution data from a previous run of the code; and annotating the control flow graph with the execution data to form the execution frequencies.

5. The method of claim 1, wherein the step of determining probable execution frequencies of the basic blocks of the control flow graph, comprises the steps of:

estimating, heuristically, execution data of the code; and annotating the control flow graph with the execution data to form the execution frequencies.

6. The method of claim 1, wherein a critical edge is a link that connects a first basic block having multiple successor basic blocks and a second basic block having multiple predecessor basic blocks, the method further comprising the step of:

splitting the critical edge in the control flow graph.

7. The method of claim 6, wherein the step of splitting critical edges in the control flow graph comprises the steps of:

creating a new basic block; and inserting the new basic block between the first basic block and the second basic block.

8. The method of claim 1, further comprising the steps of:

converting the code into static single assignment form; and inserting phi operations at merge points of a variable that are defined in at least two basic blocks.

9. The method of claim 1, wherein the control flow graph has at least two loops, further comprising the steps of:

identifying nested loops in the control flow graph;

determining loop interval hierarchy; and wherein the step of strength reduction is first performed on an innermost nested loop of a first loop in the graph.

10. The method of claim 1, further comprising the step of:

identifying region constant operands referenced in each loop in the graph.

11. The method of claim 1, further comprising the step of:

identifying induction variables for each loop in the graph.

12. The method of claim 11, further comprising the steps of:

identifying basic induction variables from a list of identified induction variables by determining which induction variables pass through a loop header basic block exactly once in a def-use chain cycle; and associating the basic induction variables into a group comprising the basic induction variables that participate in said def-use chain.

13. The method of claim 1, further comprising the steps of:

identifying basic induction variables for each loop in the graph by determining which induction variables pass through a loop header basic block exactly once in a def-use chain; and associating the basic induction variables into a group comprising the basic induction variables that participate in said def-use chain.

14. The method of claim 1, wherein the step of evaluating register pressure in the loop comprises the steps of:

identifying basic induction variables for each loop in the graph by determining which induction variables pass through a loop header basic block once in a def-use chain;

associating the basic induction variables into a group comprising the basic induction variables that participate in the def-use chain;

identifying region constant operands for each exactly loop in the graph;

summing the number of registers which are simultaneously required to hold a value for each region constant and for each basic induction variable group;

estimating, heuristically, a number of registers which are simultaneously required for the method other than for the step of summing; and totaling the number from the step of summing and the number from the step of estimating.

15. The method of claim 1, wherein the step of analyzing induction expressions for certain induction variables is performed for each loop in the graph and comprises:

identifying basic induction variables for each loop in the graph by determining which induction variables pass through a loop header basic block exactly once in a def-use chain;

associating the basic induction variables into a group comprising the basic induction variables that participate in the def-use chain;

analyzing induction expressions computed by each basic induction variable in the group; and entering each induction expression into an induction expression database.

16. The method of claim 15, further comprising the step of:

identifying entries in the induction expression database that are reduction candidates.

17. The method of claim 1, wherein the step of determining essential induction expressions comprises the step of:

determining whether an instruction which computes the induction expression defines a variable that is exclusively used as a source operand of other instructions that themselves compute induction expressions.

18. The method of claim 16, further comprising the step of:

categorizing the induction expressions into classes, wherein each member of a class have common characteristics with other members of the class.

19. The method of claim 18, wherein the step of categorizing the induction expressions comprises the steps of:

sorting the induction classes based upon expected profitability of strength reduction; and choosing a representative induction expression to strength reduce for each induction expression class.

20. The method of claim 19, wherein the step of selecting the induction expression to strength reduce based upon the expected profitability and register pressure impact comprises the step of:

assessing a number of classes to strength reduce based upon the expected profitability and register pressure impact.

21. The method of claim 1, further comprising the steps of:

identifying basic induction variables for each loop in the graph by determining which induction variables pass through a loop header basic block exactly once in a def-use chain;

associating the basic induction variables into groups comprising the basic induction variables that participate in said def-use chain; and classifying the group according to whether the group is an intra segment pointer group which tracks a memory address value.

22. The method of claim 1, wherein a first variable is defined to be equal to a second variable and there are subsequent uses of both the first and second variables, the method further comprising the step of:

performing global copy propagation to eliminate subsequent uses of the first variable.

23. The method of claim 1, further comprising the step of: performing global dead code elimination.

24. The method of claim 1, wherein the code has previously been converted into static single assignment form, the method further comprising the steps of:

exiting static single assignment form; and performing register allocation.

25. A computer system, including both hardware and software, that operates to strength reducing code represented by a control flow graph having basic blocks, wherein the graph has at least one loop, the system comprising:

instructions for determining probable execution frequencies of the basic blocks of the control flow graph;

instructions for analyzing all induction expressions in the loop;

instructions for determining essential induction expressions from the induction expressions in the loop;

instructions for analyzing the essential induction expressions based upon expected profitability of strength reduction determined from the execution frequencies;

instructions for evaluating register pressure in the loop;

instructions for selecting the induction expression to strength reduce based upon the expected profitability and register pressure impact; and instructions for performing strength reduction on the selected induction expression.

26. The system of claim 25, further comprising:

instructions for converting the code into static single assignment form; and instructions for inserting phi operations at merge points of a variable that are defined in at least two basic blocks.

27. The system of claim 25, wherein the control flow graph has at least two loops, the system further comprises:

instructions for identifying nested loops in the control flow graph;

instructions for determining loop interval hierarchy; and wherein the instructions for strength reduction operates first on an innermost nested loop of a first loop in the graph.

28. The system of claim 25, further comprising:

instructions for identifying induction variables for each loop in the graph.

29. The system of claim 33, further comprising:

instructions for identifying basic induction variables from a list of identified induction variables by determining which induction variables pass through a loop header basic block exactly once in a def-use chain cycle; and instructions for associating the basic induction variables into a group comprising the basic induction variables that participate in said def-use chain.

30. The system of claim 25, wherein the instructions for evaluating register pressure in the loop comprises:

instructions for identifying basic induction variables for each loop in the graph by determining which induction variables pass through a loop header basic block once in a def-use chain;

instructions for associating the basic induction variables into a group comprising the basic induction variables that participate in the def-use chain;

instructions for identifying region constant operands for each exactly loop in the graph;

instructions for summing the number of registers which are simultaneously required to hold a value for each region constant and for each basic induction variable group;

instructions for estimating, heuristically, a number of registers which are simultaneously required by the system for other than the instruction for summing; and instructions for totaling the number from the instruction for summing and the number from the instruction for estimating.

31. The system of claim 25, wherein the instructions for analyzing induction expressions for certain induction variables operates on each loop in the graph and comprises:

instructions for identifying basic induction variables for each loop in the graph by determining which induction variables pass through a loop header basic block exactly once in a def-use chain;

instructions for associating the basic induction variables into a group comprising the basic induction variables that participate in the def-use chain;

instructions for analyzing induction expressions computed by each basic induction variable in the group; and instructions for entering each induction expression into an induction expression database.

32. The system of claim 31, further comprising:

instructions for identifying entries in the induction expression database that are reduction candidates.

33. The system of claim 32, further comprising:

instructions for categorizing the induction expressions into classes, wherein each member of a class have common characteristics with other members of the class.

34. The system of claim 33, wherein the instructions for categorizing the induction expressions comprises:

instructions for sorting the induction classes based upon expected profitability of strength reduction; and instructions for choosing a representative induction expression to strength reduce for each induction expression class.

35. The system of claim 34, wherein the instructions for selecting the induction expression to strength reduce based upon the expected profitability and register pressure impact comprises:

instructions for assessing a number of classes to strength reduce based upon the expected profitability and register pressure impact.

36. A computer system, including both hardware and software, that operates to strength reducing code represented by a control flow graph having basic blocks, wherein the graph has at least one loop, the system comprising:

means for determining probable execution frequencies of the basic blocks of the control flow graph;

means for analyzing all induction expressions in the loop;

means for determining essential induction expressions from the induction expressions in the loop;

means for analyzing the essential induction expressions based upon expected profitability of strength reduction determined from the execution frequencies;

means for evaluating register pressure in the loop;

means for selecting the induction expression to strength reduce based upon the expected profitability and register pressure impact; and means for performing strength reduction on the selected induction expression.

37. A computer program product having a computer readable medium having computer logic recorded thereon for strength reducing code represented by a control flow graph having basic blocks, wherein the graph has at least one loop, the computer program product comprising:

means for determining probable execution frequencies of the basic blocks of the control flow graph;

means for analyzing all induction expressions computed in the loop;

means for determining essential induction expressions from the induction expressions in the loop;

means for analyzing the essential induction expressions based upon expected profitability of strength reduction determined from the execution frequencies;

means for evaluating register pressure in the loop;

means for selecting the induction expression to strength reduce based upon the expected profitability and register pressure impact; and means for performing strength reduction on the selected induction expression.

38. The computer program product of claim 37, further comprising:

means for converting the code into static single assignment form; and means for inserting phi operations at merge points of a variable that are defined in at least two basic blocks.

39. The computer program product of claim 37, wherein the control flow graph has at least two loops, the computer program product further comprises:

means for identifying nested loops in the control flow graph;

means for determining loop interval hierarchy; and wherein the means for strength reduction operates first on an innermost nested loop of a first loop in the graph.

40. The computer program product of claim 37, further comprising:

means for identifying induction variables for each loop in the graph.

41. The computer program product of claim 40, further comprising:

means for identifying basic induction variables from a list of identified induction variables by determining which induction variables pass through a loop header basic block exactly once in a def-use chain cycle; and means for associating the basic induction variables into a group comprising the basic induction variables that participate in said def-use chain.

42. The computer program product of claim 37, wherein the means for evaluating register pressure in the loop comprises:

means for identifying basic induction variables for each loop in the graph by determining which induction variables pass through a loop header basic block once in a def-use chain;

means for associating the basic induction variables into a group comprising the basic induction variables that participate in the def-use chain;

means for identifying region constant operands for each exactly loop in the graph;

means for summing the number of registers which are simultaneously required to hold a value for each region constant and for each basic induction variable group;

means for estimating, heuristically, a number of registers which are simultaneously required by the program product for other than the means for summing; and means for totaling the number from the means for summing and the number from the means for estimating.

43. The computer program product of claim 37, wherein the means for analyzing induction expressions for certain induction variables operates on each loop in the graph and comprises:

means for identifying basic induction variables for each loop in the graph by determining which induction variables pass through a loop header basic block exactly once in a def-use chain;

means for associating the basic induction variables into a group comprising the basic induction variables that participate in the def-use chain;

means for analyzing induction expressions computed by each basic induction variable in the group; and means for entering each induction expression into an induction expression database.

44. The computer program product of claim 43, further comprising:

means for identifying entries in the induction expression database that are reduction candidates.

45. The computer program product of claim 44, further comprising:

means for categorizing the induction expressions into classes, wherein each member of a class have common characteristics with other members of the class.

46. The computer program product of claim 45, wherein the means for categorizing the induction expressions comprises:

means for sorting the induction classes based upon expected profitability of strength reduction; and means for choosing a representative induction expression to strength reduce for each induction expression class.

47. The computer program product of claim 46, wherein the means for selecting the induction expression to strength reduce based upon the expected profitability and register pressure impact comprises:

means for assessing a number of classes to strength reduce based upon the expected profitability and register pressure impact.

48. The method of claim 1, wherein:

at least one of the induction expressions is a predicated induction expression.

49. The method of claim 1, wherein:

at least one of the induction expressions is segmented address induction expression.

50. The system of claim 25, wherein:

at least one of the induction expressions is a predicated induction expression.

51. The system of claim 25, wherein:

at least one of the induction expressions is segmented address induction expression.

52. The product of claim 37, wherein:

at least one of the induction expressions is a predicated induction expression.

53. The product of claim 37, wherein:

at least one of the induction expressions is segmented address induction expression.

54. The system of claim 25, wherein the instruction for of determining essential induction expressions comprises:

instructions for determining whether an instruction which computes the induction expression defines a variable that is exclusively used as a source operand of other instructions that themselves compute induction expressions.

55. The product of claim 37, wherein the means for determining essential induction expressions comprises:

means for determining whether an instruction which computes the induction expression defines a variable that is exclusively used as a source operand of other instructions that themselves compute induction expressions.

* * * * *